(12) United States Patent
Larsh et al.

(10) Patent No.: US 11,993,111 B2
(45) Date of Patent: May 28, 2024

(54) LOCKING GOOSEBALLS

(71) Applicant: HORIZON GLOBAL AMERICAS INC., Plymouth, MI (US)

(72) Inventors: Brad Larsh, Plymouth, MI (US); Will Venis, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 17/196,077

(22) Filed: Mar. 9, 2021

(65) Prior Publication Data

US 2021/0291601 A1 Sep. 23, 2021

Related U.S. Application Data

(60) Provisional application No. 62/987,054, filed on Mar. 9, 2020.

(51) Int. Cl.
*B60D 1/52* (2006.01)
*B60D 1/06* (2006.01)
*B60D 1/54* (2006.01)

(52) U.S. Cl.
CPC .............. *B60D 1/52* (2013.01); *B60D 1/06* (2013.01); *B60D 1/54* (2013.01)

(58) Field of Classification Search
CPC ........................................ B60D 1/56
See application file for complete search history.

(56) References Cited

U.S. PATENT DOCUMENTS

| | | | | |
|---|---|---|---|---|
| 4,201,400 A | * | 5/1980 | Hoogenbosch | B60D 1/52 280/511 |
| 5,860,671 A | * | 1/1999 | Mackeown | B60D 1/54 280/491.5 |
| 6,099,015 A | * | 8/2000 | Marcy | B60D 1/52 280/901 |
| 6,616,168 B2 | * | 9/2003 | Belinky | B60D 1/06 280/491.5 |
| 6,695,338 B1 | * | 2/2004 | Roberts | B60D 1/06 280/514 |
| 6,837,511 B1 | * | 1/2005 | Johnson, III | B60D 1/06 280/491.5 |
| 8,955,866 B2 | * | 2/2015 | Bowe | B60D 1/06 280/491.1 |
| 9,050,868 B2 | * | 6/2015 | Schott | B60D 1/065 |
| 9,242,520 B2 | * | 1/2016 | Mida | B60D 1/54 |
| 9,370,976 B2 | * | 6/2016 | McCoy | B60D 1/06 |
| 9,764,610 B2 | * | 9/2017 | McCall | B60D 1/488 |
| 10,293,646 B2 | * | 5/2019 | McCall | B60D 1/36 |
| 2013/0127137 A1 | * | 5/2013 | McCoy | B60D 1/60 280/511 |
| 2014/0265252 A1 | * | 9/2014 | Mida | B60D 1/06 280/512 |
| 2017/0305216 A1 | † | 10/2017 | McCall | |

\* cited by examiner
† cited by third party

*Primary Examiner* — Kevin Hurley

(57) ABSTRACT

Provided are gooseballs with various integrated locking mechanisms. The gooseballs are capable of being utilized in gooseneck hitches and other hitch assemblies or coupling devices that use a hitch ball. The integrated locking mechanisms of the gooseballs may allow for ease in selectively engaging and disengaging the gooseball from the gooseneck hitch by a user while ensuring secure attachment of the gooseball to the gooseball hitch to facilitate towing of a load attached to the gooseneck hitch by the gooseball.

4 Claims, 60 Drawing Sheets

LOCKING GOOSEBALLS

CROSS REFERENCE TO RELATED APPLICATIONS

This application claims priority to Provisional Application No. 62/987,054 filed on Mar. 9, 2020 and entitled "Locking Gooseballs," which is incorporated herein by reference.

TECHNICAL FIELD

The present disclosure relates to towing components and systems, and, more particularly, to locking gooseballs that are used in gooseneck hitch systems.

BACKGROUND

Vehicles are often used and designed to transport a variety of cargo or freight, including goods, merchandise, personal property, trailers, campers, other vehicles, and the like. In order to increase the capacity of transport, and thereby minimize transport costs, hitch assemblies and coupling devices may be utilized to connect a towed vehicle to a towing vehicle. In an example, a pick-up truck, towing truck, or cab may tow a trailer, camper, boat, or other vehicle. Some of the most common types of hitch assemblies and coupling devices may include gooseneck hitches, fifth wheel hitches, front mounts, underbed mounts, and the like.

Generally, gooseneck hitches may include a hitch ball secured to the towing vehicle and a coupling mechanism on the towed vehicle, where the coupling mechanism is configured to engage or mount over the hitch ball and thereby allow for the towed vehicle to attach to and pivot behind the towing vehicle as it is towed. In particular, a gooseneck hitch may include a mounting plate or cross bar configured to connect to the frame of a truck or towing vehicle, a receptacle or receiver assembly in the mounting plate configured to receive a hitch ball, and a hitch ball operatively connected to the receptacle and configured to engage a coupling member of a trailer or towed vehicle. An opening in the bed of the truck or towing vehicle may be aligned with the receptacle in the mounting plate to allow the hitch ball to connect to the receptacle through the opening in the truck bed.

The hitch balls may be removable or retractable. For example, when the hitch is not in use, the hitch ball may be removed or retracted so as not to obstruct other use of the towing vehicle, such as use of the trunk or bed of the vehicle or so as not to increase the profile of the towing vehicle if, for example, the hitch ball is located on the rear of the vehicle. The hitch ball may also be removed or retracted for any other reason, including aesthetics, attachment of a different device or towing of another vehicle, and the like. As a result, it may be desirable to remove the hitch ball from the hitch receiver assembly when a towed vehicle is not being towed by the towing vehicle or to otherwise not have the hitch ball extending from the rear or from the bed of the towing vehicle when the gooseneck hitch is not in use.

Different hitch balls may be utilized with a single gooseneck hitch. For example, it may be desirable to use a hitch ball of a certain size, material, towing capacity, engagement and the like, depending on the type and weight of load being towed and the travel or road conditions.

During use of the gooseneck hitch or hitch ball, significant forces may be applied to the system as the towing vehicle is connected to a towed vehicle. For example, the weight of the towed vehicle may amount to more than 5,000 pounds. Additionally, the gooseneck hitch and hitch ball may undergo significant stress during towing, such as during turns, pivoting, changes in direction, uneven roads, and the like. As a result, the gooseneck hitch, and in particular the selective attachment between hitch ball and the hitch receiver assembly must be secure so as to assure proper and safe towing of a load.

SUMMARY

Disclosed are gooseballs with various integrated locking mechanisms. The gooseballs are capable of being utilized in gooseneck hitches and other hitch assemblies or coupling devices that use a hitch ball. The integrated locking mechanisms of the gooseballs may allow for ease in selectively engaging and disengaging the gooseball from the gooseneck hitch by a user while ensuring secure attachment of the gooseball to the gooseball hitch to facilitate towing of a load attached to the gooseneck hitch by the gooseball.

Provided is a gooseball. The gooseball may comprise a rounded head, a base, and a locking mechanism. The head may be configured to selectively engage with a coupler. The base may be configured to selectively insert into a hitch mount. The base may include retention projection that selectively extends outside of the base in a locked position and retracts into the base in an unlocked position. The locking mechanism may selectively transition the retention projection between the locked position and the unlocked position.

In an embodiment, the locking mechanism may comprise a handle disposed perpendicularly to an axis defined by the length of the gooseball, an internal shuttle that attaches to the handle and traverses a body of the gooseball, and an actuator. The actuator may selectively rotate the handle and internal shuttle perpendicularly about the axis defined by the length of the gooseball to selectively engage and disengage the retention projection between the locked position and the unlocked position.

In an embodiment, the locking mechanism may comprise a handle and an internal cam that attaches to the handle and traverses a body of the gooseball. The handle may be selectively rotatable about an axis defined by the internal cam to selectively engage and disengage the retention projection between the locked position and the unlocked position.

In an embodiment, the locking mechanism may comprise a switch having a first portion that extends exteriorly from a body of the gooseball and a second portion that extends into the interior of the body of the gooseball and attaches to an internal cam. The switch may be selectively moveable from a first position to a second position to selectively engage and disengage the retention projection between the locked position and the unlocked position.

In an embodiment, the locking mechanism may comprise a button that is selectively depressible into a body of the gooseball. The button may be depressible from a first position outside of the body of the gooseball to a second position inside the body of the gooseball to selectively engage and disengage the retention projection between the locked position and the unlocked position.

In an embodiment, the locking mechanism may comprise at least one arm that is selectively extendable from and releasable into a body of the gooseball. The at least one arm may be rotatable from a first position inside of the body of the gooseball to a second position outside the body of the gooseball to selectively engage and disengage the retention projection between the locked position and the unlocked position.

In an embodiment, the locking mechanism may comprise at least one latch that attaches to a body of the gooseball. The latch may be moveable from a first position outside of the body of the gooseball to a second position outside of body of the gooseball to selectively engage and disengage the retention projection between the locked position and the unlocked position.

In an embodiment, the locking mechanism may comprises at least one arm having a first portion that extends exteriorly from a body of the gooseball and a second portion that extends into the interior of the body of the gooseball and attaches to an internal cam. The at least one arm may be selectively rotatable perpendicularly about an axis defined by a length of the gooseball. The at least one arm may be selectively rotatable up to 90° selectively engage and disengage the retention projection between the locked position and the unlocked position.

In an embodiment, the retention projection may be a partial ring having a first end and a second end, wherein the partial ring circumscribes the base. In an embodiment, the partial ring may have a larger circumference than a circumference of the base in the locked position and may have a smaller circumference than the circumference of the base in the unlocked position. In an embodiment, the first end and the second end of the partial ring may be nearer each other in the locked position and may be further apart from each other in the unlocked position.

Provided is a gooseball. The gooseball may comprise a rounded head, a base, and a locking mechanism. The head may be configured to selectively engage with a coupler. The base may be configured to selectively insert into a hitch mount. The base may include at least one extendable and retractable bearing that is configured to lock the base into the hitch mount when in an extended position. The locking mechanism may selectively lock the bearing in the extended position, wherein the locking mechanism includes at least one rotational handle.

In an embodiment, the locking mechanism may comprise a handle disposed perpendicularly to an axis defined by the length of the gooseball, an internal shuttle that attaches to the handle and traverses a body of the gooseball, and an actuator. The actuator may selectively rotate the handle and internal shuttle perpendicularly about the axis defined by the length of the gooseball to selectively engage and disengage the retention projection between the locked position and the unlocked position.

In an embodiment, the locking mechanism may comprise a handle and an internal cam that attaches to the handle and traverses a body of the gooseball. The handle may be selectively rotatable about an axis defined by the internal cam to selectively engage and disengage the retention projection between the locked position and the unlocked position.

In an embodiment, the locking mechanism may comprise a switch having a first portion that extends exteriorly from a body of the gooseball and a second portion that extends into the interior of the body of the gooseball and attaches to an internal cam. The switch may be selectively moveable from a first position to a second position to selectively engage and disengage the retention projection between the locked position and the unlocked position.

In an embodiment, the locking mechanism may comprise a button that is selectively depressible into a body of the gooseball. The button may be depressible from a first position outside of the body of the gooseball to a second position inside the body of the gooseball to selectively engage and disengage the retention projection between the locked position and the unlocked position.

In an embodiment, the locking mechanism may comprise at least one arm that is selectively extendable from and releasable into a body of the gooseball. The at least one arm may be rotatable from a first position inside of the body of the gooseball to a second position outside the body of the gooseball to selectively engage and disengage the retention projection between the locked position and the unlocked position.

In an embodiment, the locking mechanism may comprise at least one latch that attaches to a body of the gooseball. The latch may be moveable from a first position outside of the body of the gooseball to a second position outside of body of the gooseball to selectively engage and disengage the retention projection between the locked position and the unlocked position.

In an embodiment, the locking mechanism may comprises at least one arm having a first portion that extends exteriorly from a body of the gooseball and a second portion that extends into the interior of the body of the gooseball and attaches to an internal cam. The at least one arm may be selectively rotatable perpendicularly about an axis defined by a length of the gooseball. The at least one arm may be selectively rotatable up to 90° selectively engage and disengage the retention projection between the locked position and the unlocked position.

In an embodiment, the retention projection may be a partial ring having a first end and a second end, wherein the partial ring circumscribes the base. In an embodiment, the partial ring may have a larger circumference than a circumference of the base in the locked position and may have a smaller circumference than the circumference of the base in the unlocked position. In an embodiment, the first end and the second end of the partial ring may be nearer each other in the locked position and may be further apart from each other in the unlocked position.

DESCRIPTION OF THE DRAWINGS

The present teachings may be better understood by reference to the following detailed description taken in connection with the following illustrations, wherein.

DETAILED DESCRIPTION

Reference will now be made in detail to embodiments of the present teachings, examples of which are illustrated in the accompanying drawings. It is to be understood that other embodiments may be utilized and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Disclosed are gooseballs with various integrated locking mechanisms. The gooseballs are capable of being utilized in gooseneck hitches and other hitch assemblies or coupling devices that use a hitch ball. The integrated locking mechanisms of the gooseballs may allow for ease in selectively engaging and disengaging the gooseball from the gooseneck hitch by a user while ensuring secure attachment of the gooseball to the gooseball hitch to facilitate towing of a load attached to the gooseneck hitch by the gooseball.

Figure 1:
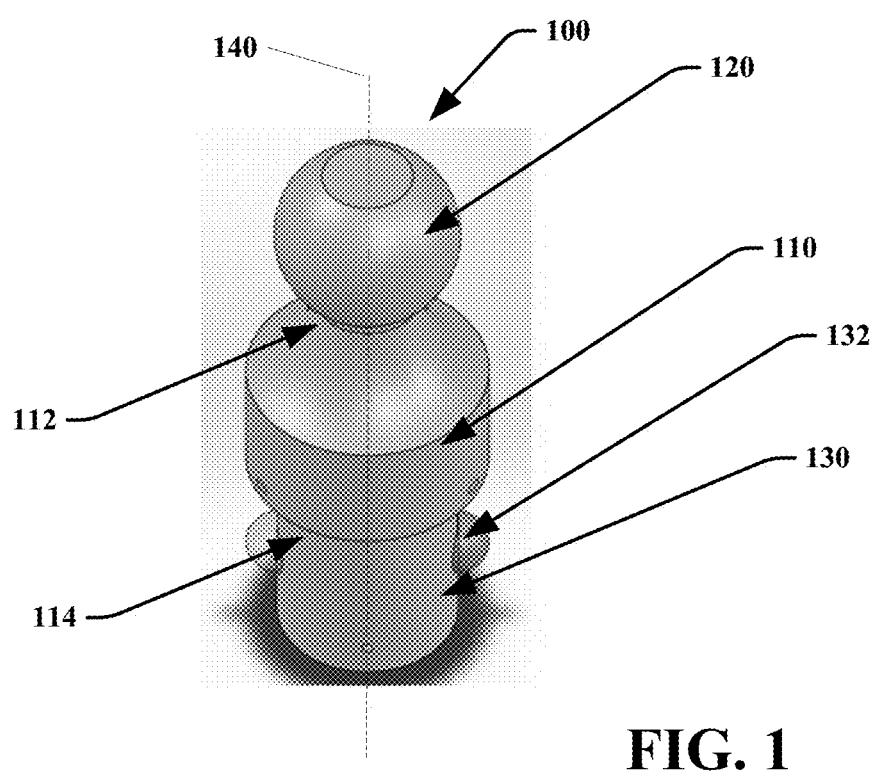
FIG. 1 is a gooseball with a bearing mechanism.

FIG. 1 shows an example of a structure of a gooseball 100 that may be configured with locking mechanisms as shown in FIGS. 3-21. The gooseball 100 may generally comprise a body 110 having a first end 112 and a second end 114, with a head 120 at the first end 112 of the body 110 and a base 130 at the second end 114 of the body 110. The body 110, head 120, and base 130 may align substantially along the same axis 140. The head 120 of the gooseball 100 may selectively insert into or attach to a mating portion 257, 267 of a hitch coupler 255, 265 such as a gooseneck hitch coupling mechanism, located on a towed vehicle. Examples of hitch couplers 255, 265 are shown in FIGS. 2C-D. In an embodiment, the head 120 is generally spherical. The base 130 of the gooseball 100 may be selectively inserted or attach to a receiver assembly 210 of a hitch mount 200, such as a gooseneck hitch mount located on a towing vehicle. Examples of hitch mounts 200 are shown in FIGS. 2C-D. As a part of each locking mechanism described herein in FIGS. 3-21, the gooseball 100 may include a retention projection 132 such as ball bearings, a locking ring, a locking face, or the like in the base 130. The retention projection 132 (ball bearings) may selectively extend from and retract into the base 130 or body 110 of the gooseball 100 between locked and unlocked positions.

Figure 2A:
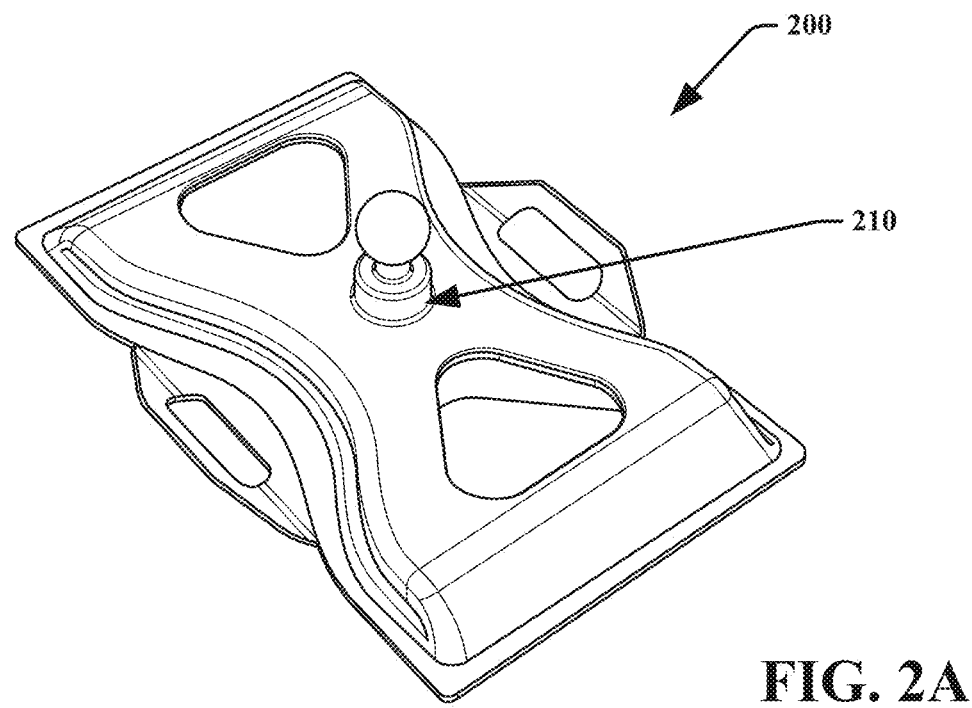
FIGS. 2A-B are examples of hitch mounts that may be used with a gooseball and FIGS. 2C-D are examples of hitch couplers that may be used with a gooseball.
Figure 2B:
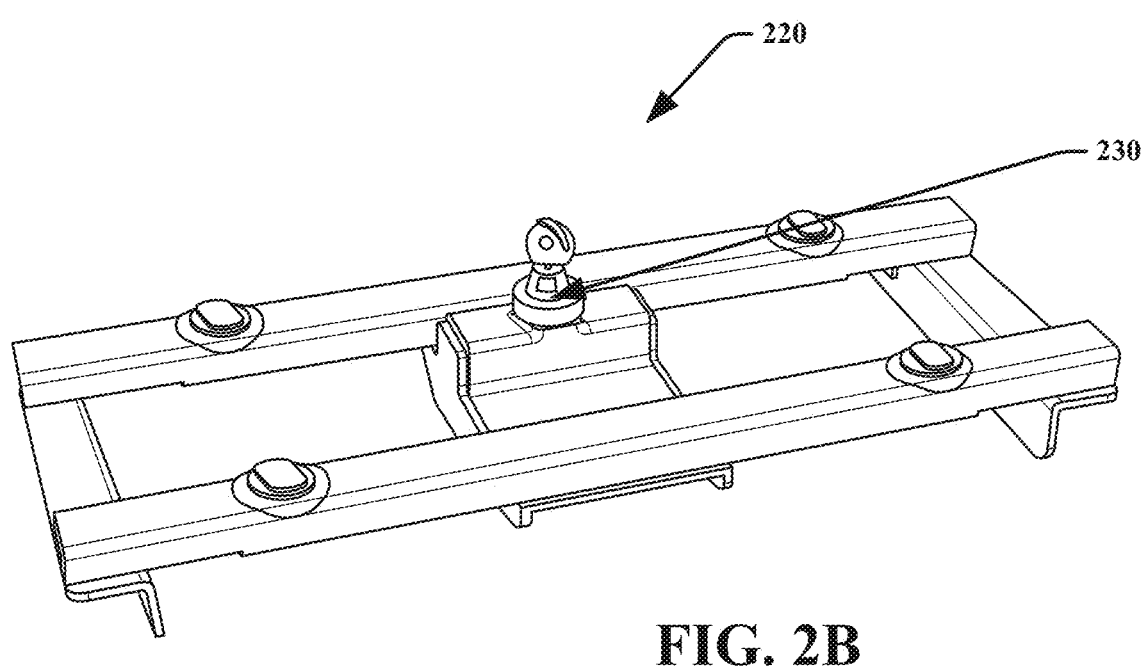
Figure 2C:
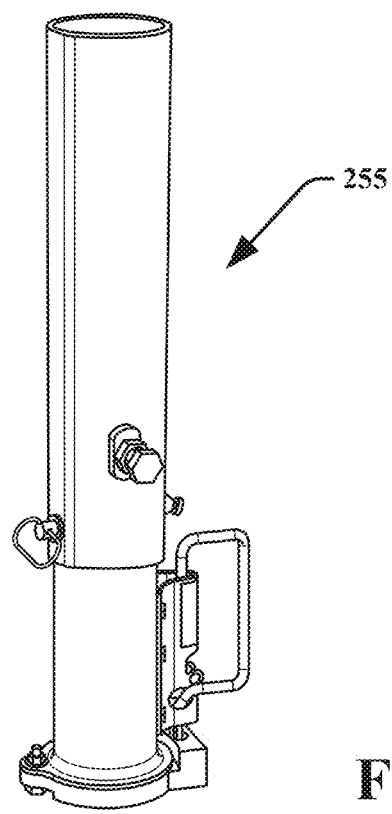
Figure 2D:
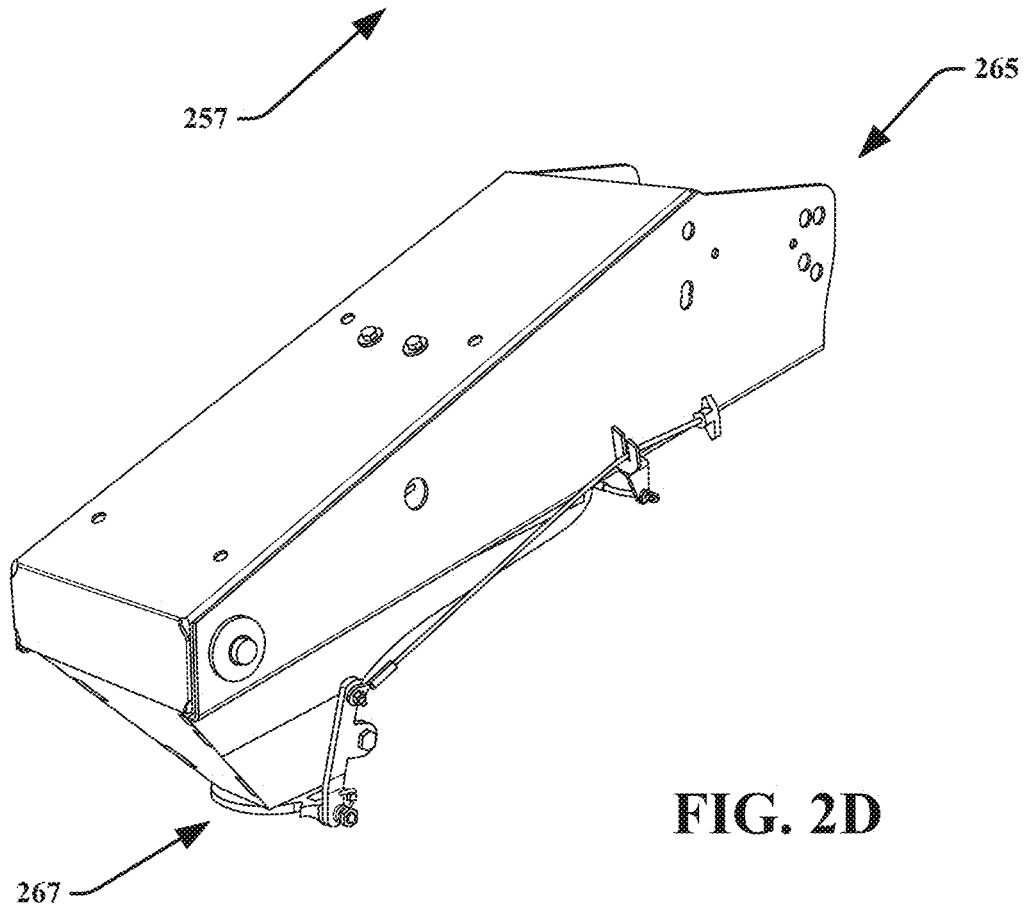
Figure 3A:
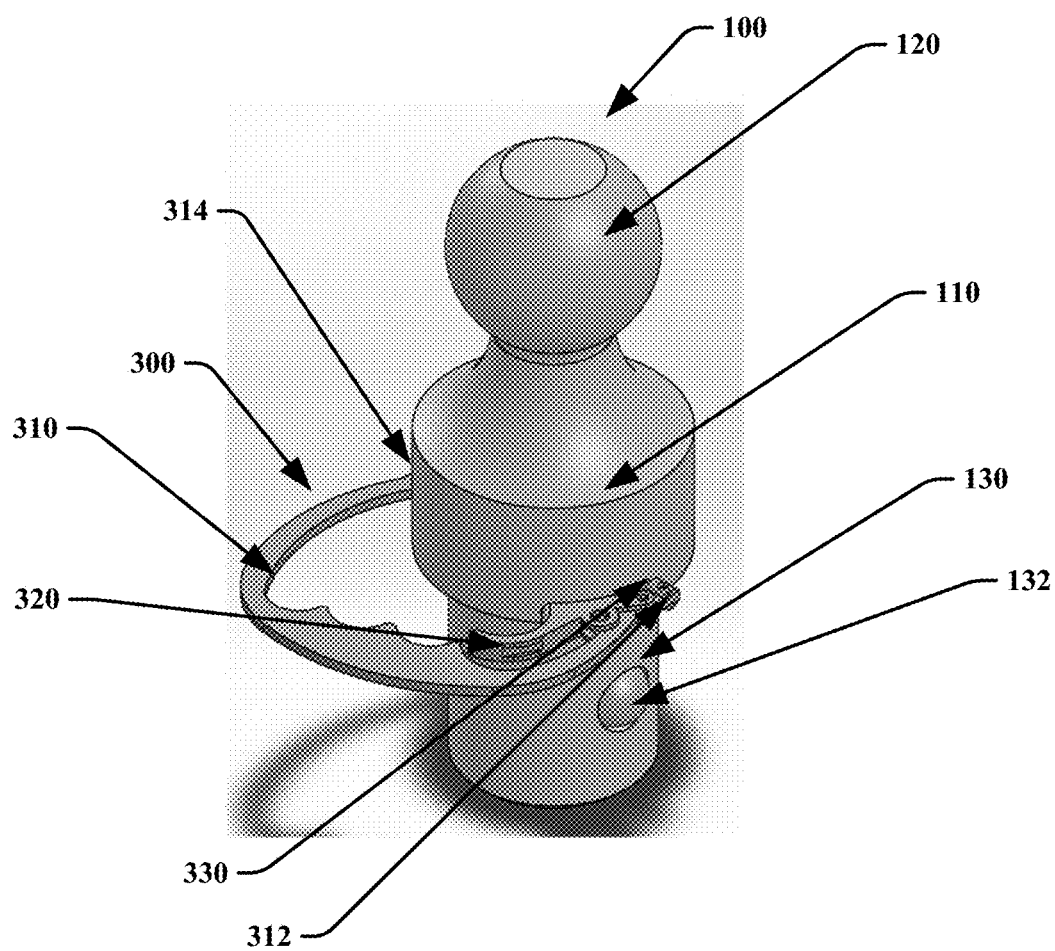
FIGS. 3A-C show an embodiment of a gooseball comprising a rotational locking mechanism in a locked position and FIGS. 3D-E show the gooseball in an unlocked position.
Figure 3B:
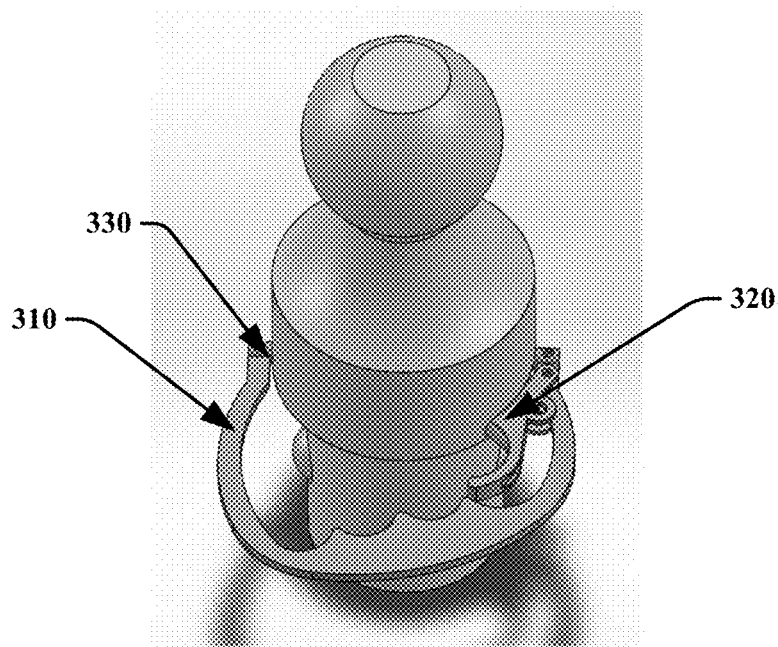
Figure 3C:
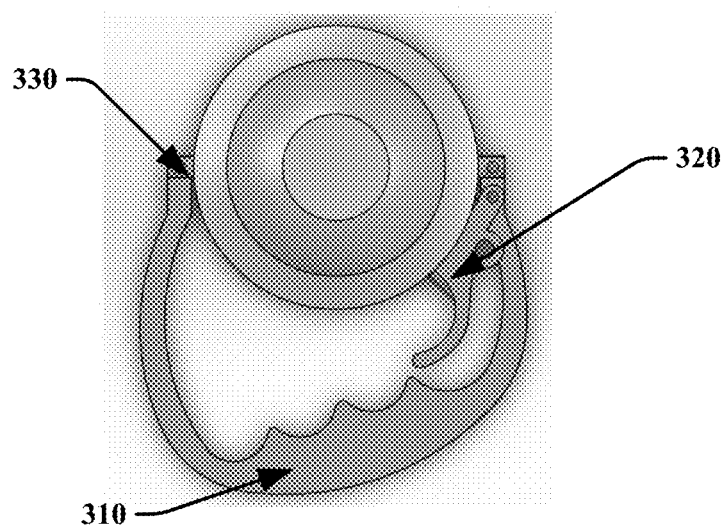
Figure 3D:
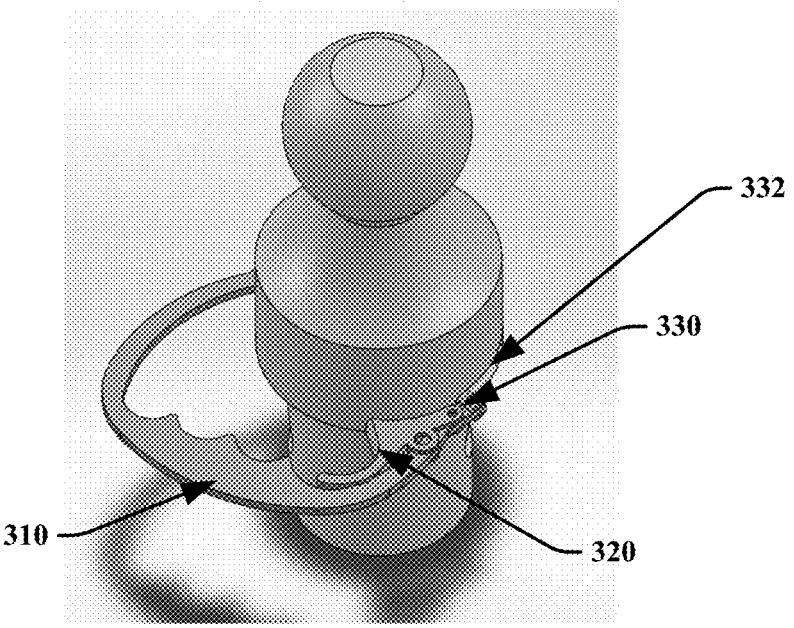
Figure 3E:
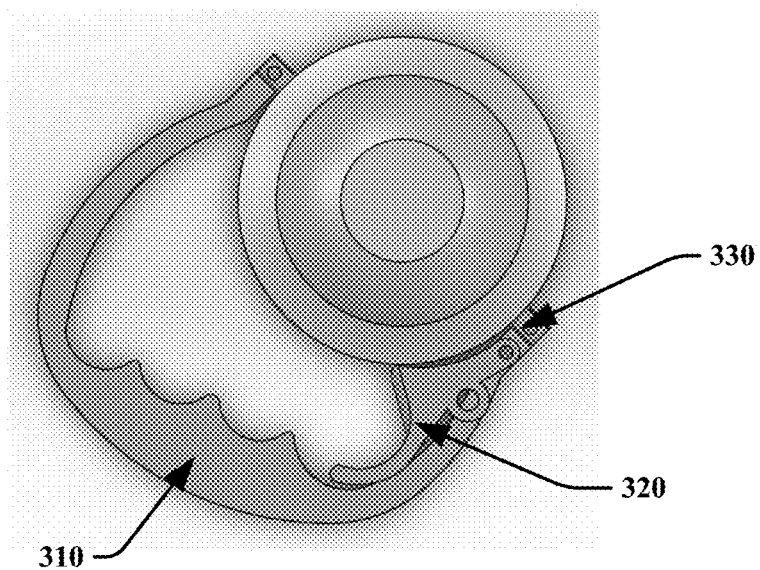
Figure 4A:
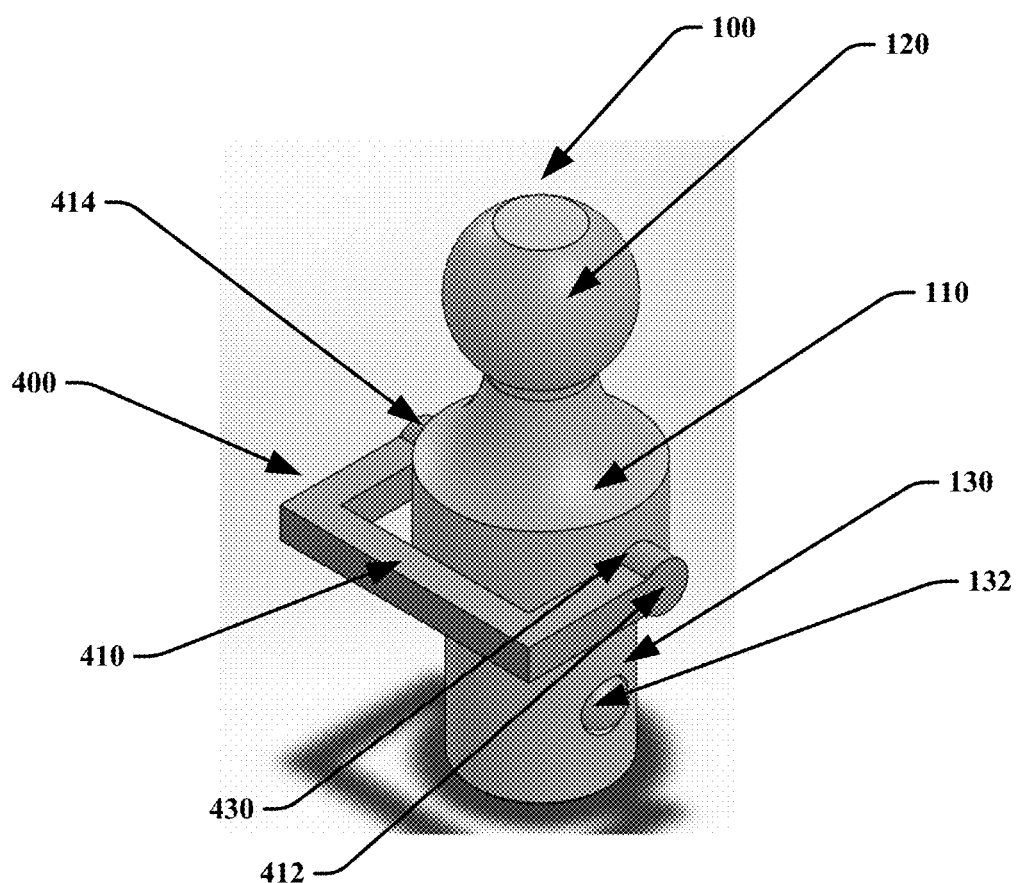
FIGS. 4A-C show an embodiment of a gooseball comprising a lift locking mechanism in a locked position and FIGS. 4D-E show the gooseball in an unlocked position.
Figure 4B:
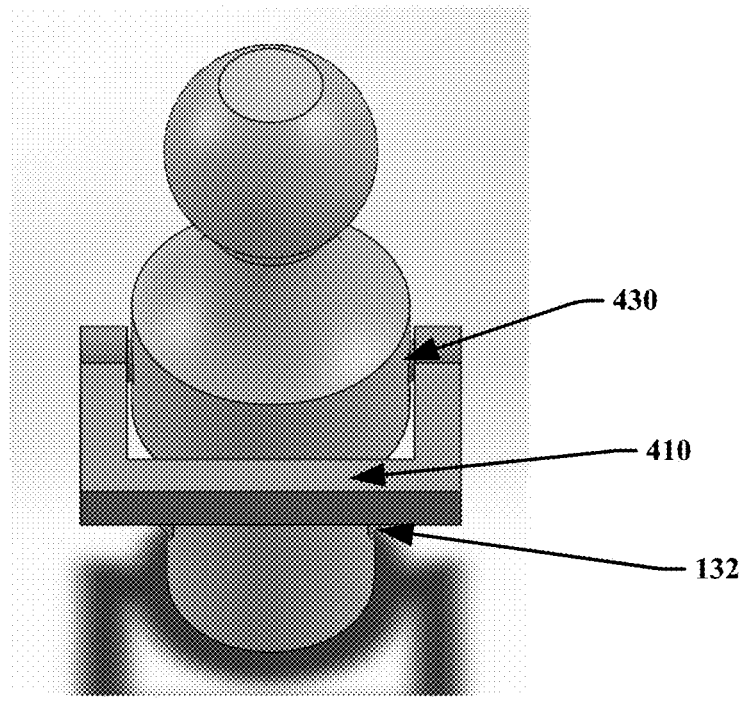
Figure 4C:
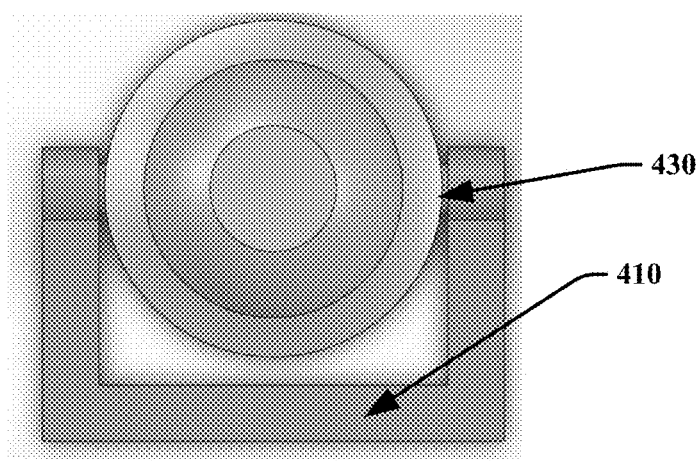
Figure 4D:
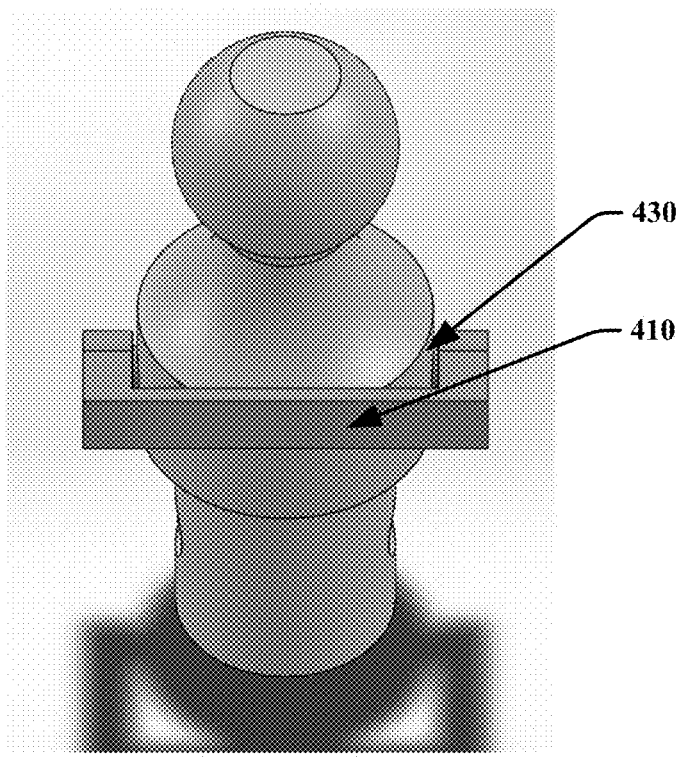
Figure 4E:
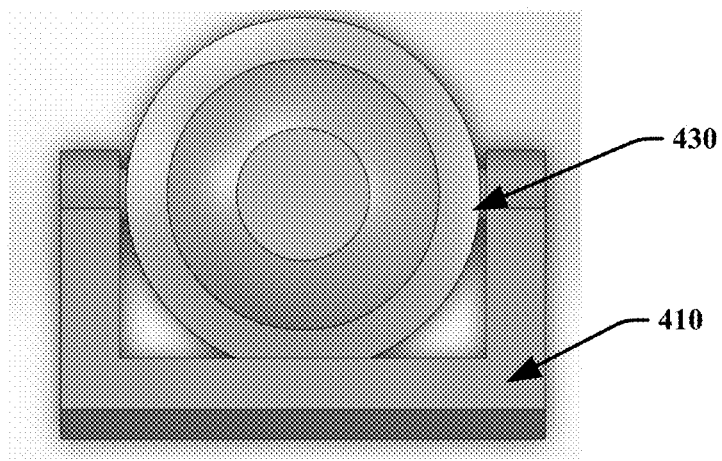
Figure 5A:
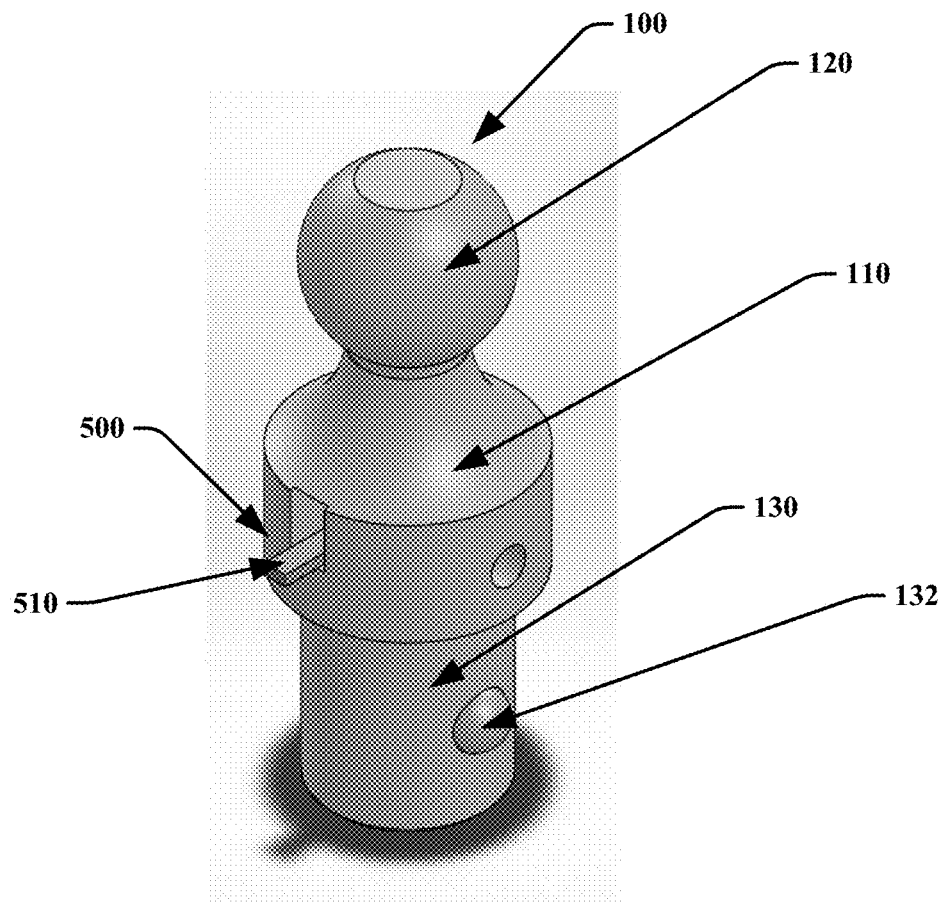
FIGS. 5A-C show an embodiment of a gooseball comprising a pry locking mechanism in a locked position and FIGS. 5D-E show the gooseball in an unlocked position.
Figure 5B:
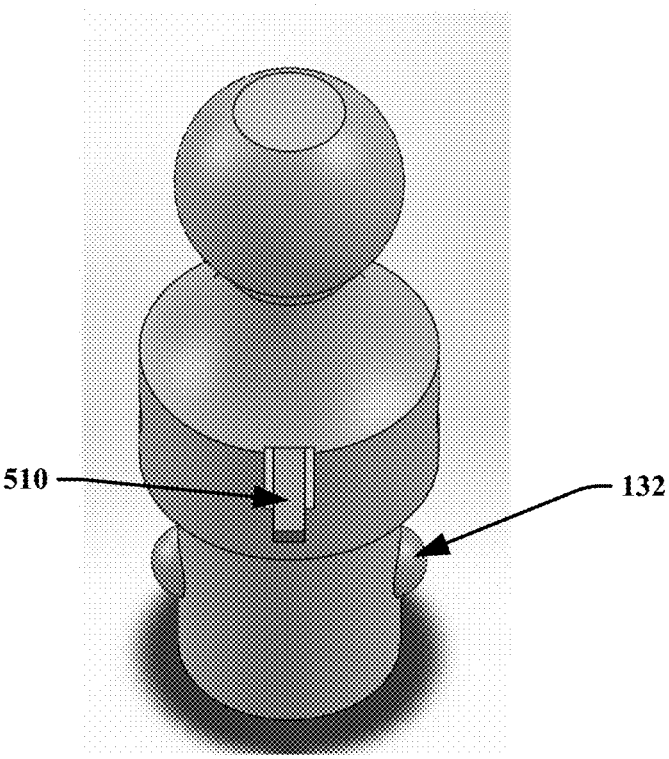
Figure 5C:
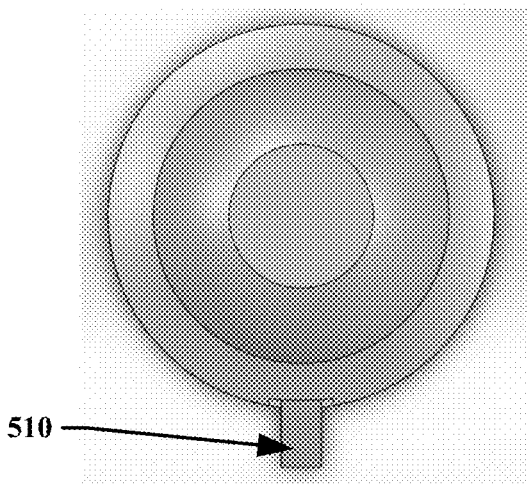
Figure 5D:
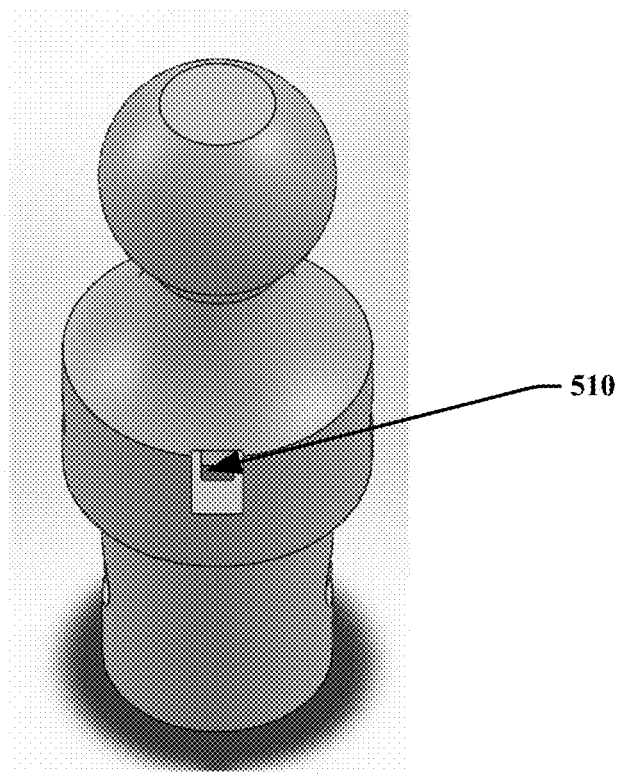
Figure 5E:
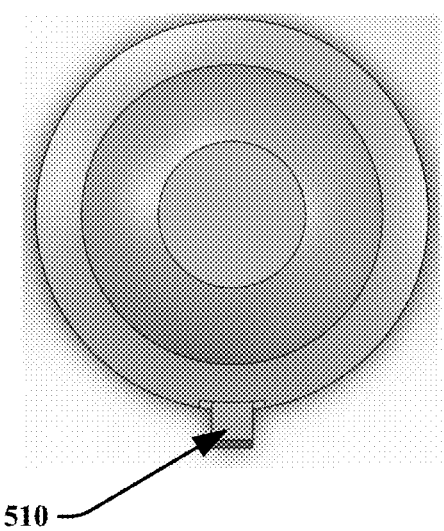
Figure 6A:
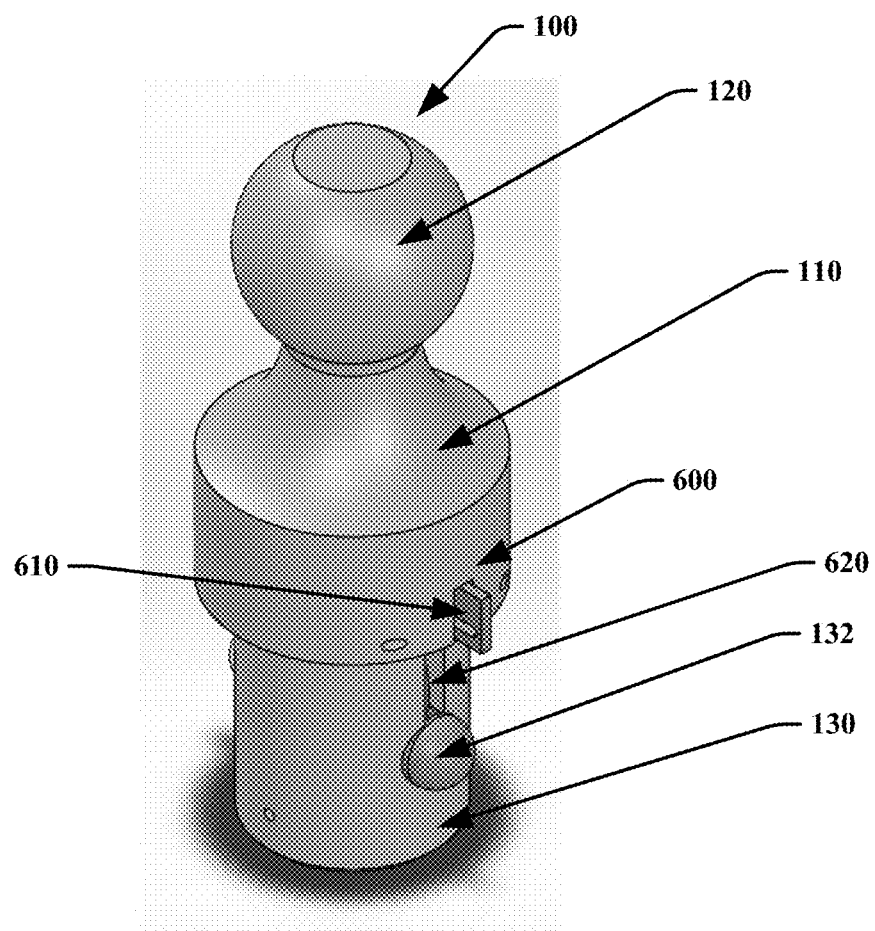
FIGS. 6A-C show an embodiment of a gooseball comprising a plunger locking mechanism in a locked position and FIGS. 6D-E show the gooseball in an unlocked position.
Figure 6B:
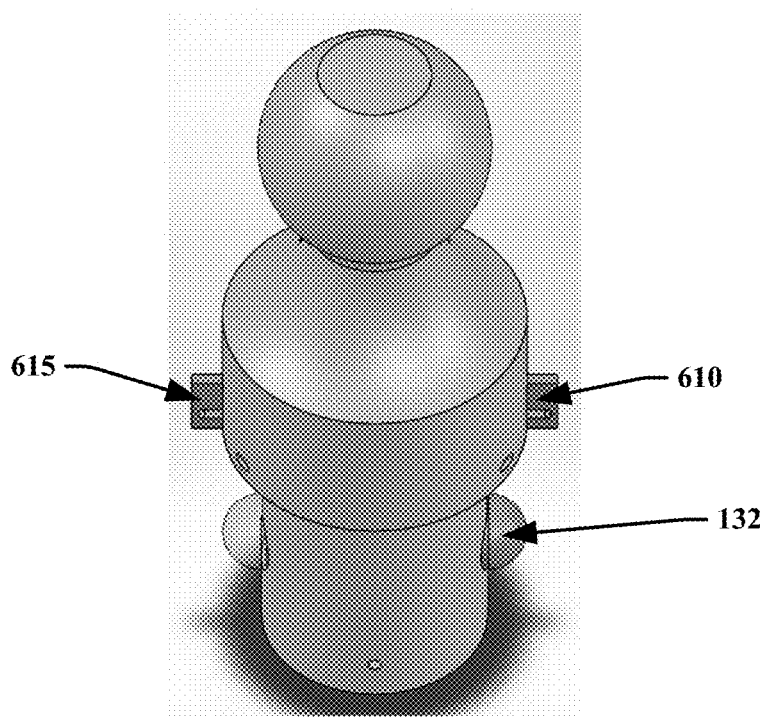
Figure 6C:
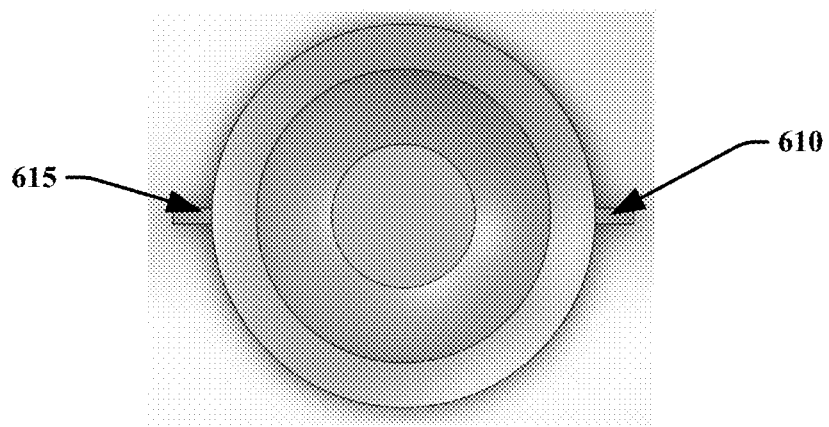
Figure 6D:
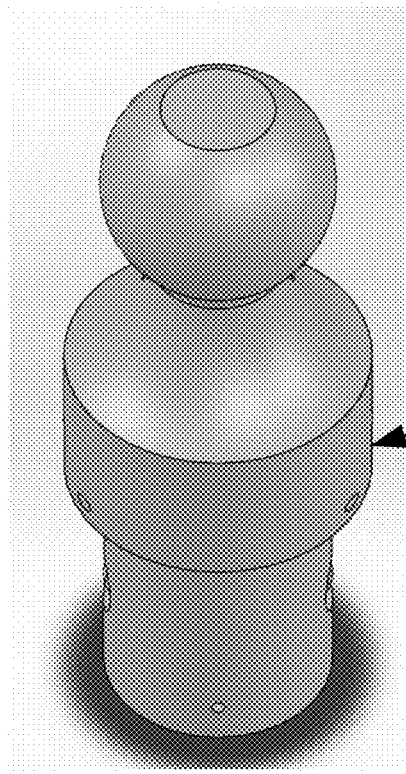
Figure 6E:
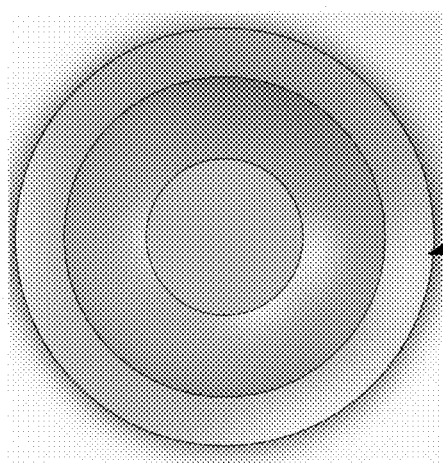
Figure 7A:
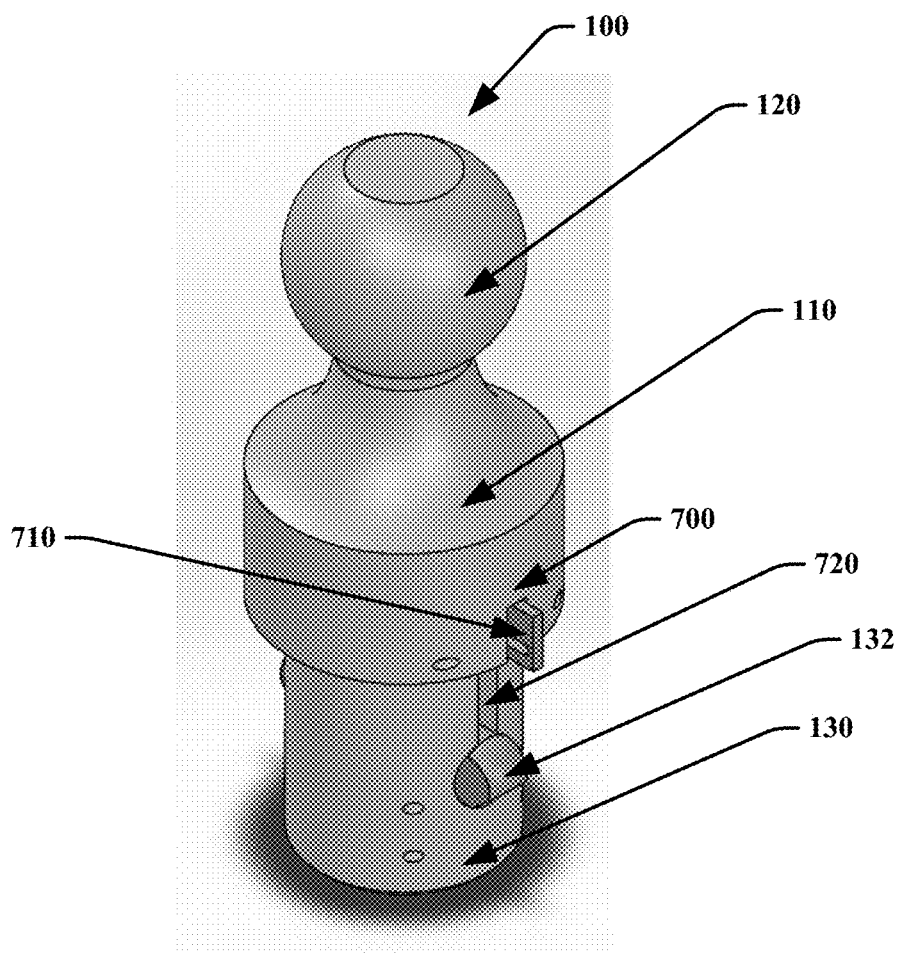
FIGS. 7A-C show an embodiment of a gooseball comprising a flip locking mechanism in a locked position and FIGS. 7D-E show the gooseball in an unlocked position.
Figure 7B:
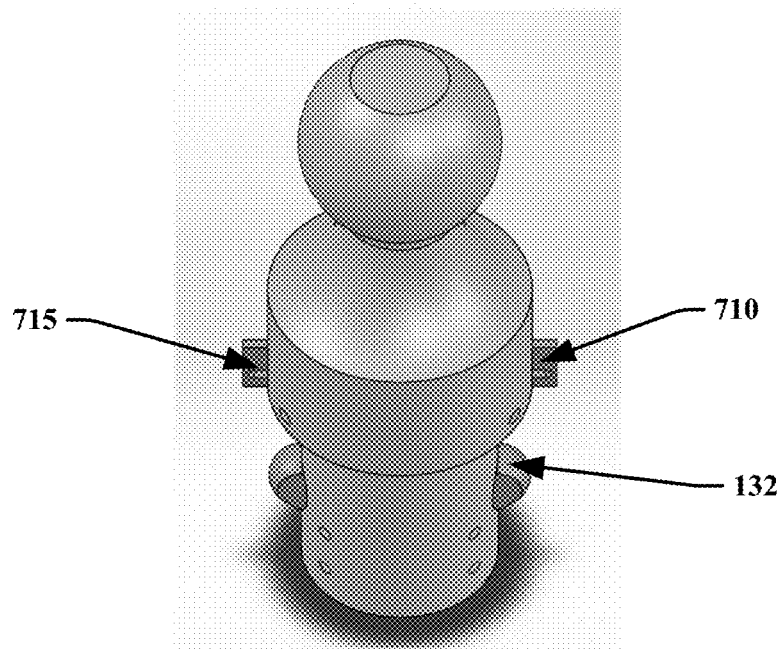
Figure 7C:
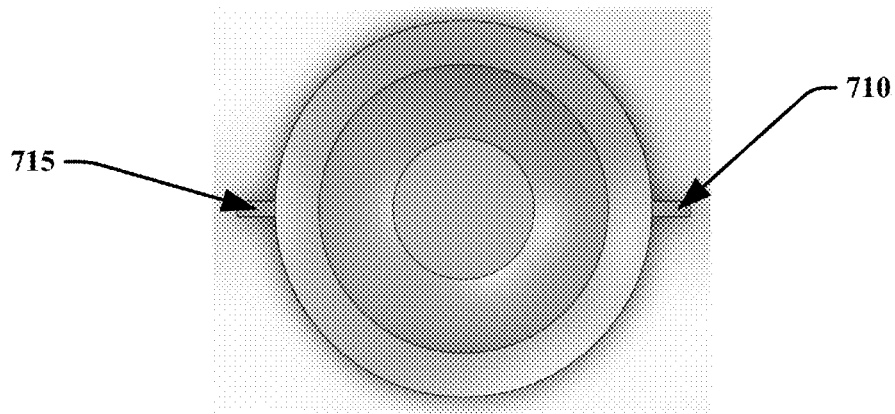
Figure 7D:
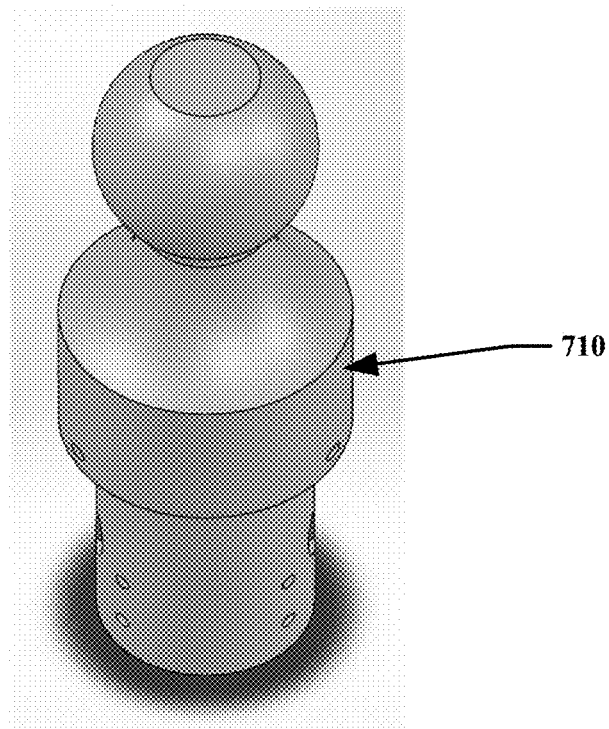
Figure 7E:
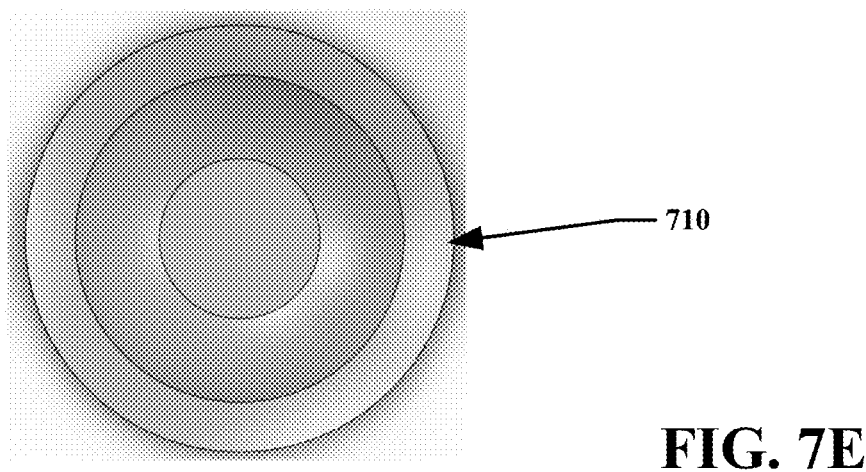
Figure 8A:
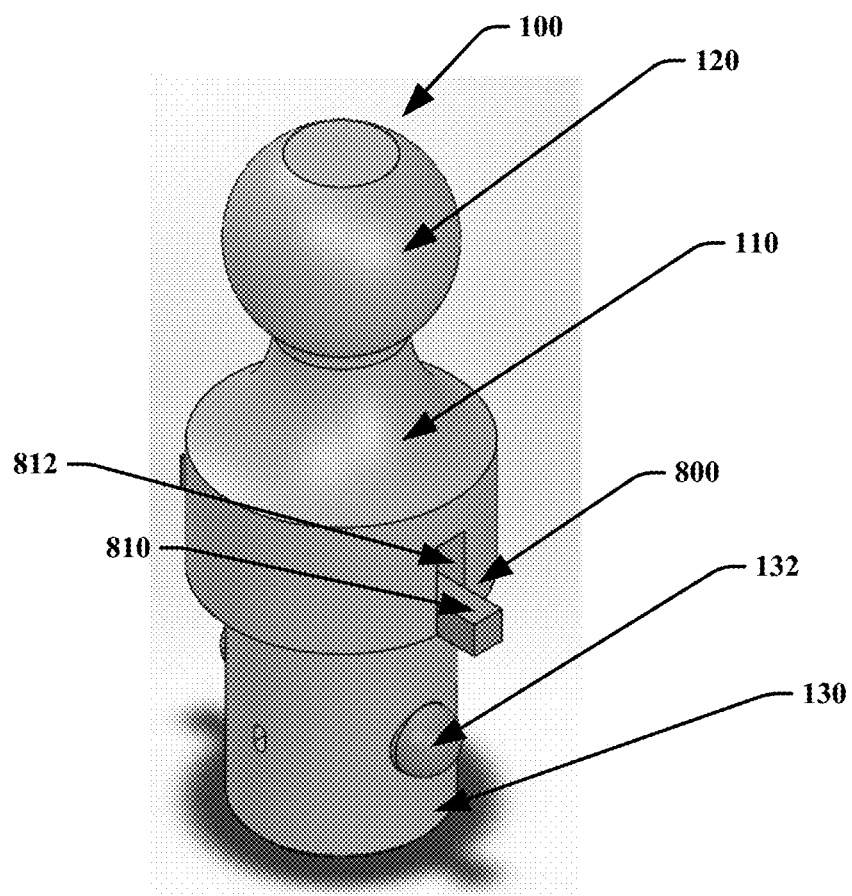
FIGS. 8A-C show an embodiment of a gooseball comprising a vertical slide locking mechanism in a locked position and FIGS. 8D-E show the gooseball in an unlocked position.
Figure 8B:
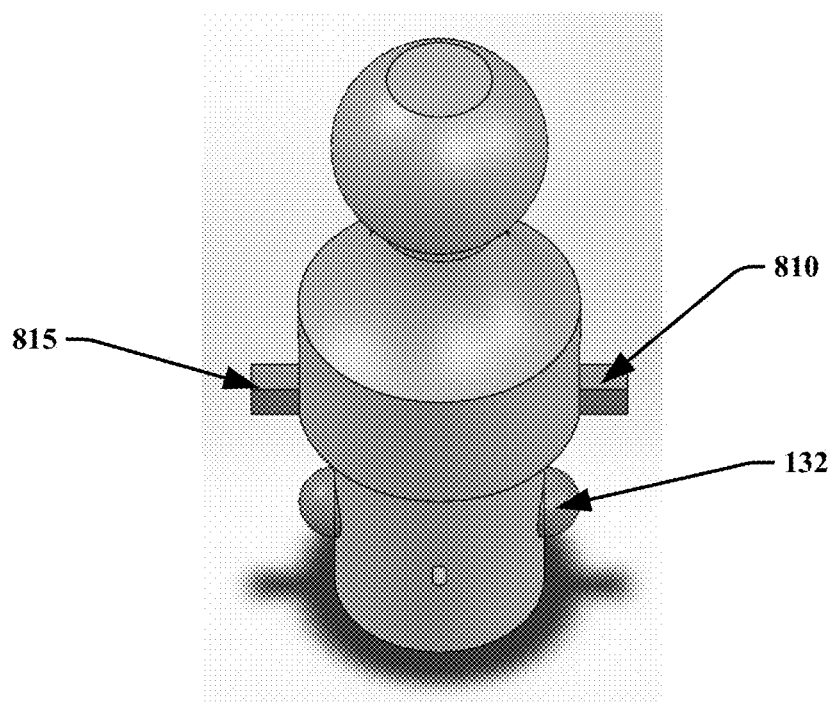
Figure 8C:
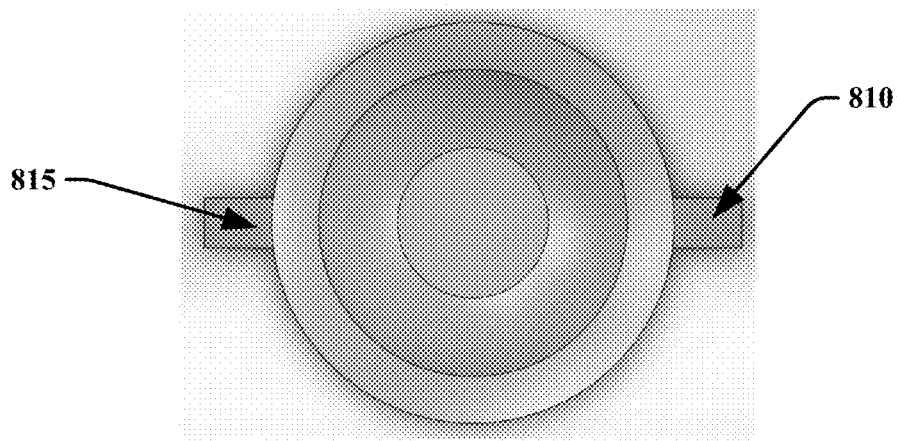
Figure 8D:
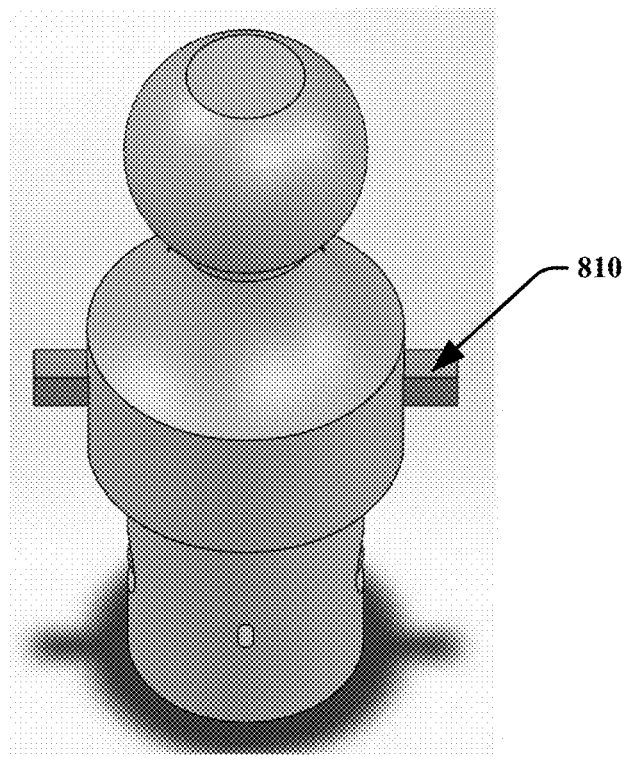
Figure 8E:
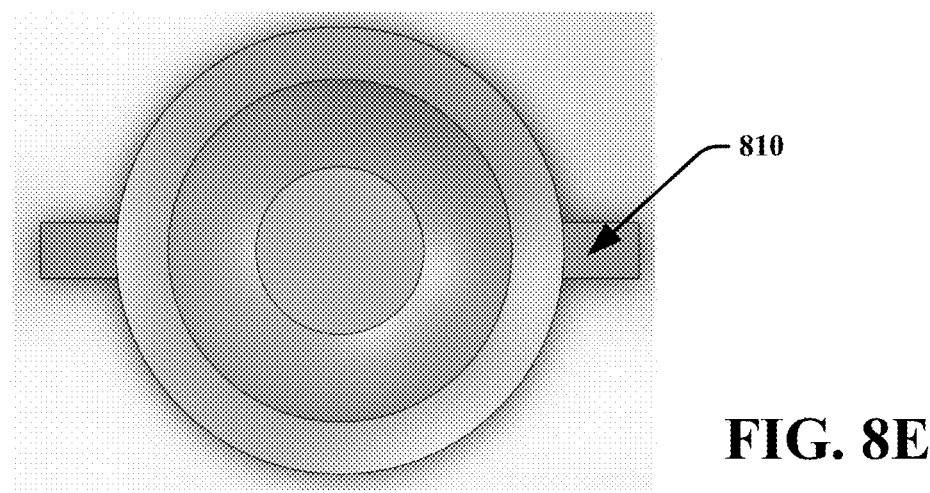
Figure 9A:
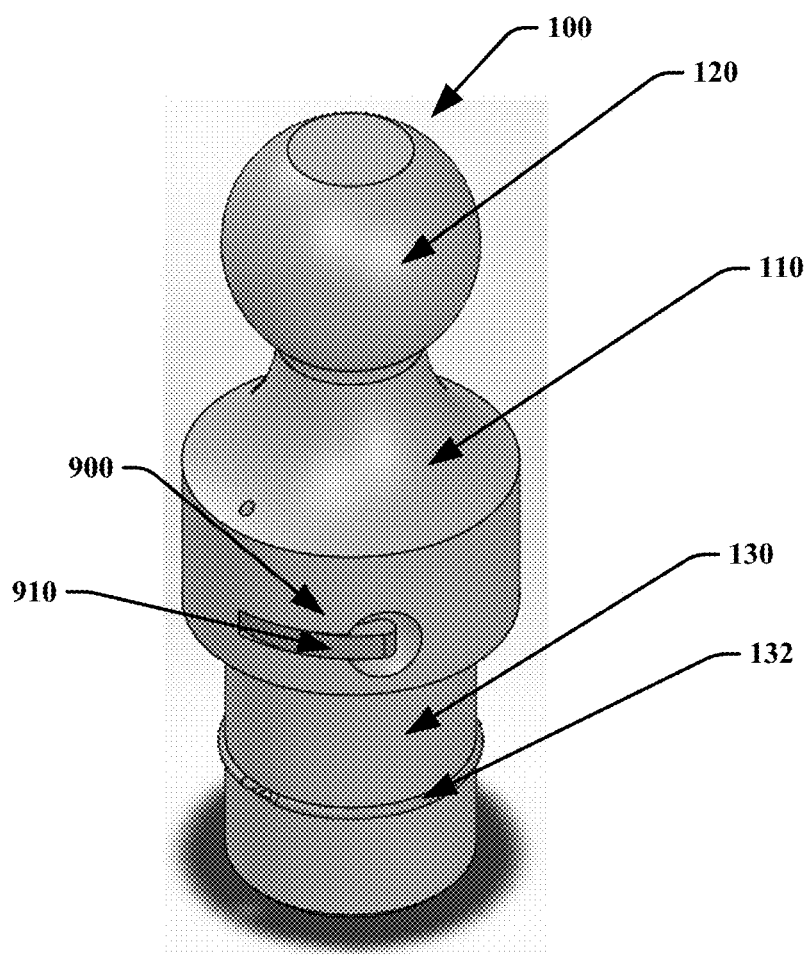
FIGS. 9A-C show an embodiment of a gooseball comprising a first ring locking mechanism in a locked position and FIGS. 9D-E show the gooseball in an unlocked position.
Figure 9B:
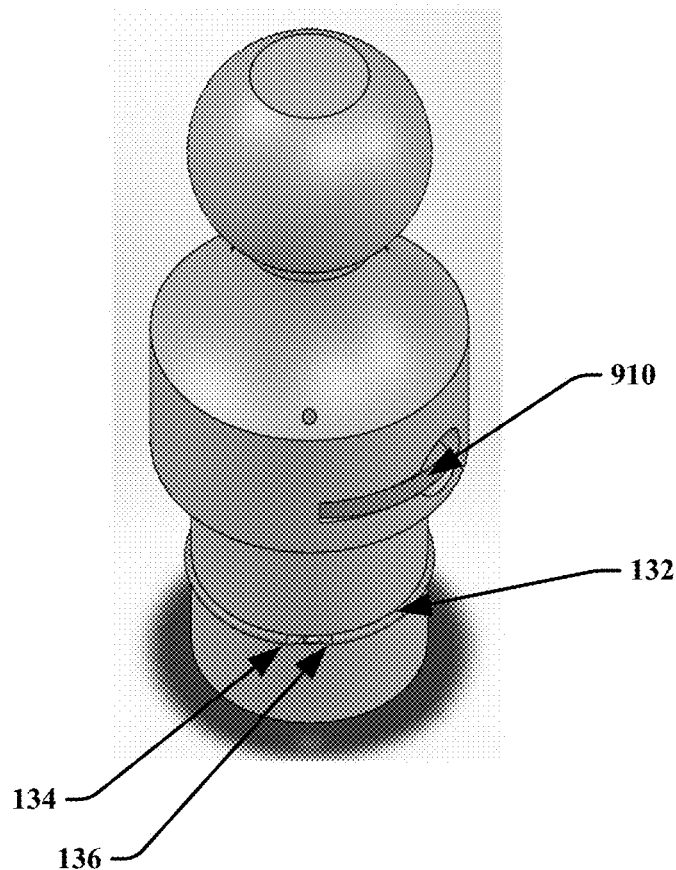
Figure 9C:
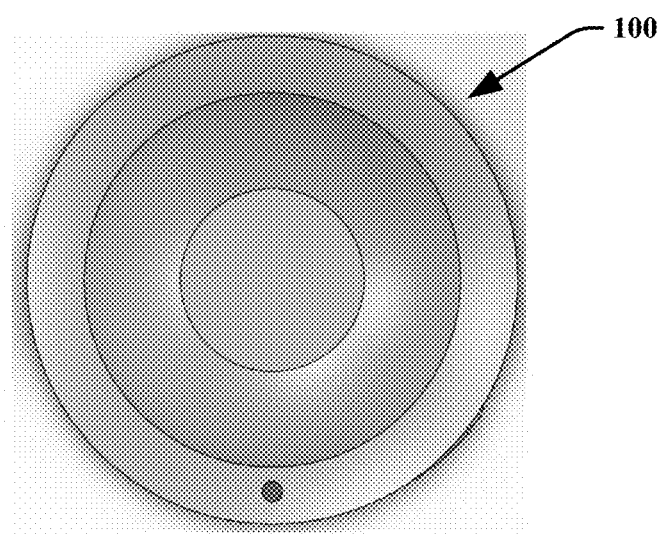
Figure 9D:
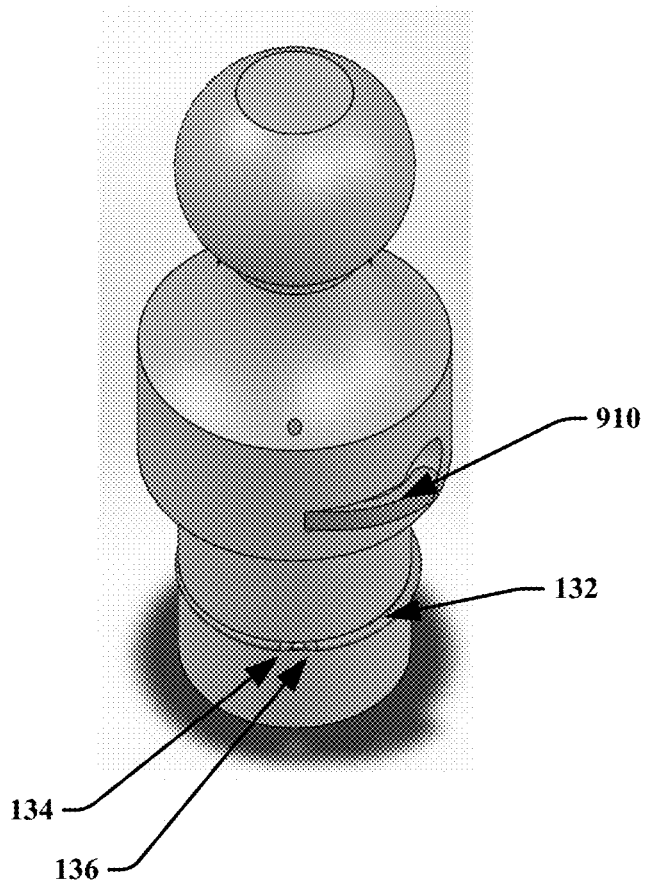
Figure 9E:
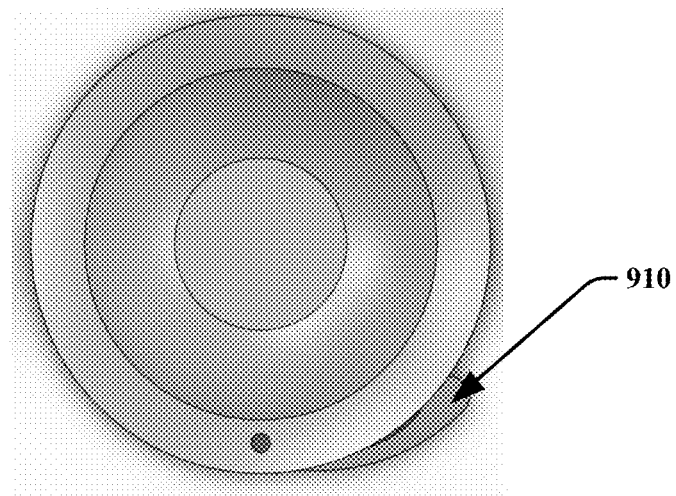
Figure 10A:
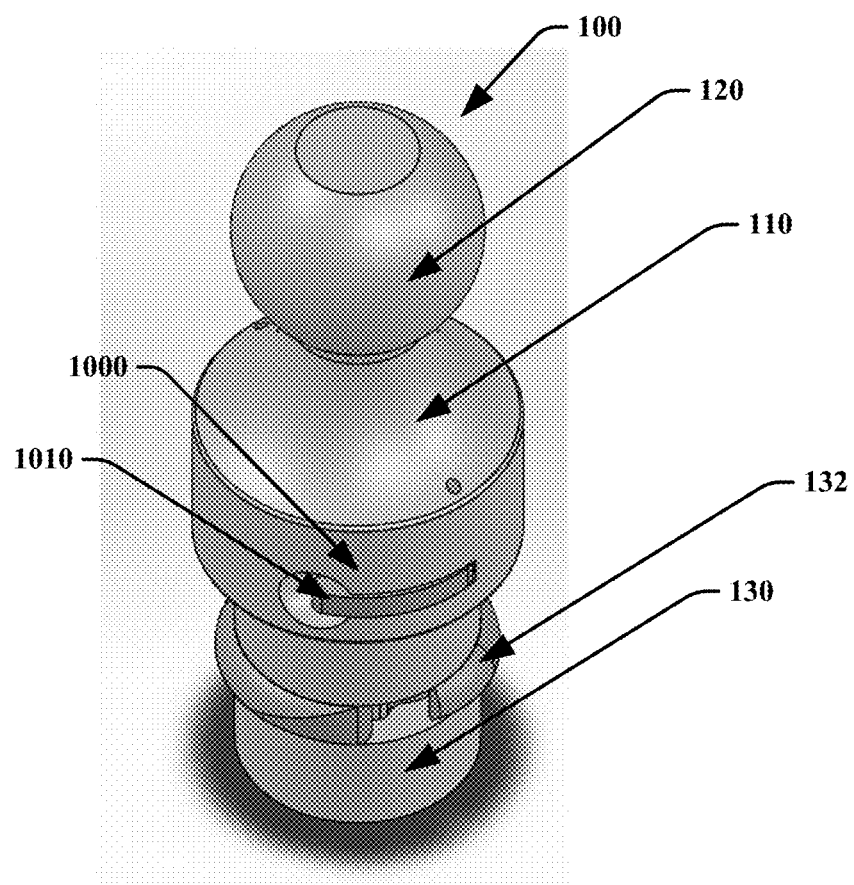
FIGS. 10A-C show an embodiment of a gooseball comprising a second ring locking mechanism in a locked position and FIGS. 10D-E show the gooseball in an unlocked position.
Figure 10B:
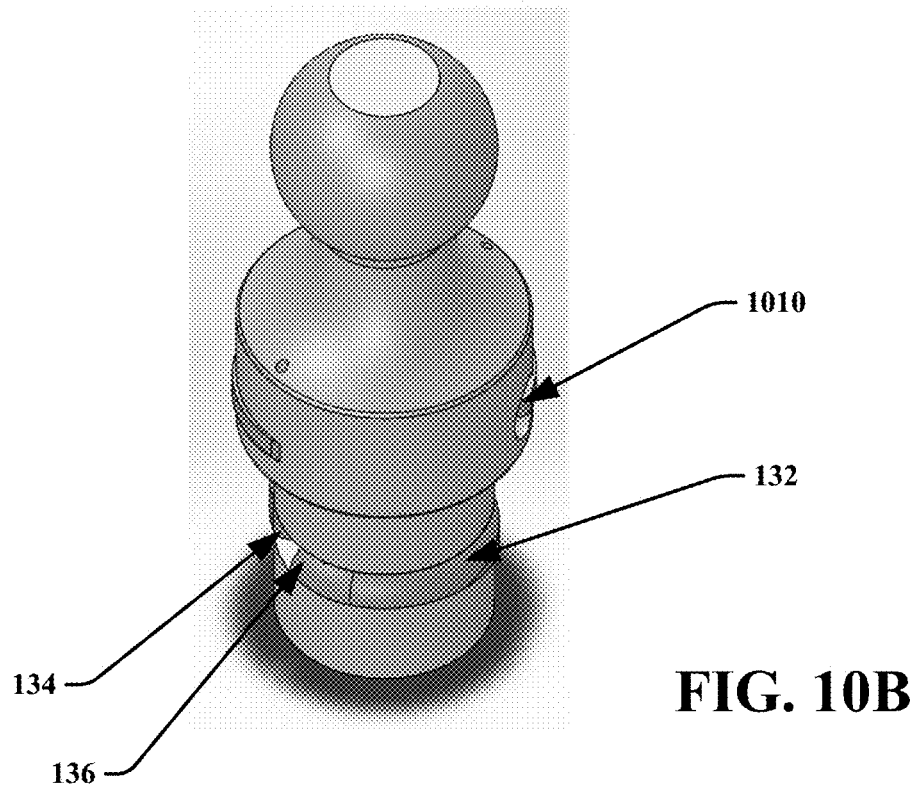
Figure 10C:
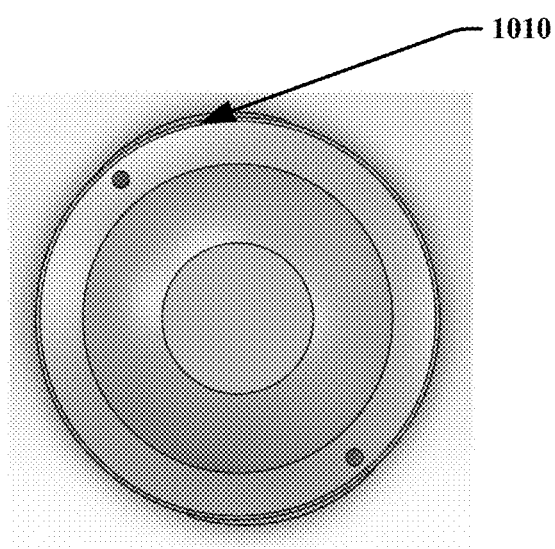
Figure 10D:
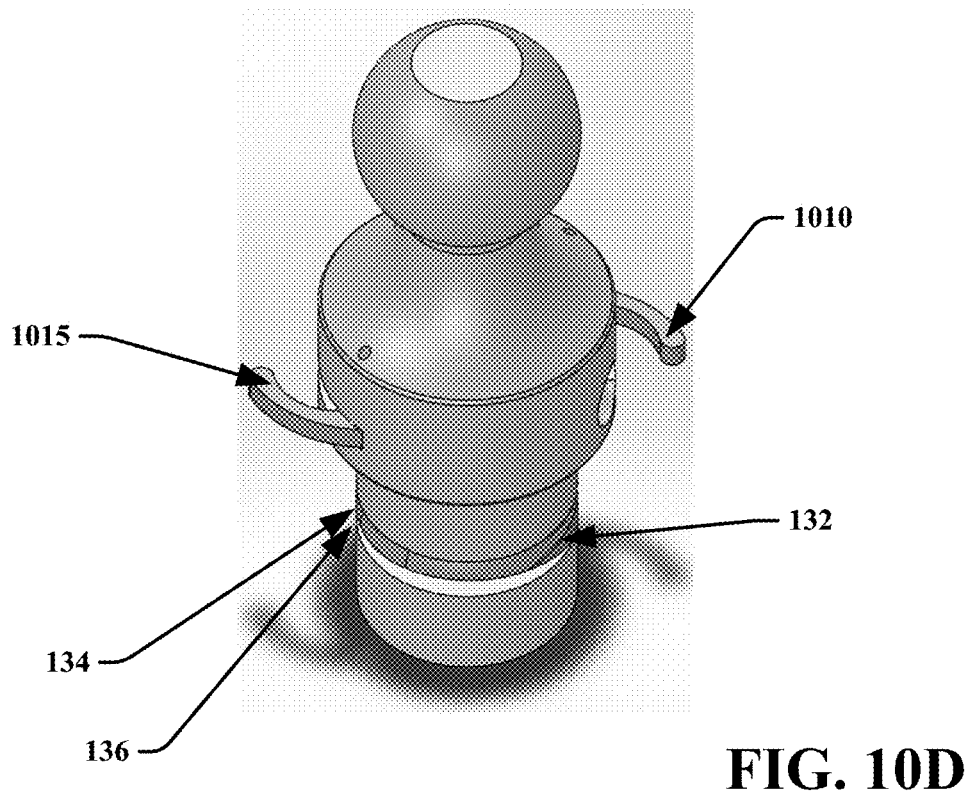
Figure 10E:
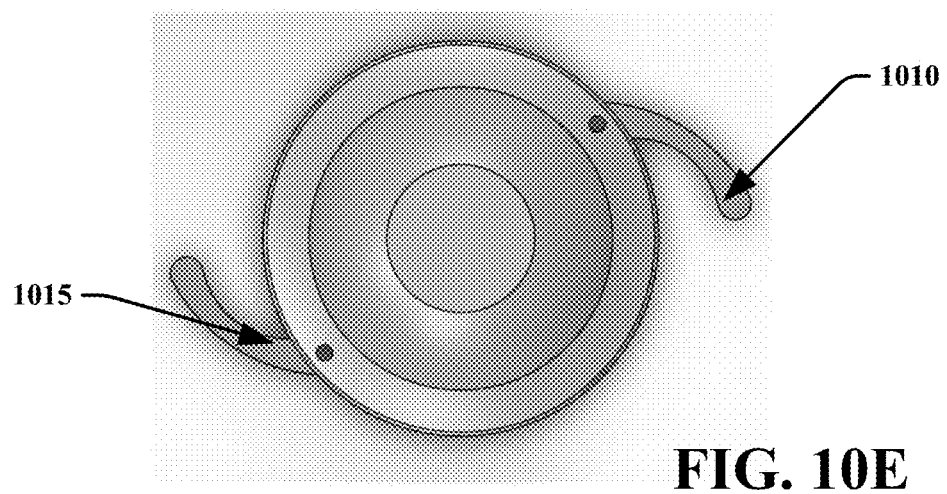
Figure 11A:
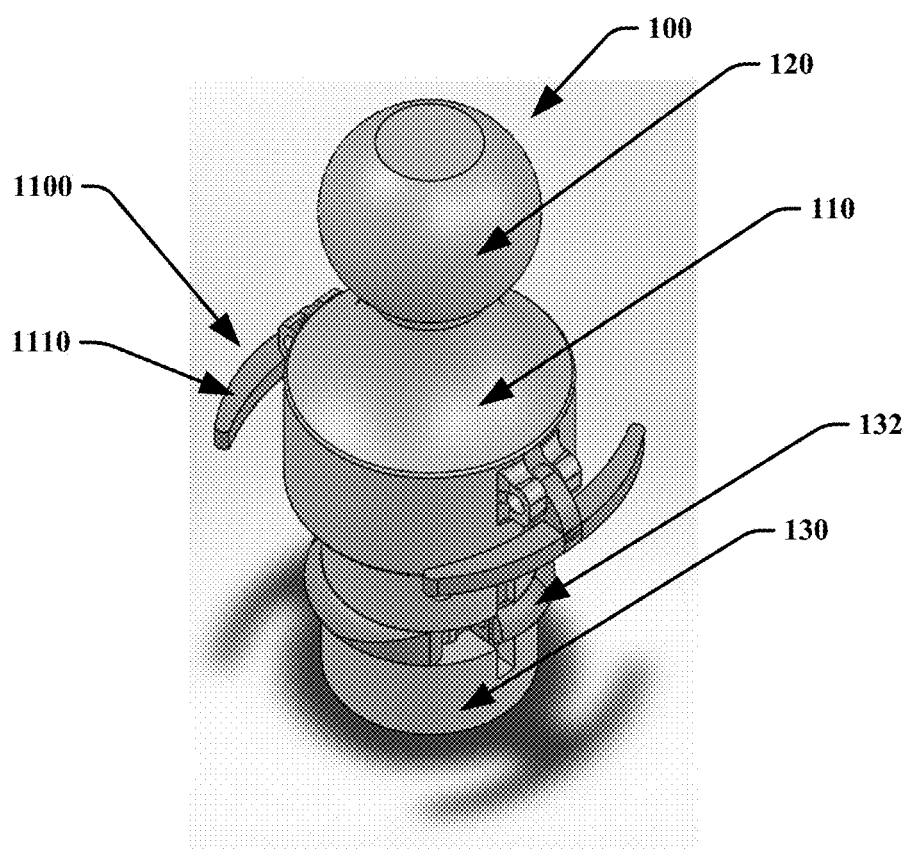
FIGS. 11A-C show an embodiment of a gooseball comprising a third ring locking mechanism in a locked position and FIGS. 11D-E show the gooseball in an unlocked position.
Figure 11B:
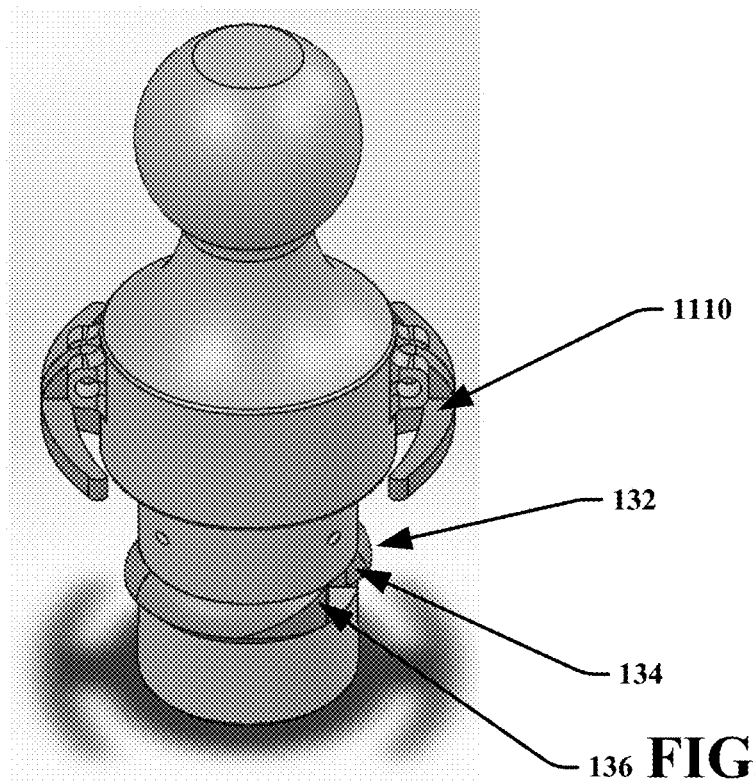
Figure 11C:
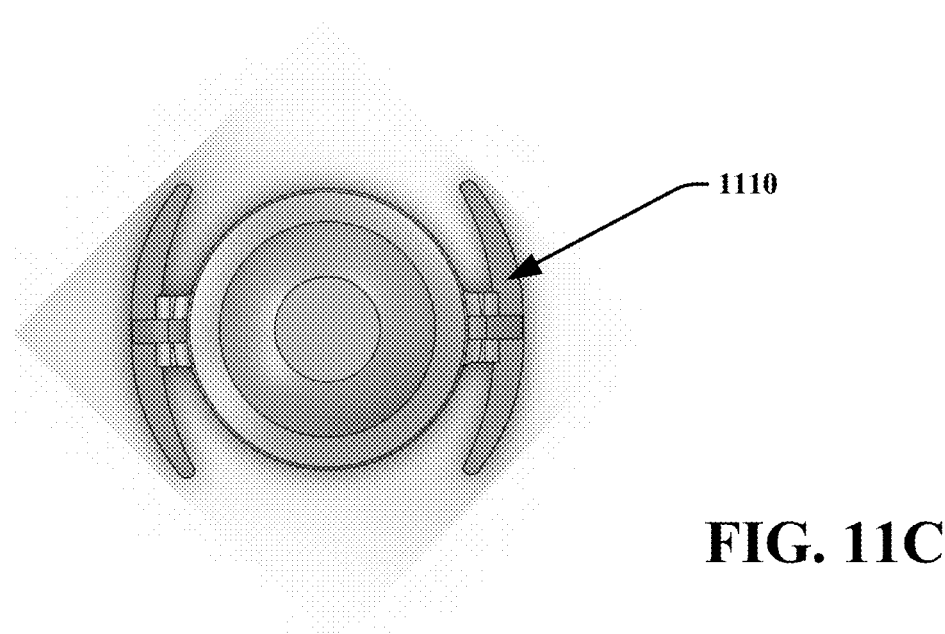
Figure 11D:
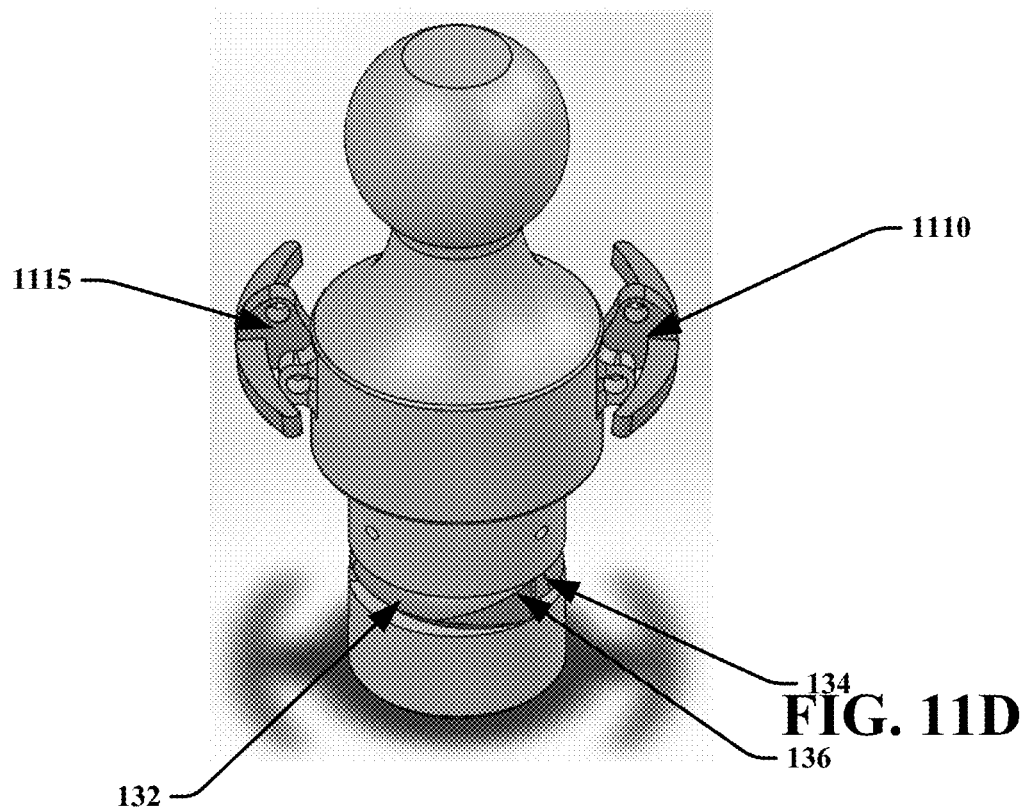
Figure 11E:
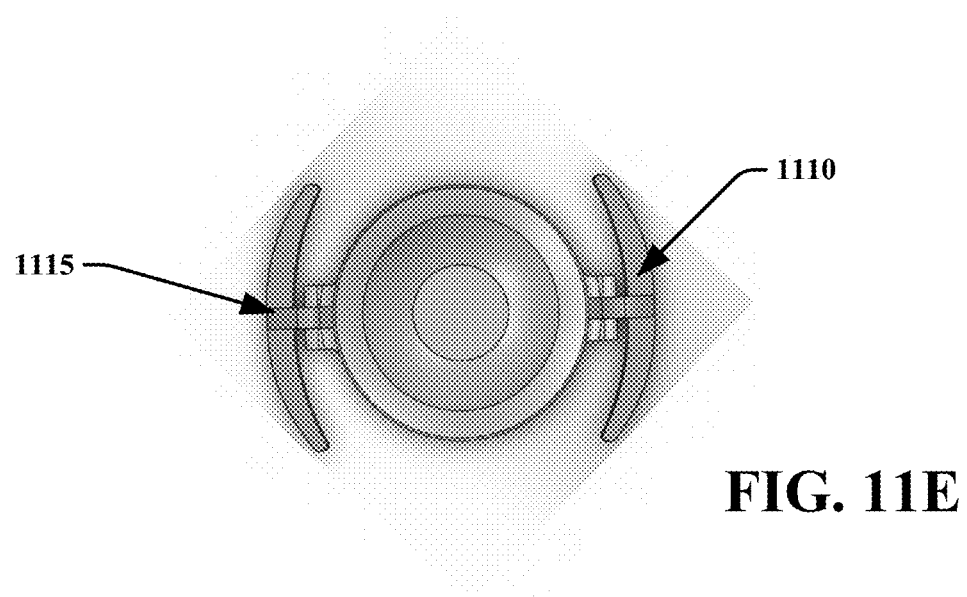

FIGS. 2A-B are examples of hitch mounts 200, 220 that may be used with the gooseball 100. The hitch mount 200, 220 may comprise a hitch ball mount assembly 210, 230 that is configured to receive the gooseball 100. The gooseball 100 may be inserted into the hitch ball mount assembly 210, 230 of the hitch mount 200, 220. FIGS. 2A-B show above-bed gooseneck 200 and under-bed gooseneck 220, hitch mounts respectively. One example of an under bed hitch mounting system is disclosed in U.S. Pat. No. 10,589,585, which is incorporated herein by reference.

In an embodiment, the gooseball 100, and described locking mechanisms, may be coupled with or selectively attached to a gooseneck hitch mount. In an embodiment, the gooseball 100, and described locking mechanisms, may be coupled with or selectively attached to a hitch mount located on the center of a bed of a truck, such as one that mounts above the bed or under the bed, or a hitch mount that attaches to the rear of a vehicle. Although embodiments described herein may be applicable to gooseneck hitch mounts and hitch mounts located on the bed of a truck, and their corresponding receiving assemblies, it is noted that the disclosed gooseballs and locking mechanisms may be used with any hitch mount and any receiving assembly that uses a gooseball or hitch ball. It is noted that other hitch mounts and other receiving assembles, having different length, shapes, sizes, angles, and the like, may be utilized.

This disclosure contemplates various embodiments of locking mechanisms 300, 400, 500, 600, 700, 800, 900, etc. that are to be combined with a gooseball 100 as more fully described herein. Various locking mechanisms as described herein may secure the gooseball 100 to the receiving assembly 210, 230 of the hitch mount 200, 220 by way of example. It should be understood, however, that any coupling system may be operatively attached with the gooseball embodiments disclosed herein. Moreover, any of the gooseball embodiments disclosed herein may be operatively attached with any embodiment of a gooseneck hitch system, including, without limitation those shown herein.

FIGS. 2C-D show examples of hitch couplers 255, 265 that may engage a gooseball 100. In an embodiment, a mating portion 257, 267 of the hitch coupler 255, 265 may attach to the gooseball 100. FIG. 2C shows a gooseneck coupler. FIG. 2D shows a goosebox coupler.

In an embodiment, gooseball 100, having the described locking mechanisms, may be coupled with or selectively attached to a gooseneck coupler. In an embodiment, gooseball 100, having the described locking mechanisms, may be coupled with or selectively attached to a goosebox coupler. Although embodiments described herein may be applicable to gooseneck or goosebox couplers, it is noted that the disclosed gooseballs and locking mechanisms may be used with any hitch coupler that uses a hitch ball, including, without limitation a gooseball. It is noted that other hitch couplers, having different length, shapes, sizes, angles, and the like, may be utilized. The selective attachment between the hitch coupler 255, 265 and the gooseball 100 may facilitate the selective attachment and towing of a towed vehicle to a towing vehicle.

The disclosed gooseballs, hitch mounts 200, 220 and coupling mechanisms 255, 265 may be used in towing applications.

Turning to FIGS. 3A-E, shown is an embodiment of a gooseball 100 comprising a rotational locking mechanism 300. The rotational locking mechanism 300 may comprise a handle 310 having a first end 312 and a second end 314, a trigger or actuator 320 attached to the handle 310 that selectively transitions the rotational locking mechanism 300 between a locked position shown in FIGS. 3A-C and an unlocked position shown in FIGS. 3D-E, and an internal shuttle 330. The internal shuttle 330 may traverse the interior of the body 110 of the gooseball 100 along a track 332 and attach to the first end 312 and second end 314 of the handle 310. In order to engage the rotational locking mechanism 300, the handle 310 may be rotated, such as in a counterclockwise direction, moving the internal shuttle 330 along its track 332 until a stop point (although, the handle 310 may be rotated in the opposite direction as well).

At the stop point, the trigger 320 may lock and the internal shuttle 330, or other component thereto, may cause the ball bearings (or locking members) 132 of the gooseball 100 to extend to a position outside the base 130 and where it can engage the receiver assembly or socket 210 and lock into the hitch mount 200. While ball bearings are shown as the locking members 132, the present disclosure contemplates any suitable locking mechanism, such as a rod, cylinder, legs or the like. Here, a portion of the trigger 320 may extend within the track 332 to prevent rotational movement of the internal shuttle 330. In order to release the rotational locking mechanism 300, the trigger 320 may be actuated, such as being pulled, pushed, depressed or the like, and the handle 310 rotated in the opposite direction, such as in a clockwise direction, moving the internal shuttle 330 along its track 332 until a release point. It is noted that an embodiment with the opposite rotation, e.g. clockwise to lock and counterclockwise to unlock, is also possible.

At the release point, the internal shuttle 330, or other component thereto, may cause the ball bearings 132 of the gooseball 100 to retract to a position inside the base 130 and thereby allow the gooseball 100 to be released from the receiver assembly 210 and hitch mount 200. In an embodiment, the rotational locking mechanism 300 may rotate generally perpendicularly in respect to the axis defined by the gooseball 100. In an embodiment, the internal shuttle 330 may comprise projections, biasing members, and/or divots that respectively push the ball bearings 132 out of the gooseball 100 or that causes the ball bearings 132 to retract into the gooseball 100 to facilitate the locking and unlocking of the gooseball 100. In an embodiment, the rotational locking mechanism 300 may be biased toward an unlocked position, such as spring biased. In an embodiment, the rotational locking mechanism 300 may be biased toward a locked position, such as spring biased.

Additional embodiments of the gooseball 100 according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired gooseball without departing from the spirit and scope of the present disclosure.

Turning to FIGS. 4A-E, shown is an embodiment of a gooseball 100 comprising a lift locking mechanism 400. The lift locking mechanism 400 may comprise a handle 410 having a first end 412 and a second end 414 that selectively transitions the lift locking mechanism 400 between a locked position shown in FIGS. 4A-C and an unlocked position shown in FIGS. 4D-E, and internal cam lobe (also referred to as an internal rod or internal shuttle) 430. The internal cam lobe 430 may traverse the interior of the body 110 of the gooseball and attach between the first end 412 and second end 414 of the handle 410. In order to engage the lift locking mechanism 400, the handle 410 may be rotated, such as in a pushing or downwards direction, about a rotational axis defined by the internal cam lobe 430 until a stop point.

At the stop point, the handle 410 may lock and the internal cam load 430, or other component thereto, may cause the ball bearings 132 of the gooseball 100 to extend to a position outside the base 130 and where it can engage the receiver assembly 210 and lock into the hitch mount 200. In order to release the lift locking mechanism 400, the handle 410 may be rotated in the opposite direction, such as in a lifting or upwards direction, about the axis defined by the internal cam lobe 430 until a release point. At the release point, the internal cam lobe 430, or other component thereto, may cause the ball bearings 132 of the gooseball 100 to retract to a position inside the base 130 and thereby allow the gooseball 100 to be released from the receiver assembly 210 and hitch mount 200 (or from the hitch system to which it is attached). In an embodiment, the internal cam lobe 430 may engage a plunger (not shown) that is pushed upward (or downward, as applicable) to extend the ball bearings 132 out of the gooseball 100 or that is pushed downward (or upward as applicable) causing the ball bearings 132 to retract into the gooseball 100 to facilitate the locking and unlocking of the gooseball 100. In an embodiment, the lift locking mechanism 400 may be biased toward an unlocked position, such as spring biased through a biasing device such as a spring (not shown). In an embodiment, the lift locking mechanism 400 may be biased toward a locked position, such as spring biased through a biasing device such as a spring (not shown).

Turning to FIGS. 5A-E, shown is an embodiment of a gooseball 100 comprising a pry locking mechanism 500. The pry locking mechanism 500 may comprise a handle (also referred to as a switch) 510 that extends into the body 110 of the gooseball 100 and that selectively transitions the pry locking mechanism 500 between a locked position shown in FIGS. 5A-C and an unlocked position shown in FIGS. 5D-E. In order to engage the pry locking mechanism 500, the handle 510 may be rotated, such as in a pushing or downwards direction, until a stop point.

At the stop point, the handle 510 may lock and the handle 510, or other component thereto, may cause the ball bearings 132 of the gooseball 100 to extend to a position outside the base 130 and where it can engage the receiver assembly 210 and lock into the hitch mount 200. In order to release the pry locking mechanism 500, the handle 510 may be rotated in the opposite direction, such as in a lifting or upwards direction, until a release point. At the release point, the handle 510, or other component thereto, may cause the ball bearings 132 of the gooseball 100 to retract to a position inside the base 130 and thereby allow the gooseball 100 to be released from the receiver assembly 210 and hitch mount 200 (or from the hitch system to which it is attached). In an embodiment, the handle 510 may engage a plunger that is pushed upward to extend the ball bearings 132 out of the gooseball 100 or that is pushed downward causing the ball bearings 132 to retract into the gooseball 100 to facilitate the locking and unlocking of the gooseball 100. In an embodiment, the pry locking mechanism 500 may be biased toward an unlocked position, such as spring biased (through a biasing member such as a spring (not shown)). In an embodiment, the pry locking mechanism 500 may be biased toward a locked position, such as spring biased (through a biasing member such as a spring (not shown)).

Turning to FIGS. 6A-E, shown is an embodiment of a gooseball 100 comprising a plunger locking mechanism 600. The plunger locking mechanism 600 may comprise at least one button 610 that extends into the body 110 of the gooseball 100 and that selectively engages with internal handles 620 to transition the plunger locking mechanism 600 between a locked position shown in FIGS. 6A-C and an unlocked position shown in FIGS. 6D-E. In order to engage the plunger locking mechanism 600, the at least one button 610 may be released, such as by a releasing mechanism, until a stop point. The releasing mechanism may include an additional button that may be pressed to release the at least one button 610 or the releasing mechanism may include pressing the at least one button 610 into the body 110 of the gooseball 100 to release it into a locked position extending outside of the body 110 of the gooseball 100.

At the stop point, the at least one button 610 may lock and the button 610 and internal handles 620, or other component thereto, may cause the ball bearings 132 of the gooseball 100 to extend to a position outside the base 130 and where it can engage the receiver assembly 210 and lock into the hitch mount 200 (or to the hitch system to which it is to be attached). In order to release the plunger locking mechanism 600, the at least one button 610 may be compressed into the body 110 of the gooseball 100 until a release point. At the release point, the at least one button 610 and internal handles 620, or other component thereto, may cause the ball bearings 132 of the gooseball 100 to retract or slide to a position inside the base 130 and thereby allow the gooseball 100 to be released from the receiver assembly 210 and hitch mount 200 (or from the hitch system to which it is attached). In an embodiment, the at least one button 610 may extend to a position outside of the gooseball 100 and engage internal handles 620 that also extend the ball bearings 132 outside of the gooseball 100 to facilitate locking of the gooseball 100. The at least one button 610 may compress to a position inside of the gooseball 100 and engage internal handles 620 that also cause the ball bearings 132 to retract into the gooseball 100 to facilitate unlocking of the gooseball 100. As a result, both the at least one button 610 and ball bearings 132 may extend from the gooseball 100 in a locked position and may retract into the gooseball 100 in an unlocked position.

In an embodiment, the plunger locking mechanism 600 may include a first button 610 and a second button 615. The first button 610 and the second button 615 may be positioned on opposite sides of the body 110 of the gooseball 100. To transition the gooseball 100 into an unlocked position, both buttons 610, 615 may need to be compressed at the same time. In an embodiment, compressing only one 610 of the two buttons 615 may not cause the ball bearings 132 to retract into the gooseball 100. The plunger locking mechanism 600 may include more than two buttons, including three, four, five, etc. buttons, where the buttons must be compressed in a certain sequence or simultaneously in order to allow the gooseball 100 to be released from the receiver assembly 210. In an embodiment, the plunger locking mechanism 600 may be biased toward a locked position, such as spring biased (through a biasing member such as a spring (not shown)). In an embodiment, the plunger locking mechanism 600 may be biased toward an unlocked position, such as spring biased (through a biasing member such as a spring (not shown)).

Turning to FIGS. 7A-E, shown is an embodiment of a gooseball 100 comprising a flip locking mechanism 700. The flip locking mechanism 700 may comprise at least one button 710 that extends into the body 110 of the gooseball 100 and that selectively engages with internal handles 720 to transition the flip locking mechanism 700 between a locked position shown in FIGS. 7A-C and an unlocked position shown in FIGS. 7D-E. In order to engage the flip locking mechanism 700, the at least one button 710 may be released, such as by a releasing mechanism, until a stop point. The releasing mechanism may include an additional button that may be pressed to release the at least one button 710 or the releasing mechanism may include pressing the at least one button 710 into the body 110 of the gooseball 100 to release it into a locked position extending outside of the body 110 of the gooseball 100.

At the stop point, the at least one button 710 may lock and the at least one button 710 and internal handles 720, or other component thereto, may cause the locking member 132 (locking face) of the gooseball 100 to extend or rotate to a position outside the base 130 and where it can engage the receiver assembly 210 and lock into the hitch mount 200 (or to the hitch system to which it is to be attached). In order to release the flip locking mechanism 700, the at least one button 710 may be compressed into the body 110 of the gooseball 100 until a release point. At the release point, the at least one button 710 and internal handles 720, or other component thereto, may cause the locking member/locking face 132 of the gooseball 100 to retract or rotate to a position inside the base 130 and thereby allow the gooseball 100 to be released from the receiver assembly 210 and hitch mount 200. In an embodiment, the at least one button 710 may extend to a position outside of the gooseball 100 and engage internal handles 720 that also extend the locking member/locking face 132 outside of the gooseball 100 to facilitate locking of the gooseball 100. The at least one button 710 may compress to a position inside of the gooseball 100 and engage internal handles 720 that also cause the locking member/locking face 132 to retract into the gooseball 100 to facilitate unlocking of the gooseball 100. As a result, both the at least one button 710 and locking face 132 may extend from the gooseball 100 in a locked position and may retract into the gooseball 100 in an unlocked position.

In an embodiment, the flip locking mechanism 700 may include a first button 710 and a second button 715. The first button 710 and the second button 715 may be positioned on opposite sides of the body 110 of the gooseball 100. To transition the gooseball 100 into an unlocked position, both buttons 710, 715 may need to be compressed at the same time. In an embodiment, compressing only one 710 of the two buttons 715 may not cause the locking member/locking face 132 to retract into the gooseball 100. The flip locking mechanism 700 may include more than two buttons, including three, four, five, etc. buttons, where the buttons must be compressed in a certain sequence or simultaneously in order to allow the gooseball 100 to be released from the receiver assembly 210. In an embodiment, the flip locking mechanism 700 may be biased toward a locked position, such as spring biased (such as through a spring not shown). In an embodiment, the flip locking mechanism 700 may be biased toward an unlocked position, such as spring biased (such as through a spring not shown).

Turning to FIGS. 8A-E, shown is an embodiment of a gooseball 100 comprising a vertical slide locking mechanism 800. The vertical slide locking mechanism 800 may comprise at least one handle (also referred to as a switch) 810 that extends into the body 110 of the gooseball 100 and that selectively transitions the vertical slide locking mechanism 800 between a locked position shown in FIGS. 8A-C and an unlocked position shown in FIGS. 8D-E. In order to engage the vertical slide locking mechanism 800, the at least one handle 810 may be slid on a track 812, such as in a pushing or downwards direction, until a stop point. In an embodiment, the track may be vertically aligned or positioned on the body 110 of the gooseball 100.

At the stop point, the at least one handle 810 may lock and the at least one handle 810, or other component thereto, may cause the ball bearings 132 of the gooseball 100 to extend to a position outside the base 130 and where it can engage the receiver assembly 210 and lock into the hitch mount 200 (or to the hitch system to which it is to be attached). In order to release the vertical slide locking mechanism 800, the at least one handle 810 may be slid on the track 812 in the opposite direction, such as in a lifting or upwards direction, until a release point. At the release point, the at least one handle 810, or other component thereto, may cause the ball bearings 132 of the gooseball 100 to retract to a position inside the base 130 and thereby allow the gooseball 100 to be released from the receiver assembly 210 and hitch mount 200 (or from the hitch system to which it is attached). In an embodiment, the at least one handle 810 may engage an internal shuttle that is pushed downward to extend the ball bearings 132 out of the gooseball 100 or that is pushed upward pulling the ball bearings 132 into the gooseball 100 to facilitate the locking and unlocking of the gooseball 100.

In an embodiment, the vertical slide locking mechanism 800 may include a first handle 810 and a second handle 815. The first handle 810 and the second handle 815 may be positioned on opposite sides of the body 110 of the gooseball 100. To transition the gooseball 100 into an unlocked position, both handles 810, 815 may need to be moved or slid at the same time. In an embodiment, moving or sliding only one 810 of the two handles 815 may not cause the ball bearings 132 to retract into the gooseball 100. The vertical slide locking mechanism 800 may include more than two handles, including three, four, five, etc. handles, where the handles must be moved or slid in a certain sequence or simultaneously in order to allow the gooseball 100 to be released from the receiver assembly 210 (or from the hitch system to which it is attached). In an embodiment, the vertical slide locking mechanism 800 may be biased toward a locked position, such as spring biased (such as through springs (not shown)). In an embodiment, the vertical slide locking mechanism 800 may be biased toward an unlocked position, such as spring biased (such as through springs (not shown)).

Turning to FIGS. 9A-E, shown is an embodiment of a gooseball 100 comprising a first ring locking mechanism 900. The first ring locking mechanism 900 may comprise at least one handle (also referred to as an arm) 910 that partially circumscribes the body 110 of the gooseball 100 and extends partly therein, and that selectively transitions the first ring locking mechanism 900 between a locked position shown in FIGS. 9A-C and an unlocked position shown in FIGS. 9D-E. In order to engage the first ring locking mechanism 900, the at least one handle 910 may be rotated, such as by pushing inward into the body 110, until a stop point. The at least one handle 910 may be flush with the body 110 of the gooseneck 100 when pushed inward until the stop point.

At the stop point, the at least one handle 910 may lock and the at least one handle 910, or other component thereto, may cause the ends 134, 136 of the locking member comprising a locking ring 132 of the gooseball 100 to pivot or move further apart to a larger overall diameter of the locking member/locking ring 132 that extends to a position outside the base 130 and where it can engage the receiver assembly 210 and lock into the hitch mount 200. In order to release the first ring locking mechanism 900, the at least one handle 910 may be rotated in the opposite direction, such as by pulling outward from the body 110, until a release point. At the release point, the at least one handle 910, or other component thereto, may cause the ends 134, 136 of the locking member/locking ring 132 of the gooseball 100 to pivot or move closer together to a smaller overall diameter of the locking member/locking ring 132, where the locking member/locking ring 132 may retract to a position inside the base 130 and allow the gooseball 100 to be released from the receiver assembly 210 and hitch mount 200 (or from the hitch system to which it is attached). In an embodiment, the at least one handle 910 may engage an internal member that pushes the ends 134, 136 of the locking member/locking ring 132 outward to extend outside of the gooseball 100 or that pulls inward the ends 134, 136 of the locking member/ locking ring 132 to retract into the gooseball 100 to facilitate the locking and unlocking of the gooseball 100. In an embodiment, the first ring locking mechanism 900 may be biased toward an unlocked position, such as spring biased (such as by a spring (not shown)). In an embodiment, the first ring locking mechanism 900 may be biased toward a locked position, such as spring biased (such as by a spring (not shown)).

Turning to FIGS. 10A-E, shown is an embodiment of a gooseball 100 comprising a second ring locking mechanism 1000. The second ring locking mechanism 1000 may comprise at least one handle (also referred to as an arm) 1010 that partially circumscribes the body 110 of the gooseball 100 and extends partly therein, and that selectively transitions the second ring locking mechanism 1000 between a locked position shown in FIGS. 10A-C and an unlocked position shown in FIGS. 10D-E. In order to engage the second ring locking mechanism 1000, the at least one handle 1010 may be rotated, such as by pushing inward into the body 110, until a stop point. The at least one handle 1010 may be flush with the body 110 of the gooseneck 100 when pushed inward until the stop point.

At the stop point, the at least one handle 1010 may lock and the at least one handle 1010, or other component thereto, may cause the ends 134, 136 of the locking member/locking ring 132 of the gooseball 100 to pivot or move further apart to a larger overall diameter of the locking member/locking ring 132 that extends to a position outside the base 130 and where it can engage the receiver assembly 210 and lock into the hitch mount 200. In order to release the second ring locking mechanism 1000, the at least one handle 1010 may be rotated in the opposite direction, such as by pulling outward from the body 110, until a release point. At the release point, the at least one handle 1010, or other component thereto, may cause the ends 134, 136 of the locking member/locking ring 132 of the gooseball 100 to pivot or move closer together to a smaller overall diameter of the locking member/locking ring 132, where the locking member/locking ring 132 may retract to a position inside the base 130 and allow the gooseball 100 to be released from the receiver assembly 210 and hitch mount 200 (or from the hitch system to which it is attached). In an embodiment, the at least one handle 1010 may engage an internal member that pushes the ends 134, 136 of the locking member/locking ring 132 outward to extend outside of the gooseball 100 or that pulls inward the ends 134, 136 of the locking member/locking ring 132 to retract into the gooseball 100 to facilitate the locking and unlocking of the gooseball 100.

In an embodiment, the second ring locking mechanism 1000 may include a first handle 1010 and a second handle 1015. The first handle 1010 and the second handle 1015 may be positioned on opposite sides of the body 110 of the gooseball 100. To transition the gooseball 100 into an unlocked position, both handles 1010, 1015 may need to be moved or rotated at the same time. In an embodiment, moving or rotating only one 1010 of the two handles 1015 may not cause the locking member/locking ring 132 to retract into the gooseball 100. The second ring locking mechanism 1000 may include more than two handles, including three, four, five, etc. handles, where the handles must be moved or rotated in a certain sequence or simultaneously in order to allow the gooseball 100 to be released from the receiver assembly 210 (or from the hitch system to which it is attached). In an embodiment, the second ring locking mechanism 1000 may be biased toward a locked position, such as spring biased (such as by a spring (not shown)). In an embodiment, the second ring locking mechanism 1000 may be biased toward an unlocked position, such as spring biased (such as by a spring (not shown)).

Turning to FIGS. 11A-E, shown is an embodiment of a gooseball 100 comprising a third ring locking mechanism 1100. The third ring locking mechanism 1100 may comprise at least one latch 1110 that attaches to the body 110 of the gooseball 100, and that selectively transitions the third ring locking mechanism 1100 between a locked position shown in FIGS. 11A-C and an unlocked position shown in FIGS. 11D-E. In order to engage the third ring locking mechanism 1100, the at least one latch 1110 may be unlatched and rotated, such as by pushing downward, until a stop point. In an embodiment, the at least one latch 1110 may be located fully outside of the body 110 of the gooseneck 100 during locking and unlocking.

At the stop point, the at least one latch 1110 may lock and relatch. The at least one latch 1110, or other component thereto, may cause the ends 134, 136 of the locking member/locking ring 132 of the gooseball 100 to pivot or move further apart to a larger overall diameter of the locking member/locking ring 132 that extends to a position outside the base 130 and where it can engage the receiver assembly 210 and lock into the hitch mount 200 (or to the hitch system to which it is to be attached). In order to release the third ring locking mechanism 1100, the at least one latch 1110 may be unlatched and rotated in the opposite direction, such as by pulling upward, until a release point. At the release point, the at least one latch 1110, or other component thereto, may cause the ends 134, 136 of the locking member/locking ring 132 of the gooseball 100 to pivot or move closer together to a smaller overall diameter of the locking member/locking ring 132, where the locking member/locking ring 132 may retract to a position inside the base 130 and allow the gooseball 100 to be released from the receiver assembly 210 and hitch mount 200 (or from the hitch system to which it is attached). In an embodiment, the at least one latch 1110 may engage an internal member that pushes the ends 134, 136 of the locking member/locking ring 132 outward to extend outside of the gooseball 100 or that pulls inward the ends 134, 136 of the locking member/locking ring 132 to retract into the gooseball 100 to facilitate the locking and unlocking of the gooseball 100. In an embodiment, the third ring locking mechanism 1100 includes the steps of (1) unlatching, (2) moving the latch to a locking or unlocked position, and (3) relatching to secure the latch in that position. In an embodiment, the latch 1110 is wedge shaped and may include a protrusion or wing on each side to facilitate unlatching, pushing down or pulling up, and relatching.

In an embodiment, the third ring locking mechanism 1100 may include a first latch 1110 and a second latch 1115. The first latch 1110 and the second latch 1115 may be positioned on opposite sides of the body 110 of the gooseball 100. To transition the gooseball 100 into an unlocked position, both latches 1110, 1115 may need to be unlatched at the same time. In an embodiment, unlatching only one 1110 of the two latches 1115 may not cause the locking member/locking ring 132 to retract into the gooseball 100. The third ring locking mechanism 1100 may include more than two latches, including three, four, five, etc. latches, where the latches must be unlatched in a certain sequence or simultaneously in order to allow the gooseball 100 to be released from the receiver assembly 210.

Figure 12A:
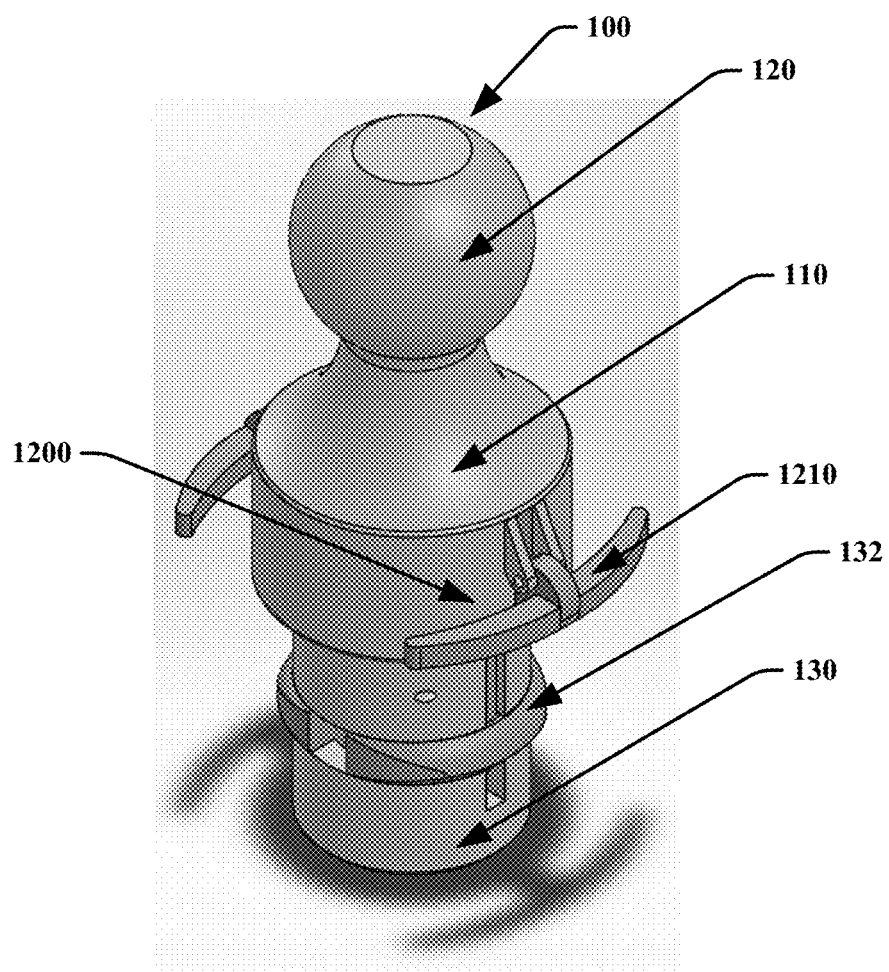
FIGS. 12A-C show an embodiment of a gooseball comprising another fourth ring locking mechanism in a locked position and FIGS. 12D-E show the gooseball in an unlocked position.
Figure 12B:
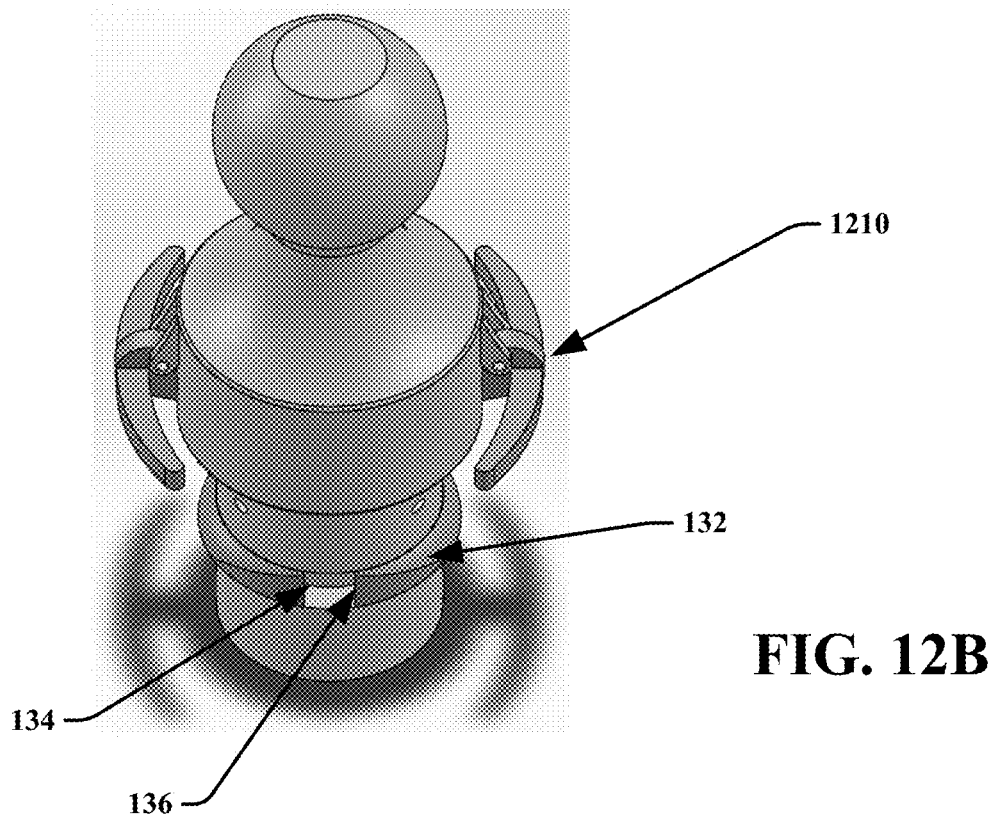
Figure 12C:
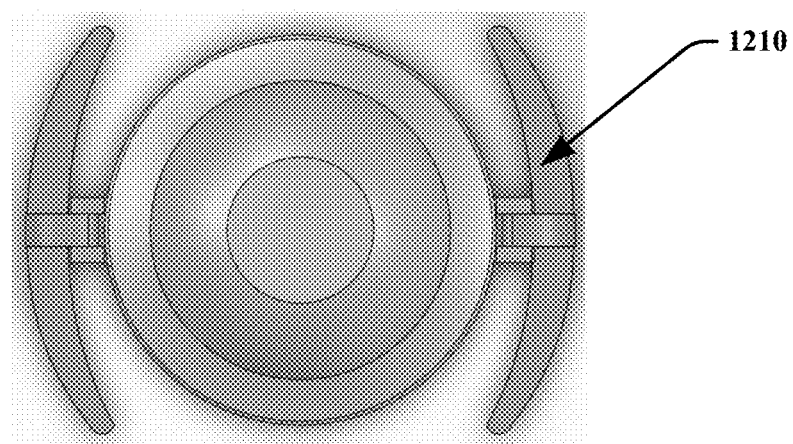
Figure 12D:
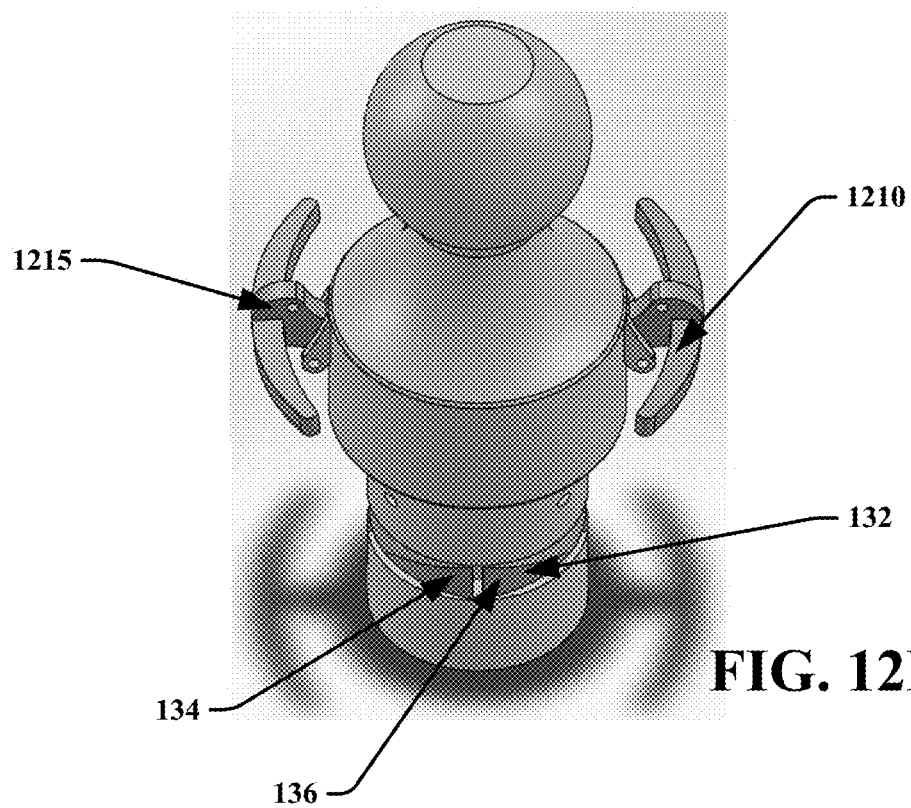
Figure 12E:
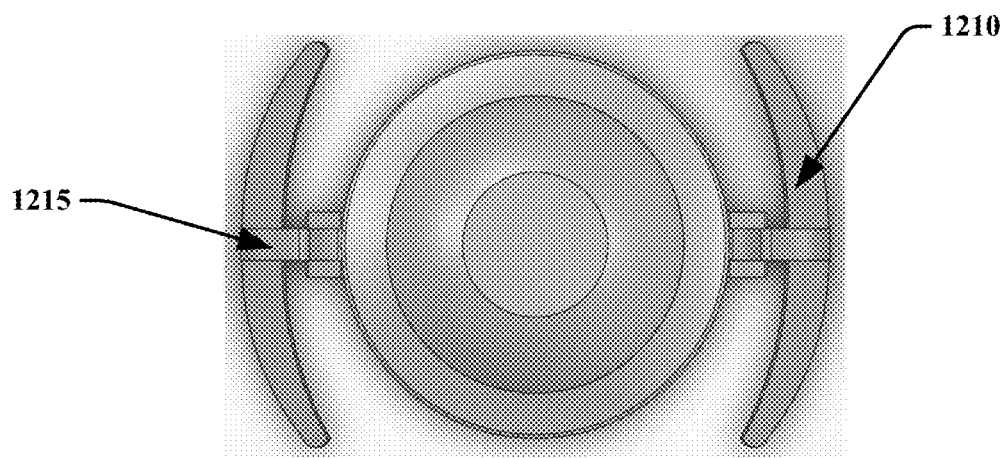
Figure 13A:
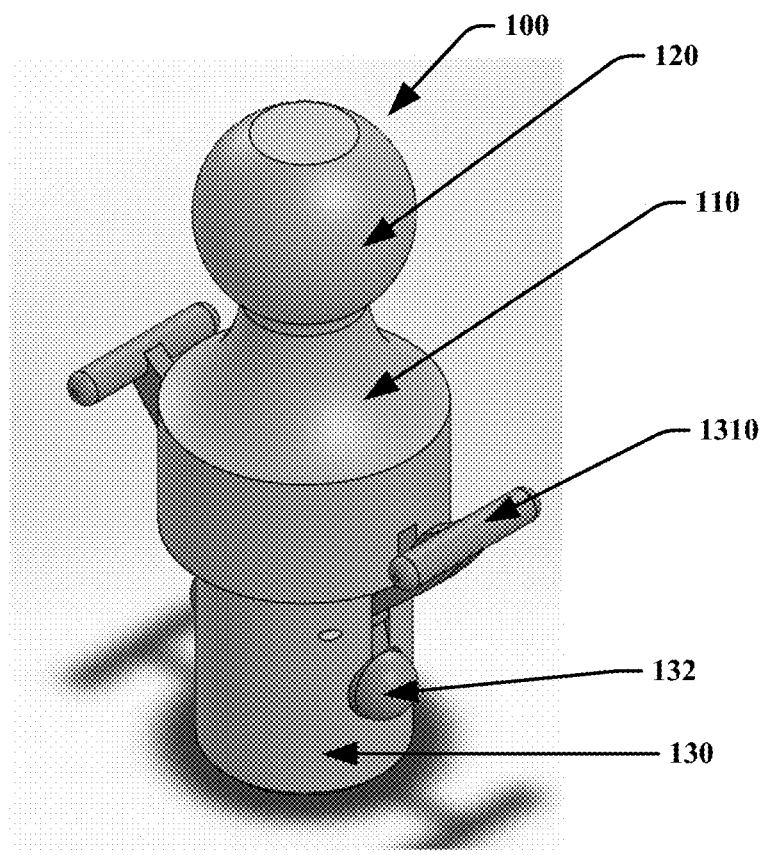
FIGS. 13A-C show an embodiment of a gooseball comprising a first lever locking mechanism in a locked position and FIGS. 13D-E show the gooseball in an unlocked position.
Figure 13B:
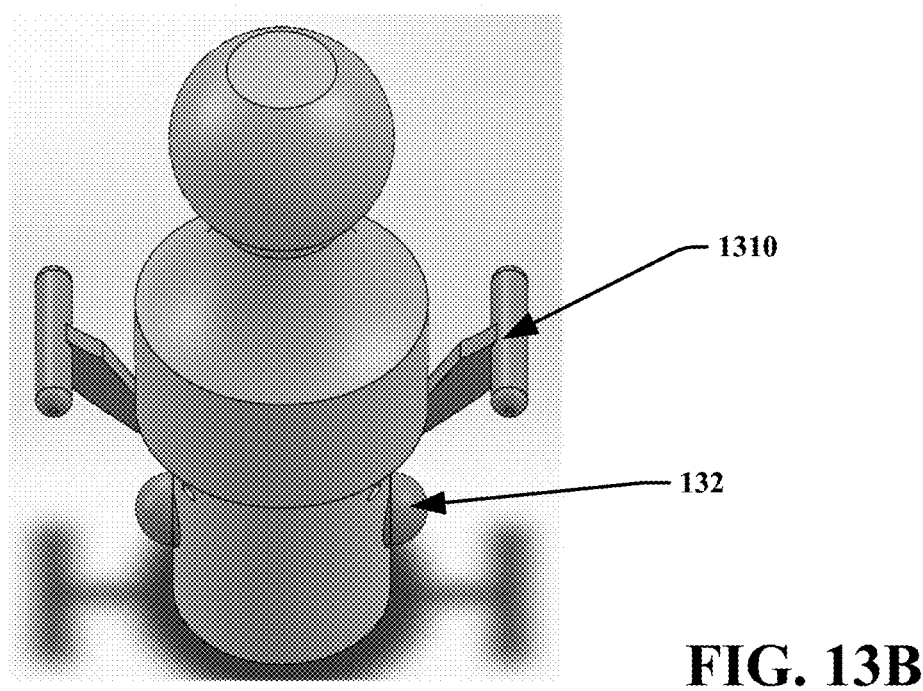
Figure 13C:
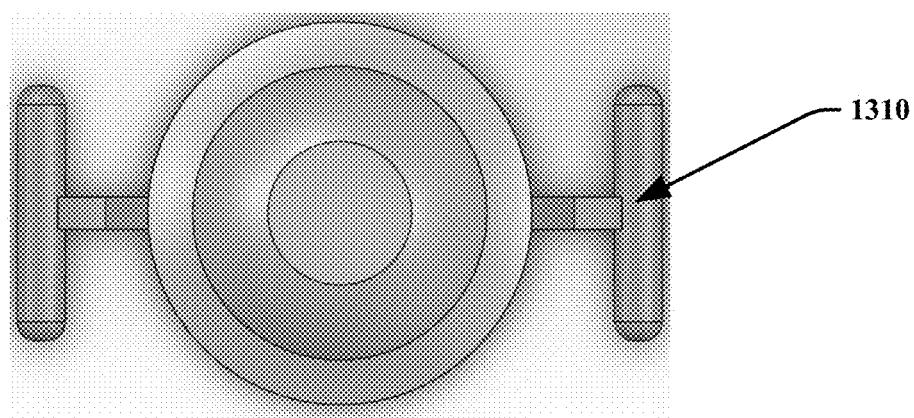
Figure 13D:
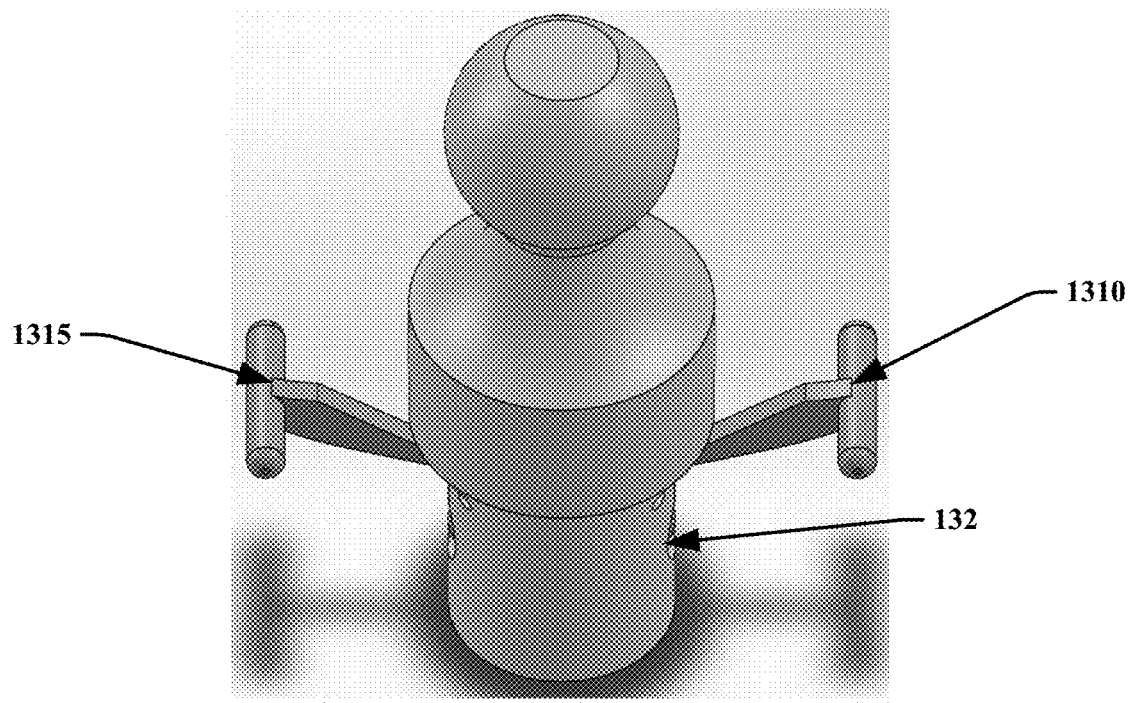
Figure 13E:
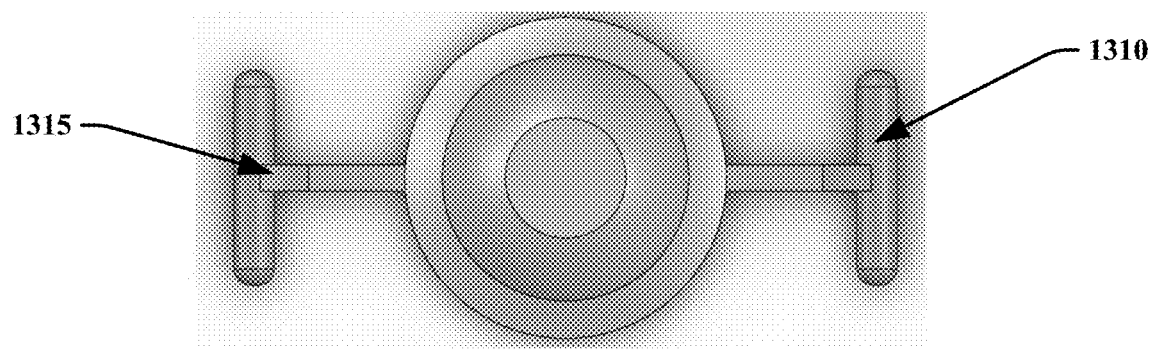
Figure 14A:
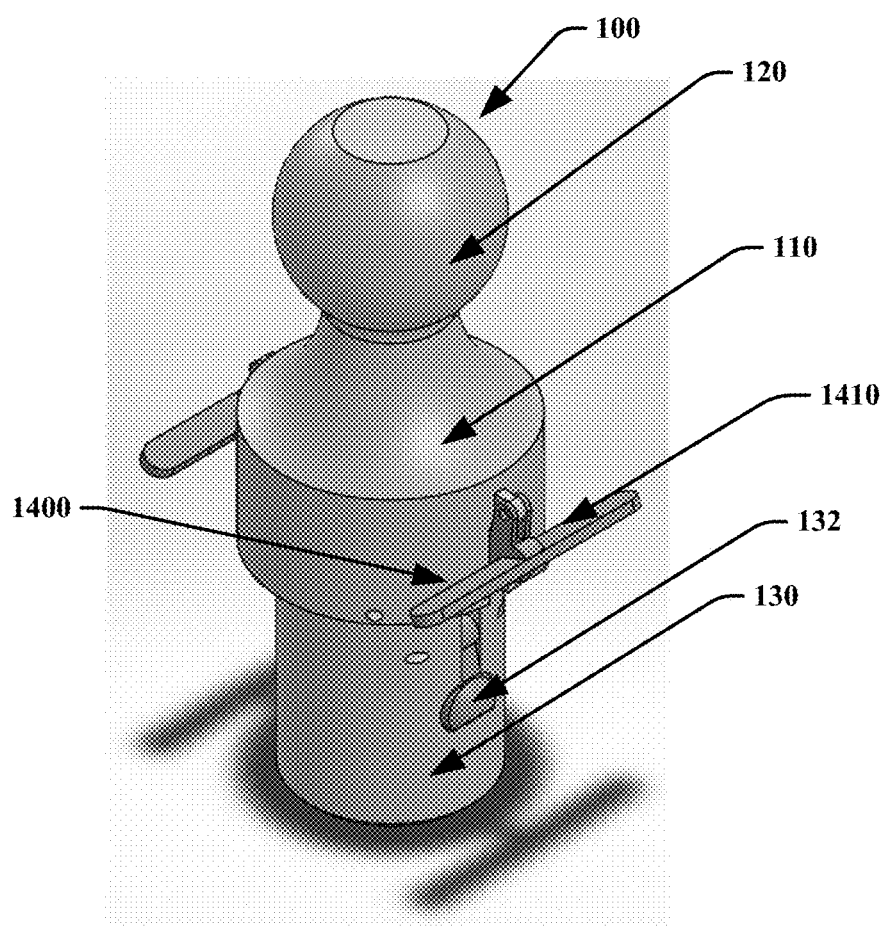
FIGS. 14A-C show an embodiment of a gooseball comprising a second lever locking mechanism in a locked position and FIGS. 14D-E show the gooseball in an unlocked position.
Figure 14B:
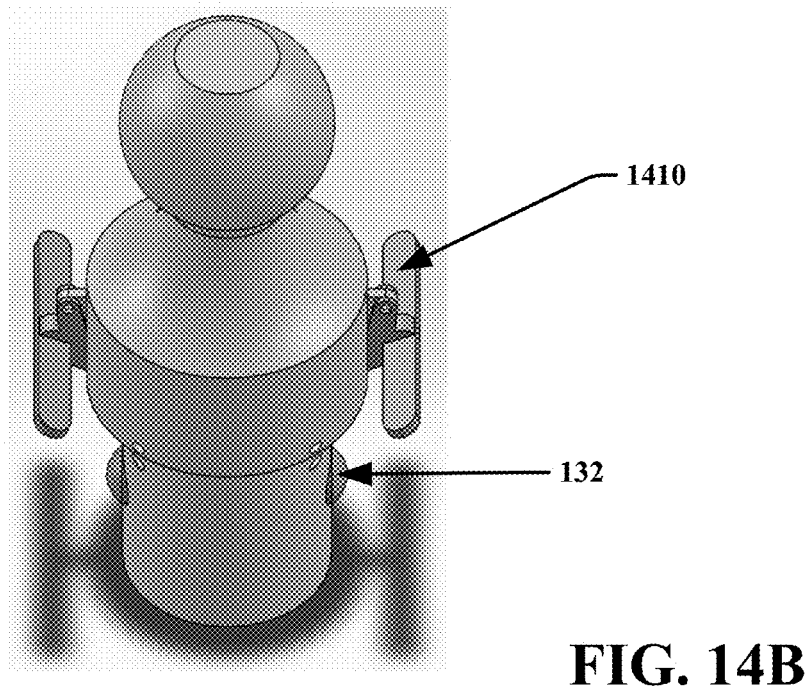
Figure 14C:
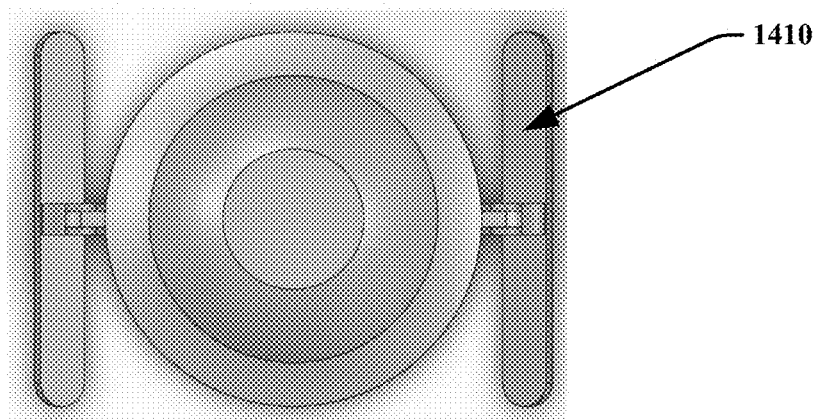
Figure 14D:
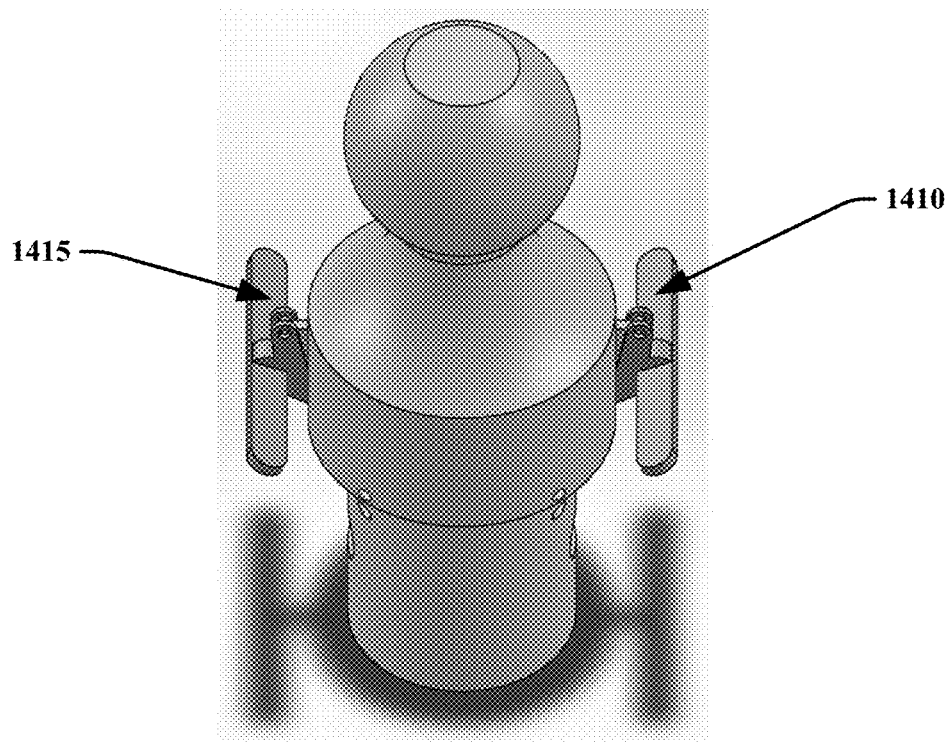
Figure 14E:
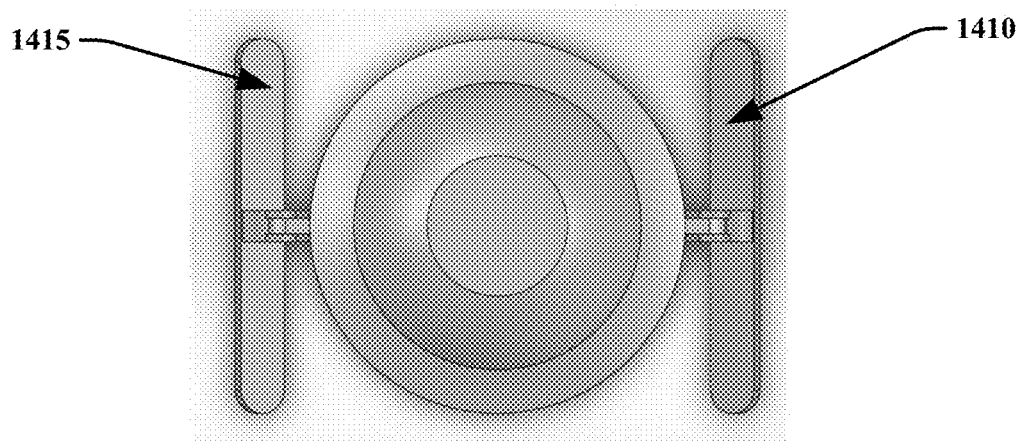
Figure 15A:
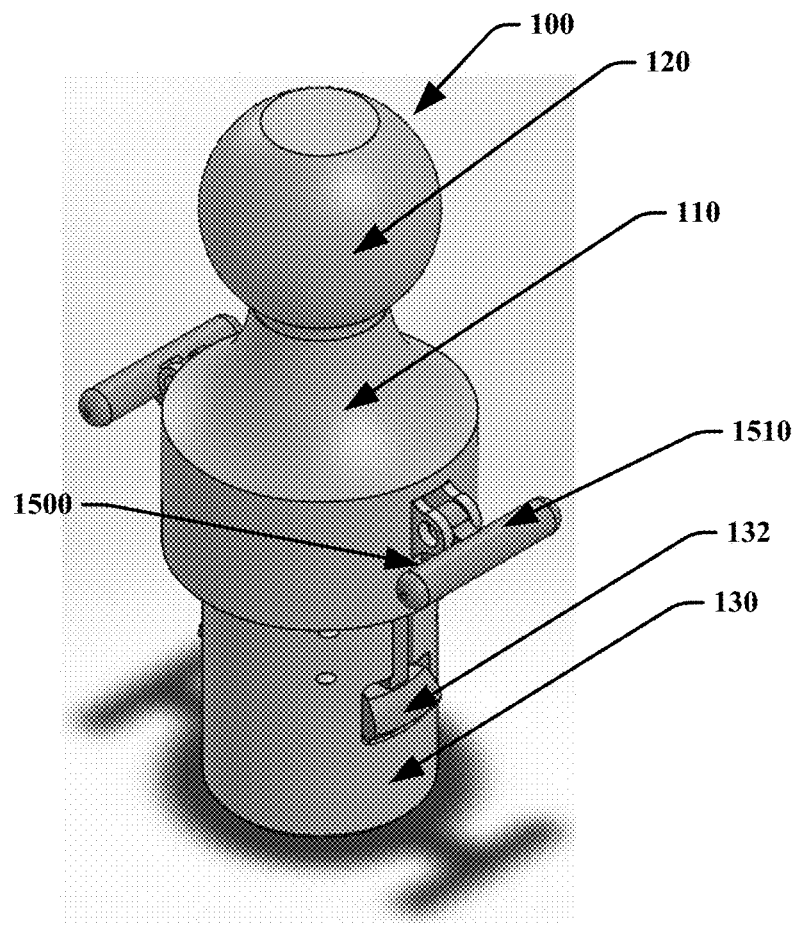
FIGS. 15A-C show an embodiment of a gooseball comprising a third lever locking mechanism in a locked position and FIGS. 15D-E show the gooseball in an unlocked position.
Figure 15B:
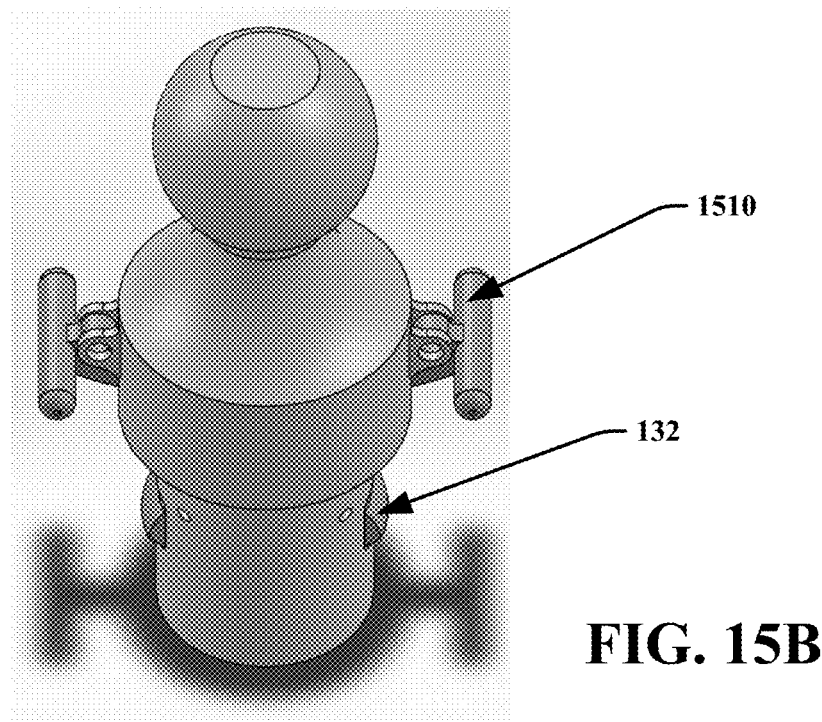
Figure 15C:
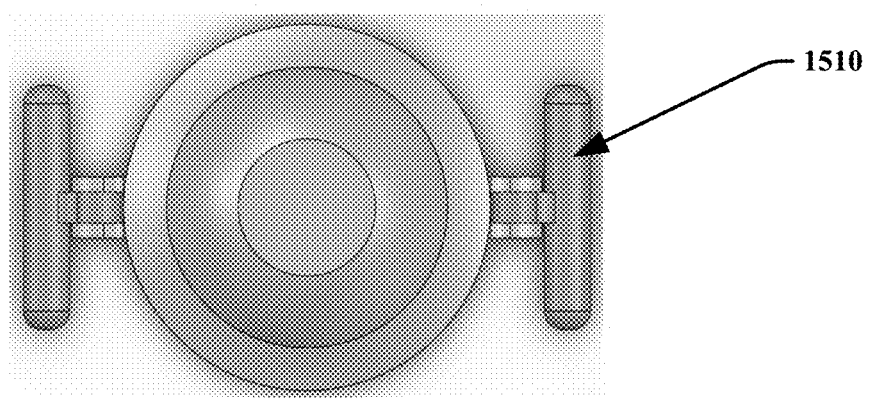
Figure 15D:
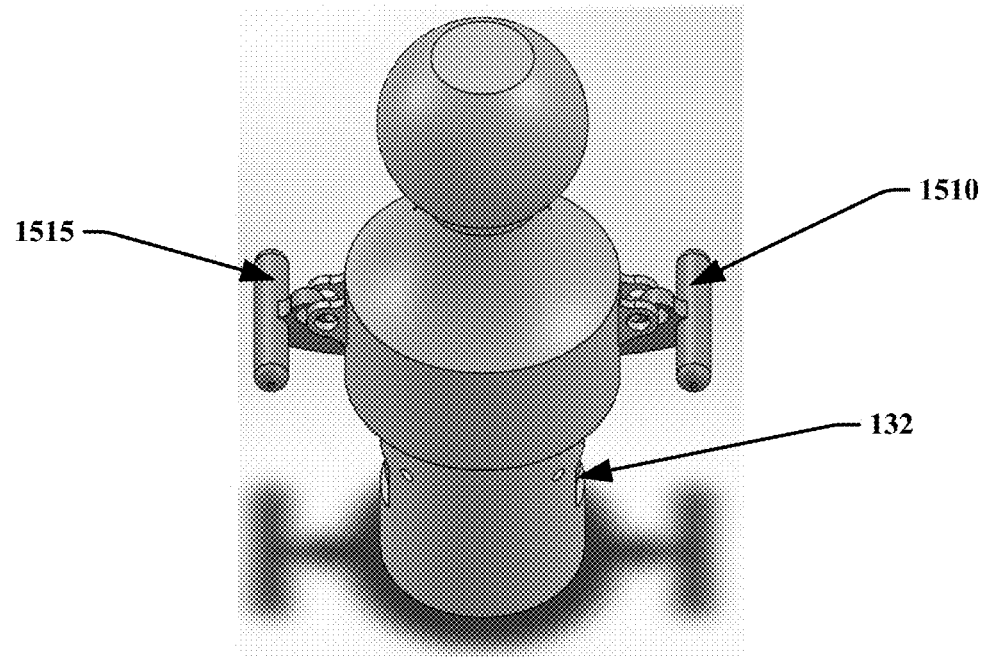
Figure 15E:
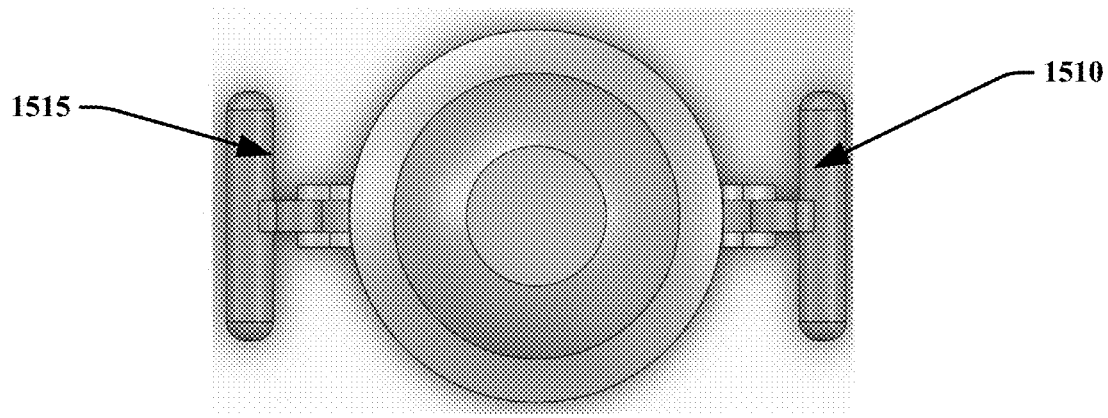
Figure 16A:
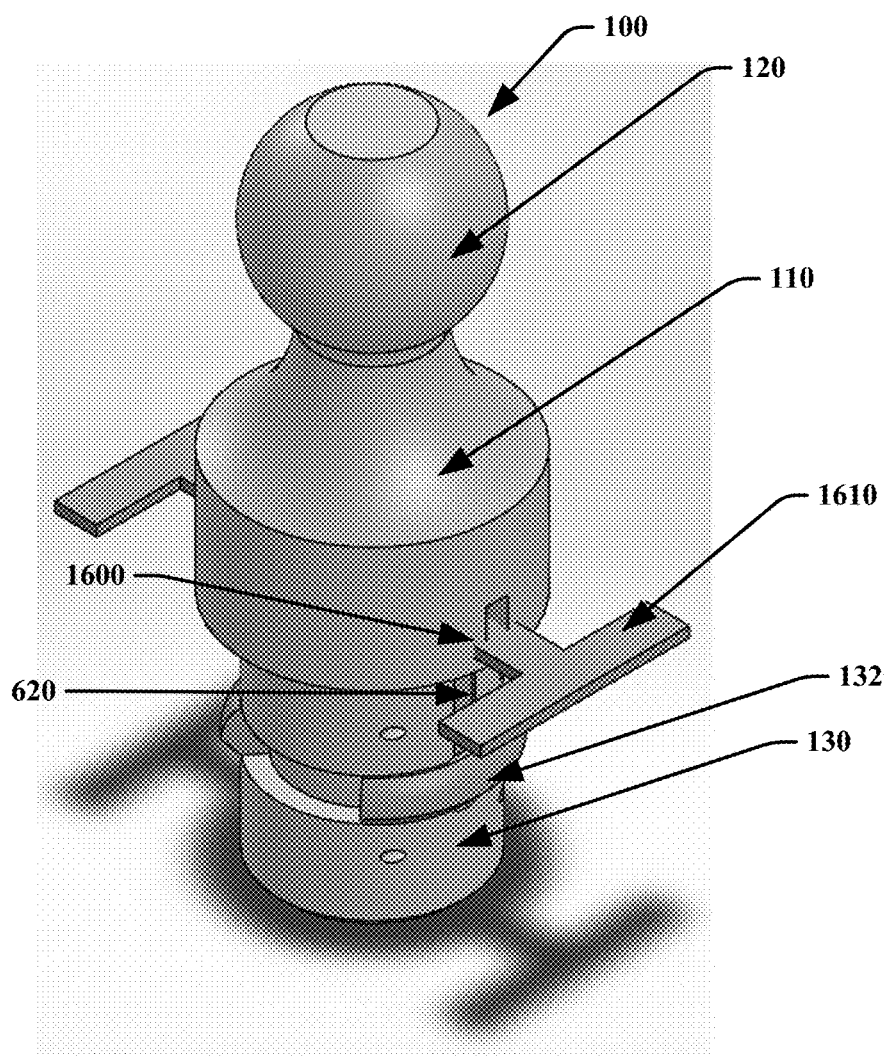
FIGS. 16A-C show an embodiment of a gooseball comprising an fourth lever locking mechanism in a locked position and FIGS. 16D-E show the gooseball in an unlocked position.
Figure 16B:
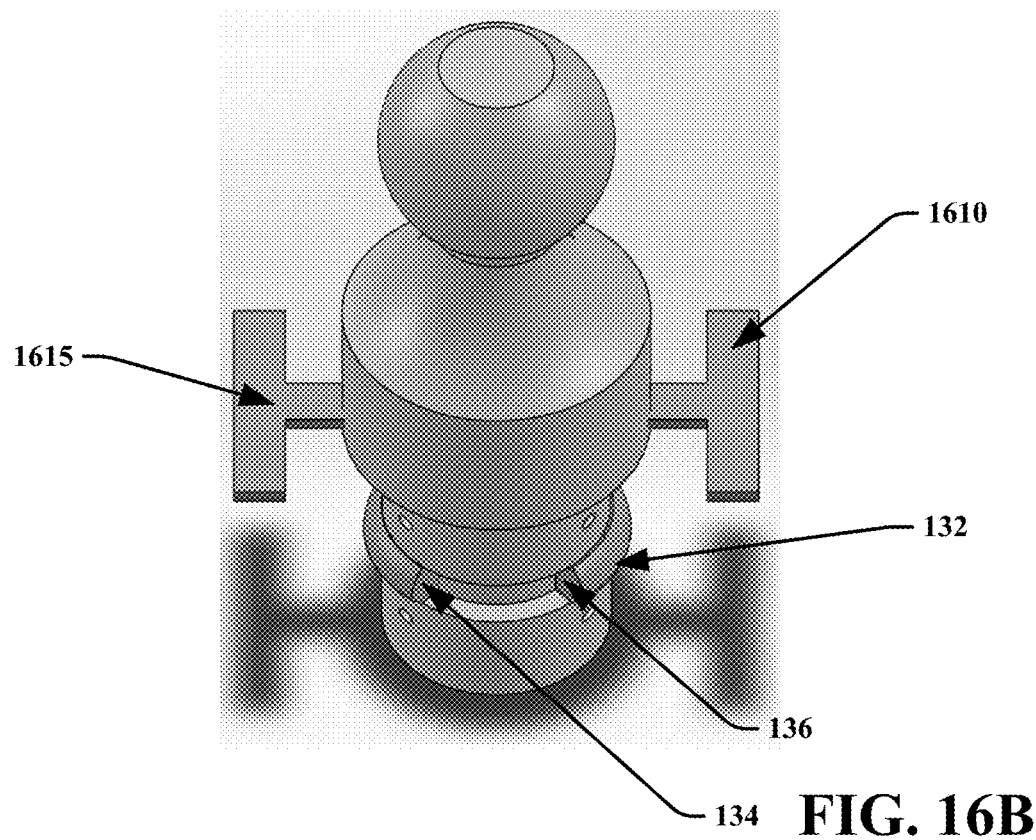
Figure 16C:
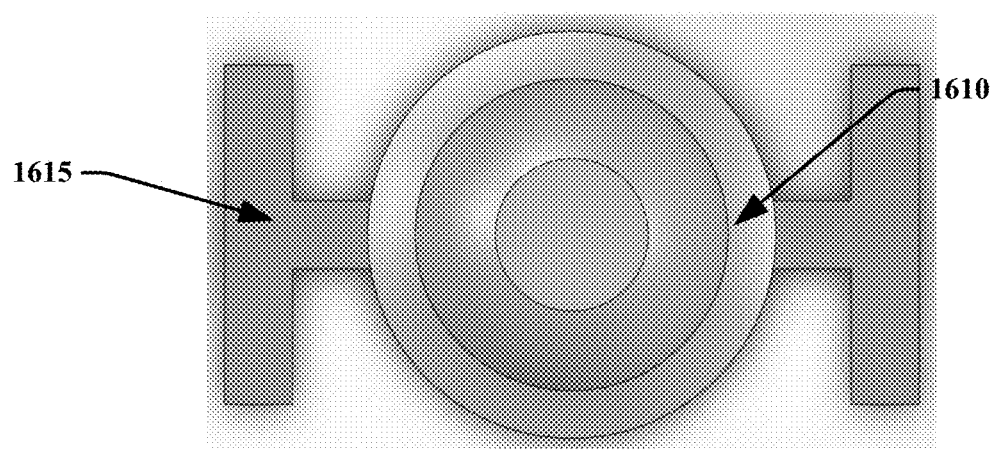
Figure 16D:
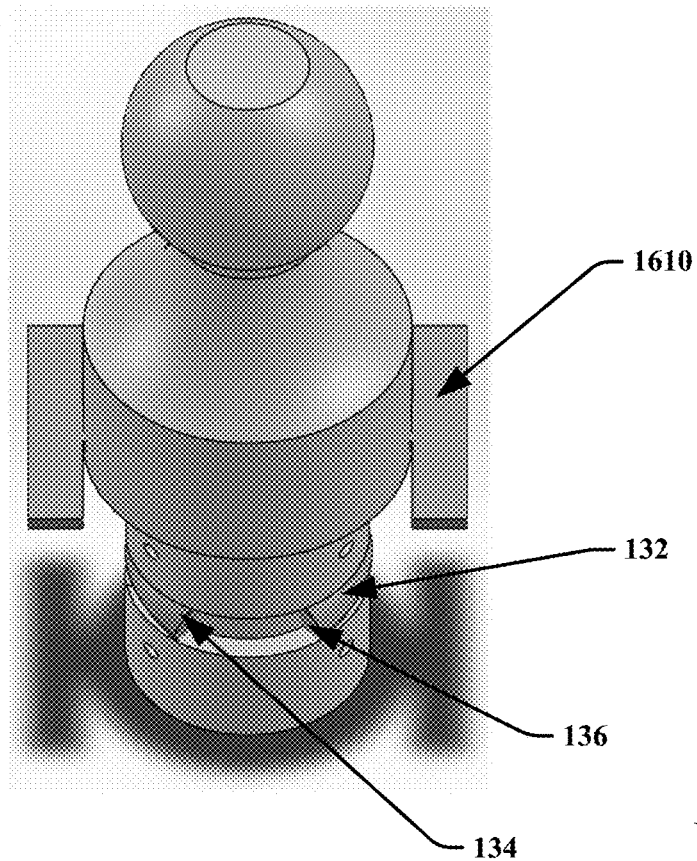
Figure 16E:
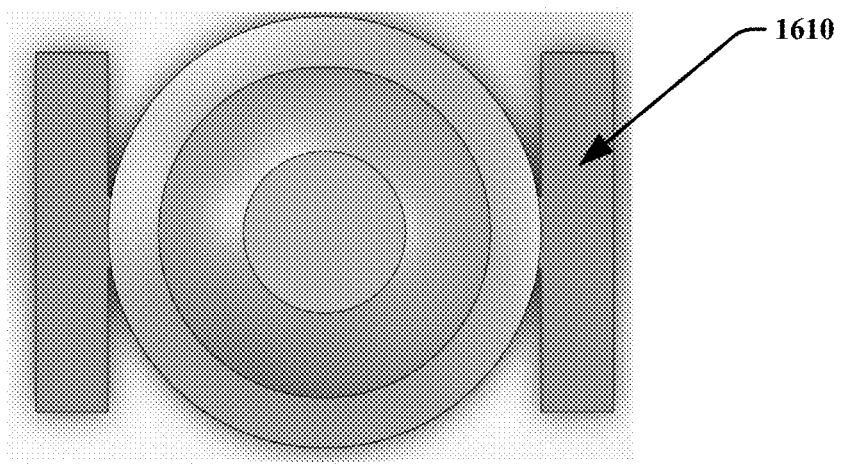

Turning to FIGS. 12A-E, shown is an embodiment of a gooseball 100 comprising a fourth ring locking mechanism 1200, including at least one latch 1210 where FIGS. 12A-C show the fourth ring locking mechanism 1200 in a locked position and FIGS. 12D-E show an unlocked position. The fourth ring locking mechanism 1200 may function similarly to the third ring locking mechanism 1100. In an embodiment, the locking member/locking ring 132 may rotate into the body 110 of the gooseball 100, which moves the ends 134, 136 of the locking member/locking ring 132 closer together in an unlocked position, and vice versa into a locked position, as shown in FIGS. 11A-E. In an embodiment, the locking member/locking ring 132 may slide horizontally into the body 110 of the gooseball 100, which may move the ends 134, 136 of the locking member/locking ring 132 closer together in an unlocked position, and vice versa into a locked position, as shown in FIGS. 12A-E. The fourth ring locking mechanism 1200 may also include a first latch 1210 and a second latch 1215 that may have to be unlatched together in order to facilitate unlocking of the gooseball 100. The wedge shape and protrusions of the latches 1110, 1210 in the corresponding third and fourth ring locking mechanisms 1100, 1200 may also be shaped slightly differently, as shown in FIGS. 11A-E and 12A-E.

Turning to FIGS. 13A-E, shown is an embodiment of a gooseball 100 comprising a first lever locking mechanism 1300. The first lever locking mechanism 1300 may comprise at least one handle (also referred to as a switch) 1310 that extends into the body 110 of the gooseball 100 and that selectively transitions the first lever locking mechanism 1300 between a locked position shown in FIGS. 13A-C and an unlocked position shown in FIGS. 13D-E. In order to engage the first lever locking mechanism 1300, the at least one handle 1310 may be rotated, such as in a lifting or upwards direction, until a stop point. The rotation into a locked position, and the lifting thereof, may bring the at least one handle 1310 closer to the body 110 of the gooseneck 100.

At the stop point, the at least one handle 1310 may lock and the at least one handle 1310, or other component thereto, may cause the ball bearings 132 of the gooseball 100 to extend to a position outside the base 130 and where it can engage the receiver assembly 210 and lock into the hitch mount 200 (or to the hitch system to which it is to be attached). In order to release the first lever locking mechanism 1300, the at least one handle 1310 may be rotated in the opposite direction, such as in a pushing or downwards direction, until a release point. At the release point, the at least one handle 1310, or other component thereto, may cause the ball bearings 132 of the gooseball 100 to retract to a position inside the base 130 and thereby allow the gooseball 100 to be released from the receiver assembly 210 and hitch mount 200 (or from the hitch system to which it is attached). The rotation into an unlocked position, and the pushing thereof, may bring the at least one handle 1310 further from the body 110 of the gooseneck 100. In an embodiment, the rotation of the at least one handle 1310 into locked and unlocked positions may occur at the position of attachment of the at least one handle 1310 into the body 110 of the gooseneck 100. In an embodiment, the at least one handle 1310 may engage an internal mechanism that extends the ball bearings 132 out of the gooseball 100 or that causes the ball bearings 132 to retract into the gooseball 100 to facilitate the locking and unlocking of the gooseball 100.

In an embodiment, the first lever locking mechanism 1300 may include a first handle 1310 and a second handle 1315. The first handle 1310 and the second handle 1315 may be positioned on opposite sides of the body 110 of the gooseball 100. To transition the gooseball 100 into an unlocked position, both handles 1310, 1315 may need to be rotated or pushed at the same time. In an embodiment, rotating or pushing only one 1310 of the two handles 1315 may not cause the ball bearings 132 to retract into the gooseball 100. The first lever locking mechanism 1300 may include more than two handles, including three, four, five, etc. handles, where the handles must be rotated or pushed in a certain sequence or simultaneously in order to allow the gooseball 100 to be released from the receiver assembly 210. In an embodiment, the first lever locking mechanism 1300 may be biased toward a locked position, such as spring biased (such as by a spring (not shown)). In an embodiment, the first lever locking mechanism 1300 may be biased toward an unlocked position, such as spring biased (such as by a spring (not shown)).

Turning to FIGS. 14A-E, shown is an embodiment of a gooseball 100 comprising a second lever locking mechanism 1400. The second lever locking mechanism 1400 may comprise at least one handle (also referred to as a latch) 1410 that attaches to the body 110 of the gooseball 100 and that selectively transitions the second lever locking mechanism 1400 between a locked position shown in FIGS. 14A-C and an unlocked position shown in FIGS. 14D-E. In order to engage the second lever locking mechanism 1400, the at least one handle 1410 may be moved or slid, such as in a pushing or downwards direction, along a track 1412 until a stop point. The rotation into a locked position, and the pushing thereof, may bring the at least one handle 1410 closer to the body 110 of the gooseneck 100.

At the stop point, the at least one handle 1410 may lock and the at least one handle 1410, or other component thereto, may cause the ball bearings 132 of the gooseball 100 to extend or rotate to a position outside the base 130 and where it can engage the receiver assembly 210 and lock into the hitch mount 200. In order to release the second lever locking mechanism 1400, the at least one handle 1410 may be moved or slid in the opposite direction, such as in a lifting or upwards direction, along a track 1412 until a release point. At the release point, the at least one handle 1410, or other component thereto, may cause the ball bearings 132 of the gooseball 100 to retract or rotate to a position inside the base 130 and thereby allow the gooseball 100 to be released from the receiver assembly 210 and hitch mount 200 (or from the hitch system to which it is attached). The rotation into an unlocked position, and the pulling thereof, may bring the at least one handle 1410 further from the body 110 of the gooseneck 100. In an embodiment, the rotation of the at least one handle 1410 into locked and unlocked positions may occur at the position of attachment of the at least one handle 1410 into the body 110 of the gooseneck 100. In an embodiment, the at least one handle 1410 may engage an internal mechanism that extends the ball bearings 132 out of the gooseball 100 or that causes the ball bearings 132 to retract into the gooseball 100 to facilitate the locking and unlocking of the gooseball 100.

In an embodiment, the second lever locking mechanism 1400 may include a first handle 1410 and a second handle 1415. The first handle 1410 and the second handle 1415 may be positioned on opposite sides of the body 110 of the gooseball 100. To transition the gooseball 100 into an unlocked position, both handles 1410, 1415 may need to be moved or slid at the same time. In an embodiment, moving or sliding only one 1410 of the two handles 1415 may not cause the ball bearings 132 to retract into the gooseball 100. The second lever locking mechanism 1400 may include more than two handles, including three, four, five, etc. handles, where the handles must be moved or slid in a certain sequence or simultaneously in order to allow the gooseball 100 to be released from the receiver assembly 210.

In an embodiment, the second lever locking mechanism 1400 may be biased toward a locked position, such as spring biased. In an embodiment, the second lever locking mechanism 1400 may be biased toward an unlocked position, such as spring biased.

Turning to FIGS. 15A-E, shown is an embodiment of a gooseball 100 comprising a third lever locking mechanism 1500. The third lever locking mechanism 1500 may comprise at least one handle (also referred to as a latch) 1510 that attaches to the body 110 of the gooseball 100 and that selectively transitions the third lever locking mechanism 1500 between a locked position shown in FIGS. 15A-C and an unlocked position shown in FIGS. 15D-E. In order to engage the third lever locking mechanism 1500, the at least one handle 1510 may be rotated, such as in an inwards direction, until a stop point. The rotation into a locked position, and the pushing thereof, may bring the at least one handle 1510 closer to the body 110 of the gooseneck 100.

At the stop point, the at least one handle 1510 may lock and the at least one handle 1510, or other component thereto, may cause the locking member/locking face 132 of the gooseball 100 to extend or rotate to a position outside the base 130 and where it can engage the receiver assembly 210 and lock into the hitch mount 200. In order to release the third lever locking mechanism 1500, the at least one handle 1510 may be rotated in the opposite direction, such as in outwards direction, until a release point. At the release point, the at least one handle 1510, or other component thereto, may cause the locking member/locking face 132 of the gooseball 100 to retract or rotate to a position inside the base 130 and thereby allow the gooseball 100 to be released from the receiver assembly 210 and hitch mount 200 (or from the hitch system to which it is attached). The rotation into an unlocked position, and the pulling thereof, may bring the at least one handle 1510 further from the body 110 of the gooseneck 100. In an embodiment, the rotation of the at least one handle 1510 into locked and unlocked positions may occur at the position of attachment of the at least one handle 1510 into the body 110 of the gooseneck 100. In an embodiment, the at least one handle 1510 may engage an internal mechanism that extends the locking member/locking face 132 out of the gooseball 100 or that causes the locking member/locking face 132 to retract into the gooseball 100 to facilitate the locking and unlocking of the gooseball 100.

In an embodiment, the third lever locking mechanism 1500 may include a first handle 1510 and a second handle 1515. The first handle 1510 and the second handle 1515 may be positioned on opposite sides of the body 110 of the gooseball 100. To transition the gooseball 100 into an unlocked position, both handles 1510, 1515 may need to be moved or rotated at the same time. In an embodiment, moving or rotating only one 1510 of the two handles 1515 may not cause the locking member/locking face 132 to retract into the gooseball 100. The third lever locking mechanism 1500 may include more than two handles, including three, four, five, etc. handles, where the handles must be moved or rotated in a certain sequence or simultaneously in order to allow the gooseball 100 to be released from the receiver assembly 210. In an embodiment, the third lever locking mechanism 1500 may be biased toward a locked position, such as spring biased (such as by a spring (not shown)). In an embodiment, the third lever locking mechanism 1500 may be biased toward an unlocked position, such as spring biased (such as by a spring (not shown)).

Turning to FIGS. 16A-E, shown is an embodiment of a gooseball 100 comprising a fourth lever locking mechanism 1600. The fourth lever locking mechanism 1600 may comprise at least one handle 1610 that extends into the body 110 of the gooseball 100 and that selectively engages with an internal member 1620 to transition the fourth lever locking mechanism 1600 between a locked position shown in FIGS. 16A-C and an unlocked position shown in FIGS. 16D-E. In order to engage the fourth lever locking mechanism 1600, the at least one handle 1610 may be pulled, such as in a lateral direction, until a stop point. The transition into a locked position, and the pulling thereof, may bring the at least one handle 1610 closer to the body 110 of the gooseneck 100.

At the stop point, the at least one handle 1610 may lock and the at least one handle 1610 and internal member 1620, or other component thereto, may cause the locking member/locking ring 132 of the gooseball 100 to extend to a position outside the base 130 and where it can engage the receiver assembly 210 and lock into the hitch mount 200. In order to release the fourth lever locking mechanism 1600, the at least one handle 1610 may be compressed or pushed, such as in a lateral direction, into the body 110 of the gooseball 100 until a release point. At the release point, the at least one handle 1610 and internal member 1620, or other component thereto, may cause the locking member/locking ring 132 of the gooseball 100 to rotate or slide to a position inside the base 130 and thereby allow the gooseball 100 to be released from the receiver assembly 210 and hitch mount 200 (or from the hitch system to which it is attached). The insertion into an unlocked position, and the pushing thereof, may bring the at least one handle 1610 closer the body 110 of the gooseneck 100. In an embodiment, the fourth lever locking mechanism 1600 may be biased toward an unlocked position, such as spring biased (such as by a spring (not shown)). In an embodiment, the fourth lever locking mechanism 1600 may be biased toward a locked position, such as spring biased (such as by a spring (not shown)). In an embodiment, the at least one handle 1610 may lock when in a locked position so that the at least one handle 1610 could not be compressed until a release is enabled, such as by an additional button, actuator or the like.

In an embodiment, the fourth lever locking mechanism 1600 may include a first handle 1610 and a second handle 1615. The first 1610 and second 1615 handles may also operate similarly to a button and may be referred to as the same. The first handle 1610 and the second handle 1615 may be positioned on opposite sides of the body 110 of the gooseball 100. To transition the gooseball 100 into an unlocked position, both handles 1610, 1615 may need to be moved or pushed at the same time. In an embodiment, moving or pushing only one 1610 of the two handles 1615 may not cause the locking member/locking ring 132 to retract into the gooseball 100. The fourth lever locking mechanism 1600 may include more than two handles, including three, four, five, etc. handles, where the handles must be moved or pushed in a certain sequence or simultaneously in order to allow the gooseball 100 to be released from the receiver assembly 210 (or from the hitch system to which it is attached). In an embodiment, the fourth lever locking mechanism 1600 may be biased toward a locked position, such as spring biased (such as by a spring (not shown)). In an embodiment, the fourth lever locking mechanism 1600 may be biased toward an unlocked position, such as spring biased (such as by a spring (not shown)).

Turning to FIGS. 17A-E, shown is an embodiment of a gooseball 100 comprising a fifth lever locking mechanism 1700. The fifth lever locking mechanism 1700 may comprise at least one handle (also referred to as a switch or an arm)

Figure 17A:
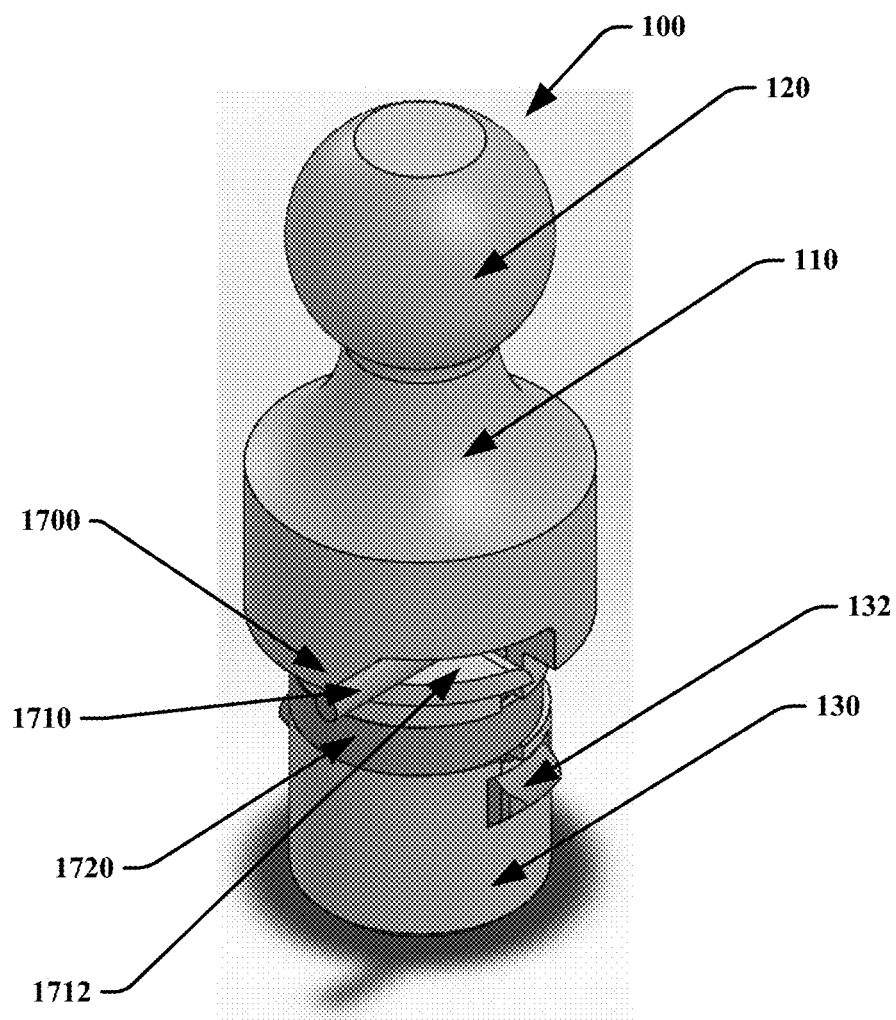
FIGS. 17A-C show an embodiment of a gooseball comprising a fifth lever locking mechanism in a locked position and FIGS. 17D-E show the gooseball in an unlocked position.
Figure 17B:
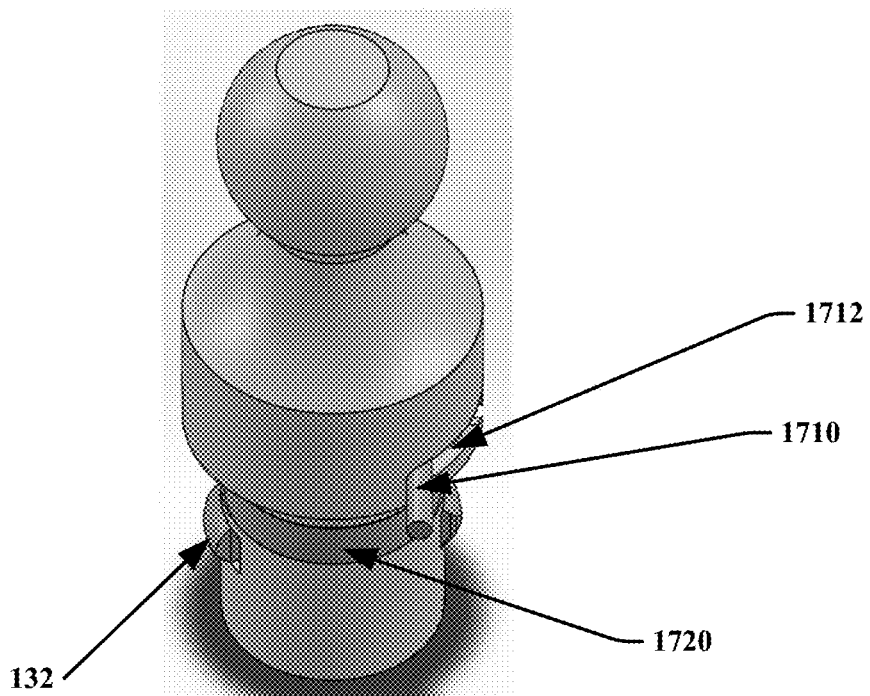
Figure 17C:
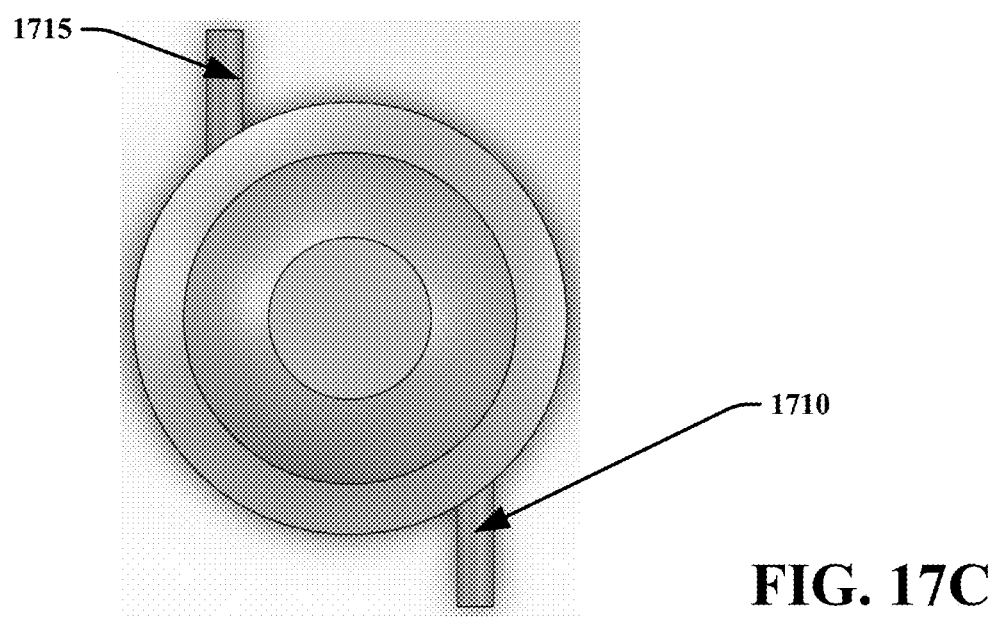
Figure 17D:
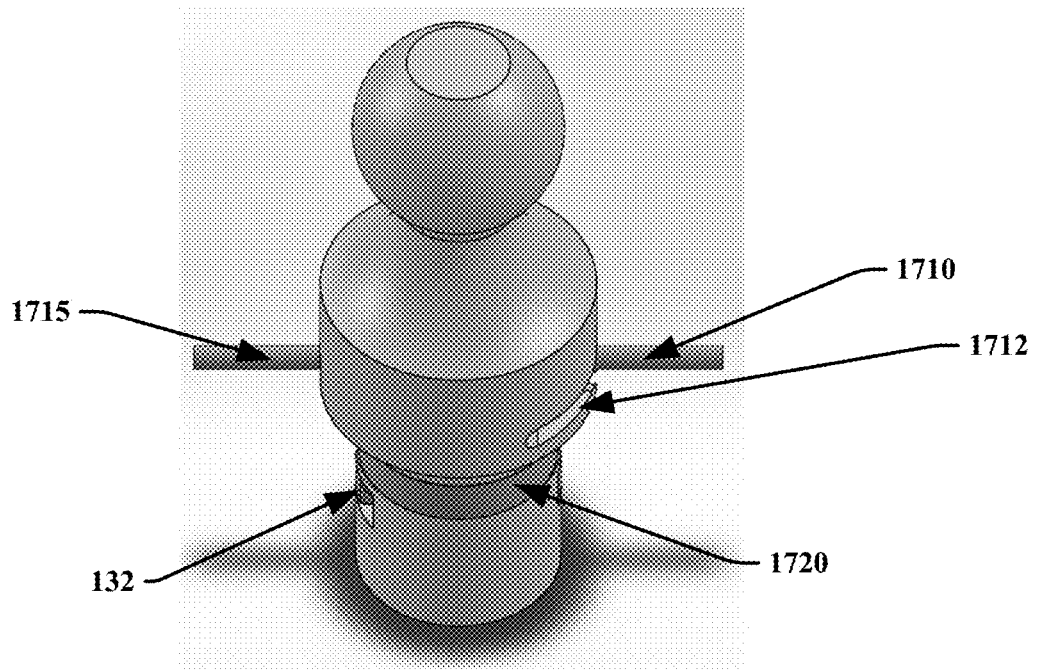
Figure 17E:
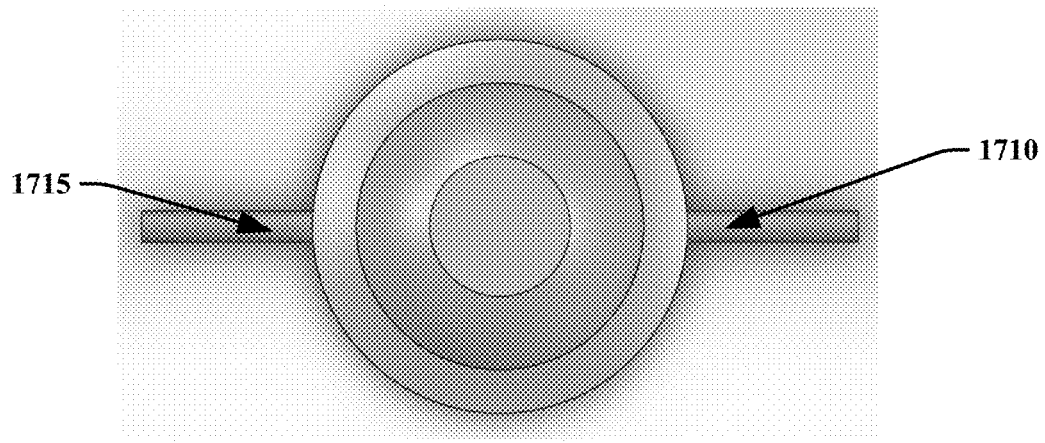
Figure 18A:
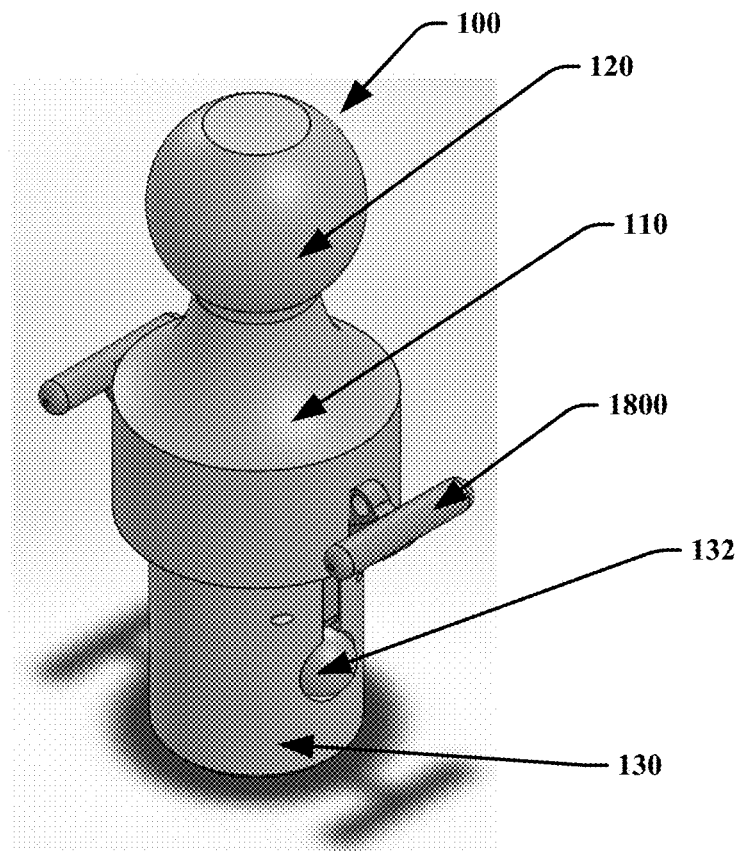
FIGS. 18A-C show an embodiment of a gooseball comprising a first ball locking mechanism in a locked position and FIGS. 18D-E show the gooseball in an unlocked position.
Figure 18B:
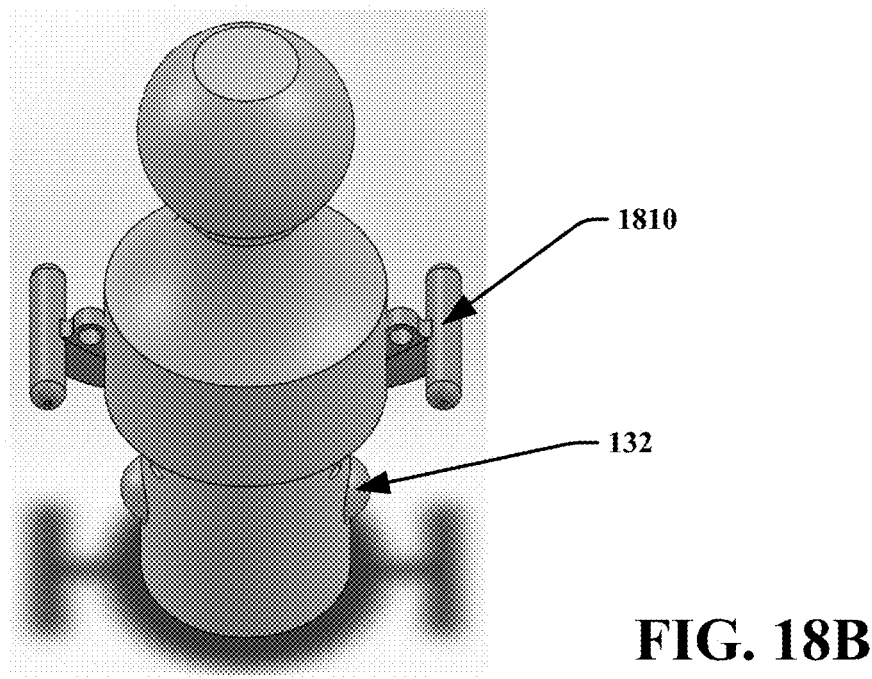
Figure 18C:
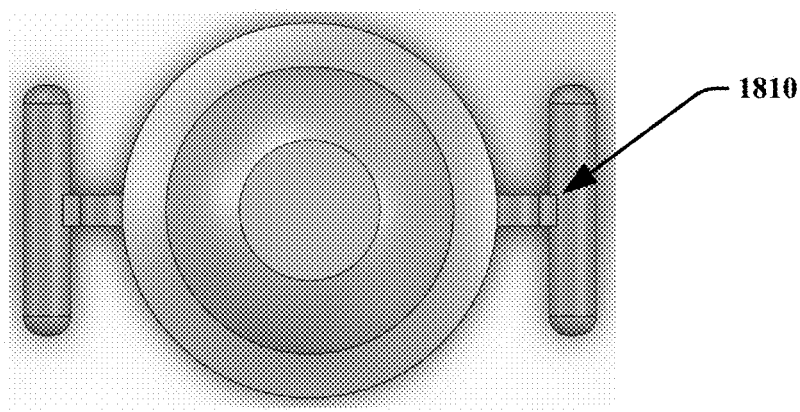
Figure 18D:
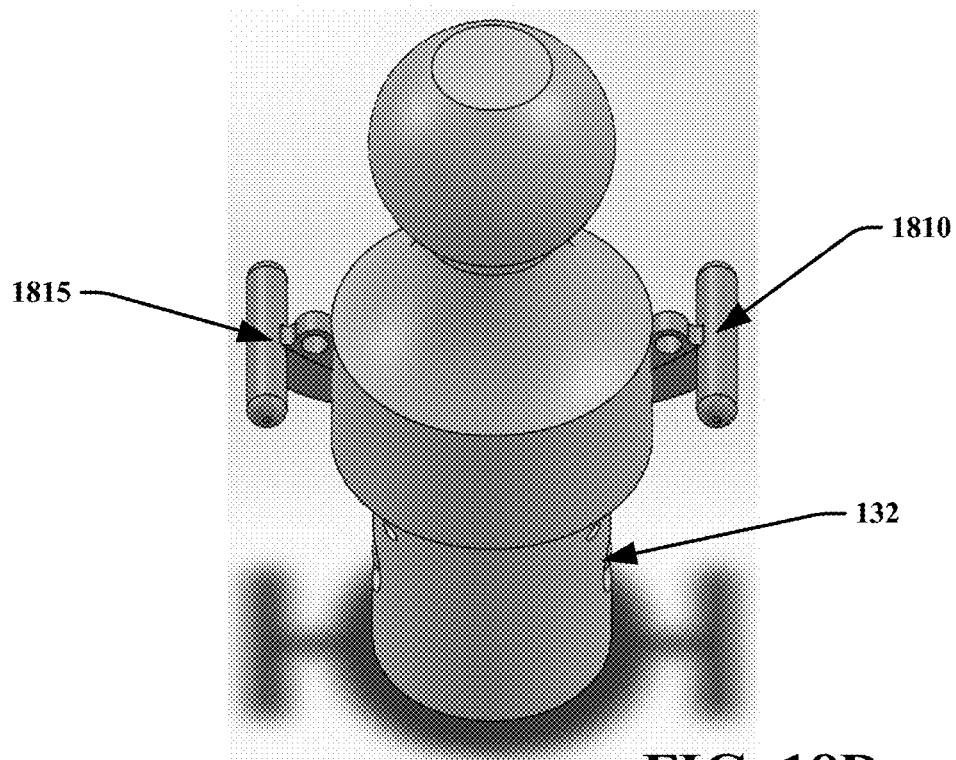
Figure 18E:
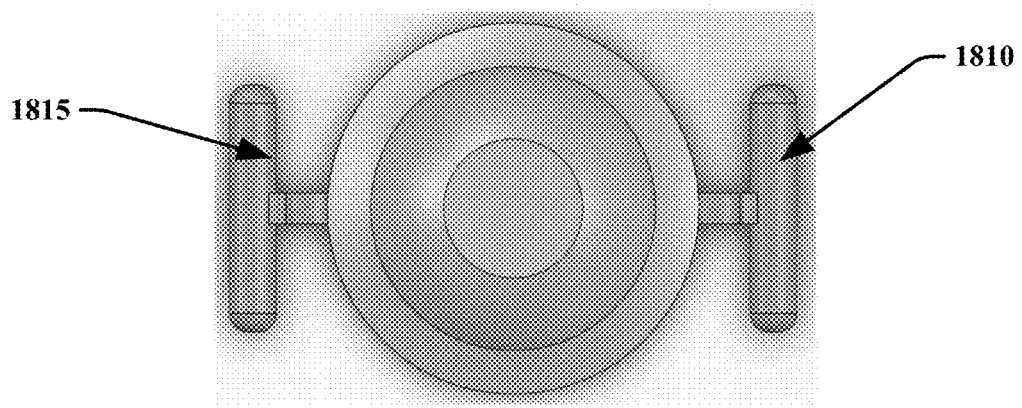
Figure 19A:
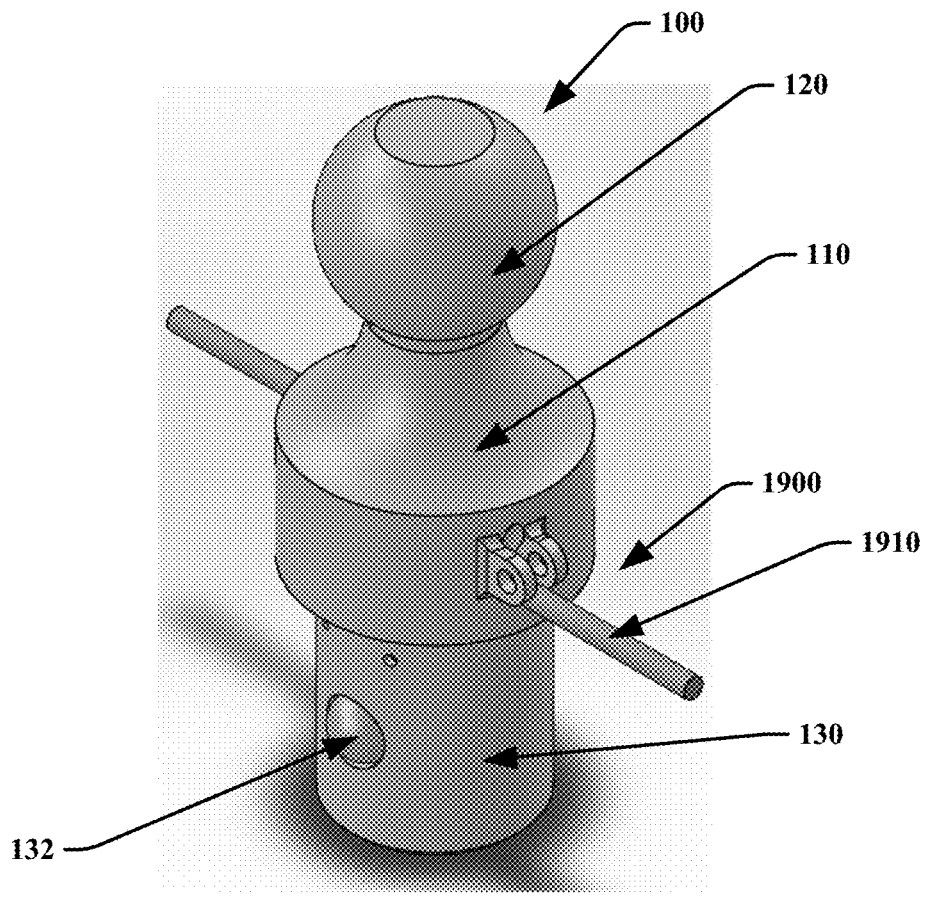
FIGS. 19A-C show an embodiment of a gooseball comprising a second ball locking mechanism in a locked position and FIGS. 19D-E show the gooseball in an unlocked position.
Figure 19B:
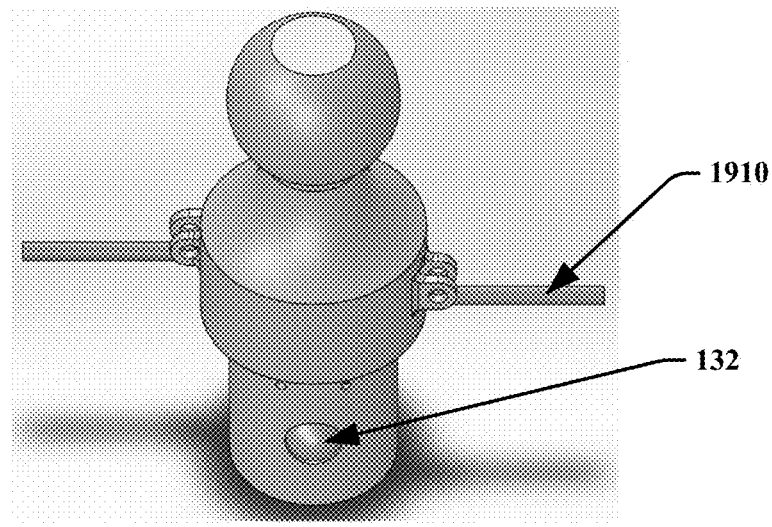
Figure 19C:
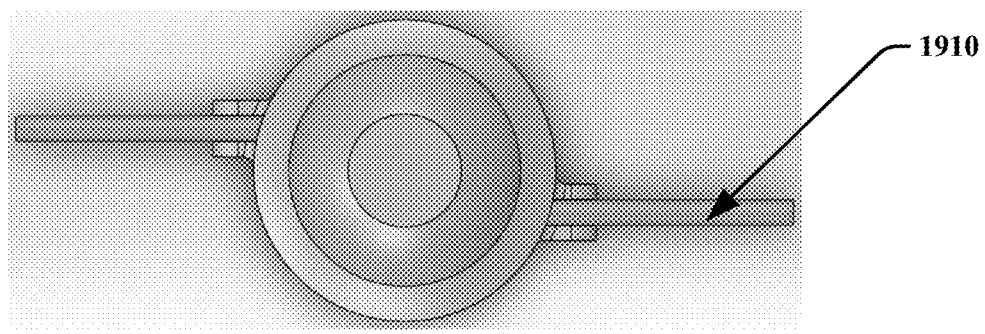
Figure 19D:
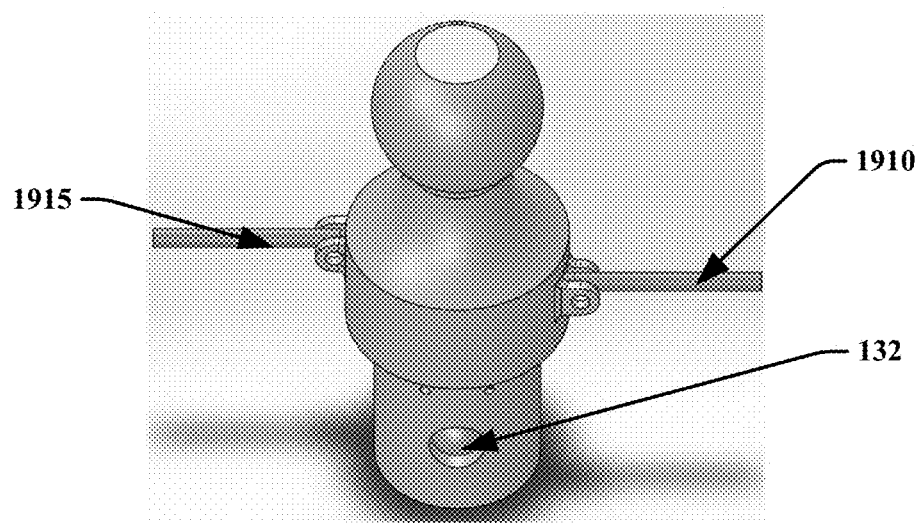
Figure 19E:
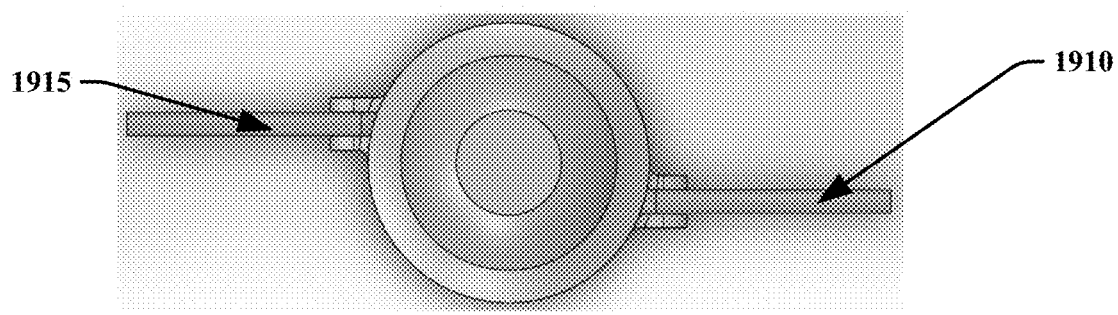
Figure 20A:
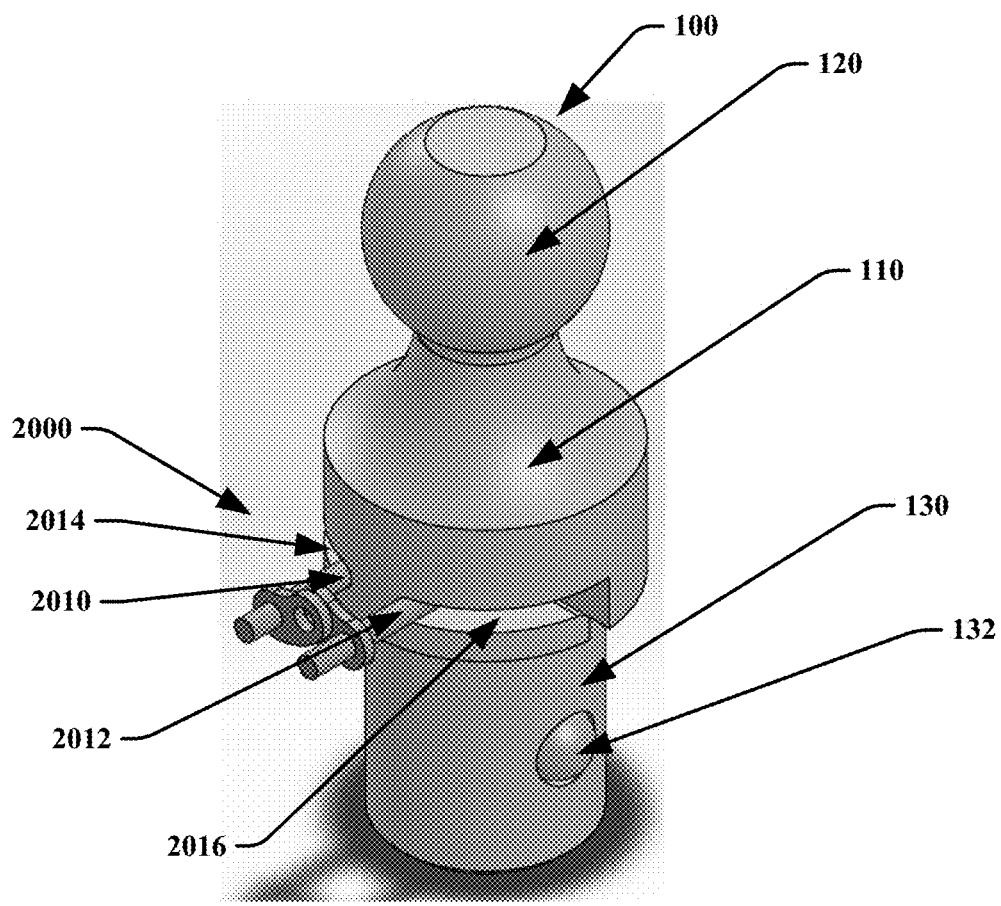
FIGS. 20A-C show an embodiment of a gooseball comprising a third ball locking mechanism in a locked position and FIGS. 20D-E show the gooseball in an unlocked position.
Figure 20B:
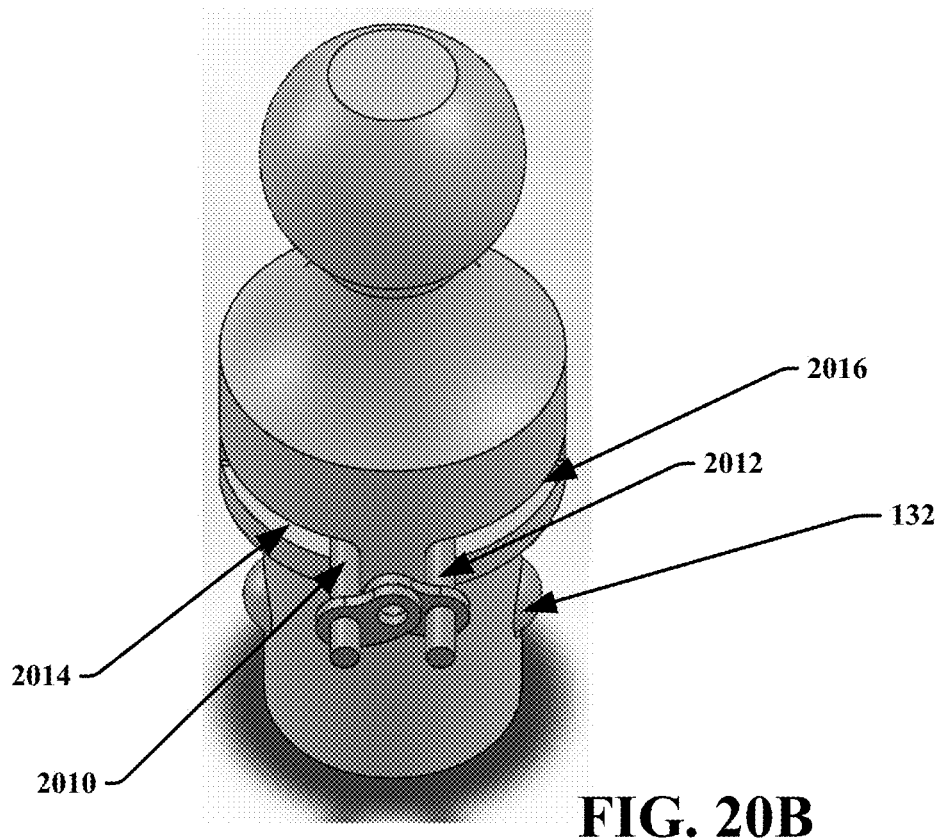
Figure 20C:
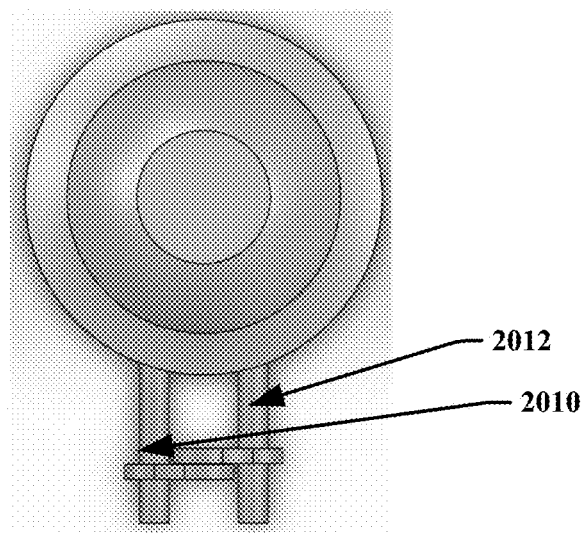
Figure 20D:
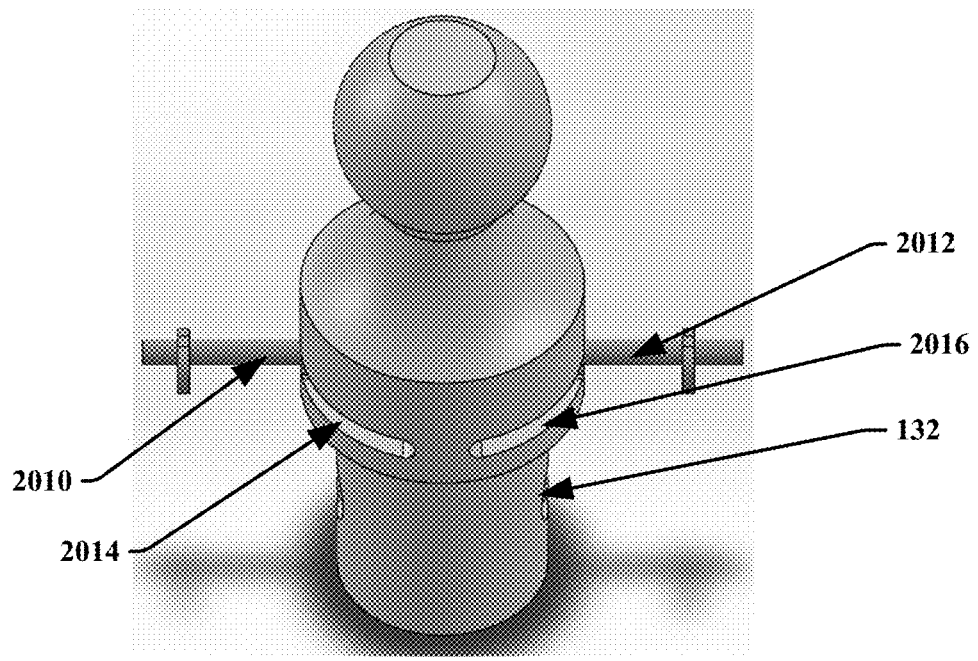
Figure 20E:
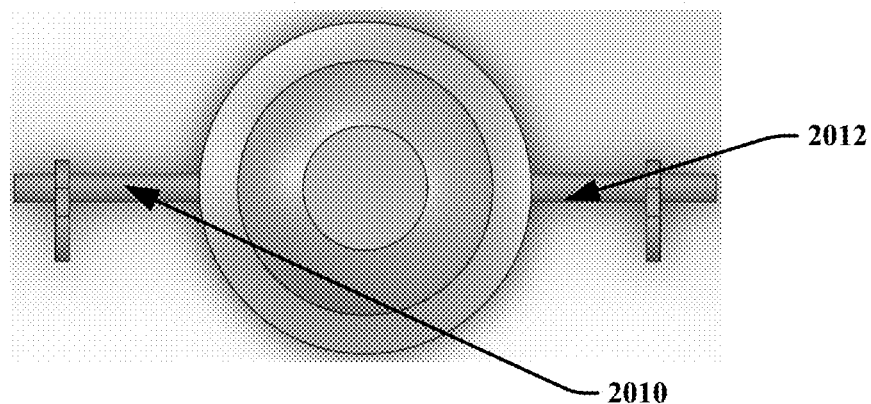
Figure 21A:
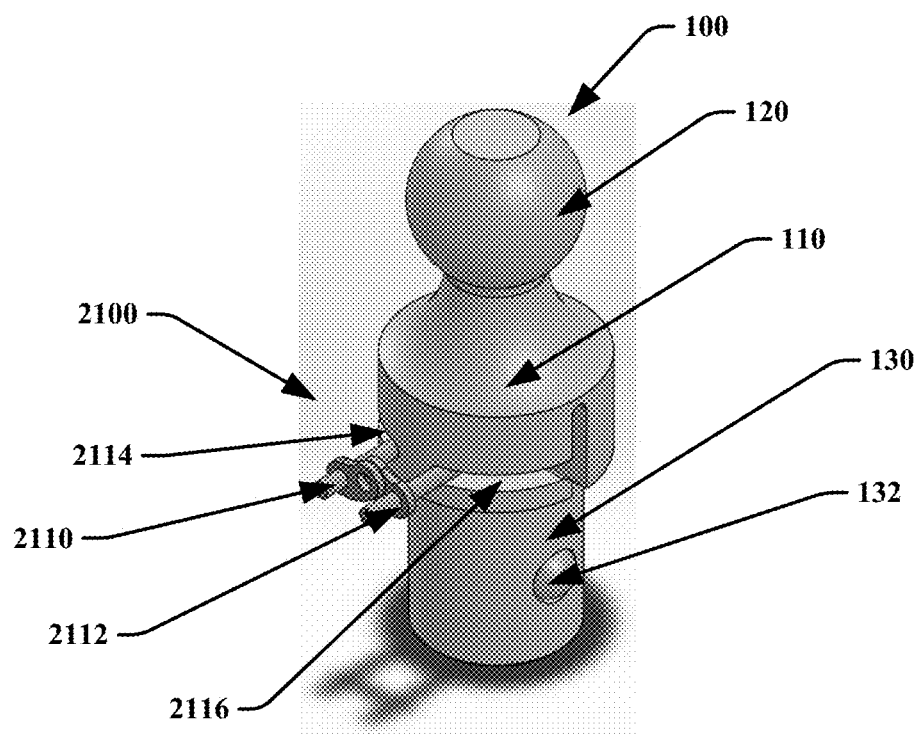
FIGS. 21A-C show an embodiment of a gooseball comprising a fourth ball locking mechanism in a locked position and FIGS. 21D-E show the gooseball in an unlocked position.
Figure 21B:
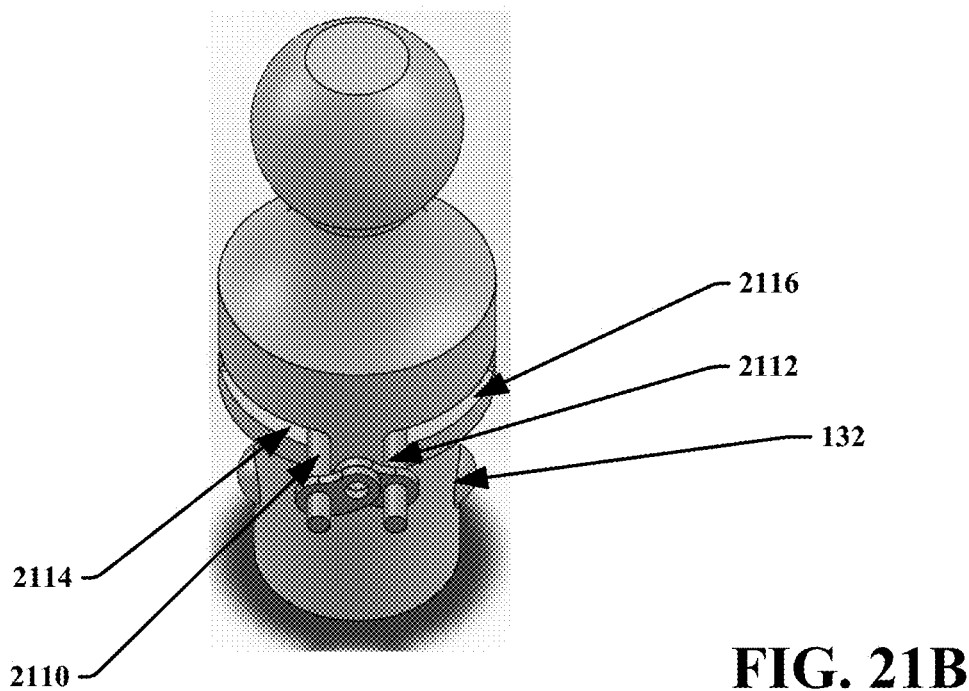
Figure 21C:
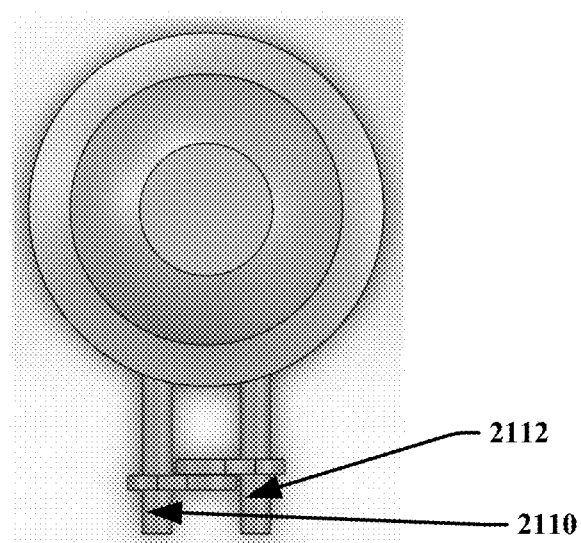
Figure 21D:
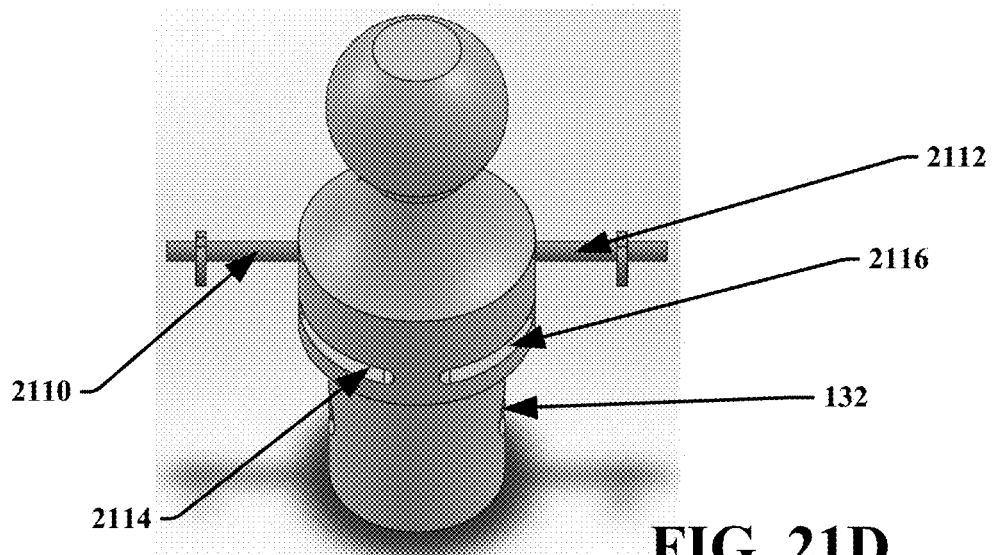
Figure 21E:
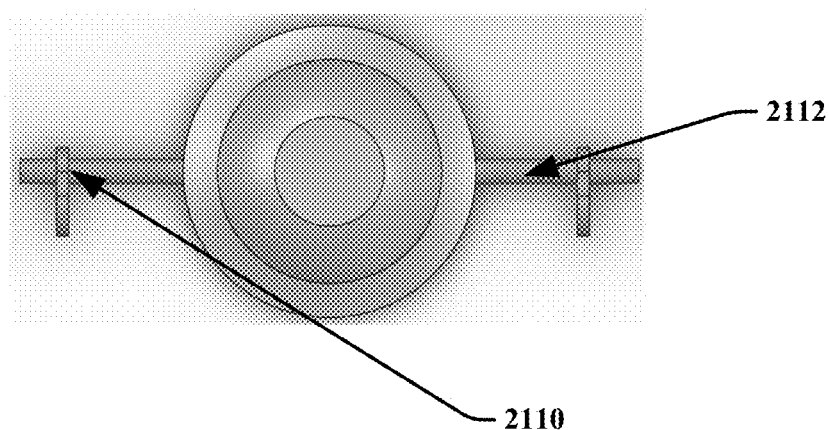

1710 that extends into the body 110 of the gooseball 100 and that selectively engages with an internal member 1720 to transition the fifth lever locking mechanism 1700 between a locked position shown in FIGS. 17A-C and an unlocked position shown in FIGS. 17D-E. In order to engage the fifth lever locking mechanism 1700, the at least one handle 1710 may be rotated, such as in a clockwise direction, along a track 1712 and until a stop point. In an embodiment, the track 1712 may allow for rotation of the at least one handle 1710 by about 90° (i.e., one to five degrees greater or less than 90°).

At the stop point, the at least one handle 1710 may lock and the at least one handle 1710 and internal member 1720, or other component thereto, may cause the locking member/locking face 132 of the gooseball 100 to extend to a position outside the base 130 and where it can engage the receiver assembly 210 and lock into the hitch mount 200. In order to release the fifth lever locking mechanism 1700, the at least one handle 1710 may be rotated in the opposite direction, such as in a counterclockwise direction, moving the at least one handle 1710 along its track 1712 until a release point. In an embodiment, the track 1712 may allow for rotation of the at least one handle 1710 by about 90° (i.e., one to five degrees greater or less than 90°). In an embodiment having more than one handle 1710, such as two handles, each handle may be positioned about 180° (i.e., one to five degrees greater or less than 180°) from the other or at opposite sides of the body 110 of the gooseball 100 and may move in the same clockwise or counterclockwise direction to respectively lock and unlock the gooseball 100. In both locked and unlocked positions, the two handles may remain at about 180° (i.e., one to five degrees greater or less than 180°) apart. It is noted that an embodiment with the opposite rotation, e.g. counterclockwise to lock and clockwise to unlock, is also possible. At the release point, the at least one handle 1710 and internal member 1720, or other component thereto, may cause the locking face 132 of the gooseball 100 to rotate or slide to a position inside the base 130 and thereby allow the gooseball 100 to be released from the receiver assembly 210 and hitch mount 200. In an embodiment, the fifth lever locking mechanism 1700 may rotate generally perpendicularly in respect to the axis defined by the gooseball 100.

In an embodiment, the fifth lever locking mechanism 1700 may include a first handle 1710 and a second handle 1715. The first handle 1710 and the second handle 1715 may be positioned on opposite sides of the body 110 of the gooseball 100. To transition the gooseball 100 into an unlocked position, both handles 1710, 1715 may need to be moved or pushed at the same time. In an embodiment, moving or pushing only one 1710 of the two handles 1715 may not cause the locking member/locking face 132 to retract into the gooseball 100. The fifth lever locking mechanism 1700 may include more than two handles, including three, four, five, etc. handles, where the handles must be moved or pushed in a certain sequence or simultaneously in order to allow the gooseball 100 to be released from the receiver assembly 210. In an embodiment, the fifth lever locking mechanism 1700 may be biased toward a locked position, such as spring biased. In an embodiment, the fifth lever locking mechanism 1700 may be biased toward an unlocked position, such as spring biased.

Turning to FIGS. 18A-E, shown is an embodiment of a gooseball 100 comprising a first ball locking mechanism 1800. The first ball locking mechanism 1800 may comprise at least one handle (also referred to as a latch) 1810 that attaches to the body 110 of the gooseball 100 and that selectively transitions the first ball locking mechanism 1800 between a locked position shown in FIGS. 18A-C and an unlocked position shown in FIGS. 18D-E. In order to engage the first ball locking mechanism 1800, the at least one handle 1810 may be moved or slid, such as in a pushing or downwards direction, until a stop point. The transition into a locked position, and the pushing thereof, may move the at least one handle 1810 further down the body 110 of the gooseneck 100.

At the stop point, the at least one handle 1810 may lock and the at least one handle 1810, or other component thereto, may cause the ball bearings 132 of the gooseball 100 to extend or rotate to a position outside the base 130 and where it can engage the receiver assembly 210 and lock into the hitch mount 200. In order to release the first ball locking mechanism 1800, the at least one handle 1810 may be moved or slid in the opposite direction, such as in a lifting or upwards direction, until a release point. At the release point, the at least one handle 1810, or other component thereto, may cause the ball bearings 132 of the gooseball 100 to retract or rotate to a position inside the base 130 and thereby allow the gooseball 100 to be released from the receiver assembly 210 and hitch mount 200. The movement into an unlocked position, and the pulling thereof, may bring the at least one handle 1810 further up the body 110 of the gooseneck 100. In an embodiment, the at least one handle 1810 may engage an internal mechanism that extends the ball bearings 132 out of the gooseball 100 or that causes the ball bearings 132 to retract into the gooseball 100 to facilitate the locking and unlocking of the gooseball 100 (such as through use of a biasing member or members, such as springs). The body of the at least one handle 1810 may have a wedge shape that causes the selective extension and retraction of the ball bearings 132 in locked and unlocked positions.

In an embodiment, the first ball locking mechanism 1800 may include a first handle 1810 and a second handle 1815. The first handle 1810 and the second handle 1815 may be positioned on opposite sides of the body 110 of the gooseball 100. To transition the gooseball 100 into an unlocked position, both handles 1810, 1815 may need to be moved or slid at the same time. In an embodiment, moving or sliding only one 1810 of the two handles 1815 may not cause the ball bearings 132 to retract into the gooseball 100. The first ball locking mechanism 1800 may include more than two handles, including three, four, five, etc. handles, where the handles must be moved or slid in a certain sequence or simultaneously in order to allow the gooseball 100 to be released from the receiver assembly 210. In an embodiment, the first ball locking mechanism 1800 may be biased toward a locked position, such as spring biased. In an embodiment, the first ball locking mechanism 1800 may be biased toward an unlocked position, such as spring biased.

Turning to FIGS. 19A-E, shown is an embodiment of a gooseball 100 comprising a second ball locking mechanism 1900. The second ball locking mechanism 1900 may comprise at least one handle (also referred to as a switch) 1910 that extends into the body 110 of the gooseball 100 and that selectively transitions the second ball locking mechanism 1900 between a locked position shown in FIGS. 19A-C and an unlocked position shown in FIGS. 19D-E. In order to engage the second ball locking mechanism 1900, the at least one handle 1910 may be moved or slid, such as in a pushing or downwards direction, until a stop point. The transition into a locked position, and the pushing thereof, may move the at least one handle 1910 further down the body 110 of the gooseneck 100.

At the stop point, the at least one handle 1910 may lock and the at least one handle 1910, or other component thereto, may cause the ball bearings 132 of the gooseball 100 to extend to a position outside the base 130 and where it can engage the receiver assembly 210 and lock into the hitch mount 200. In order to release the second ball locking mechanism 1900, the at least one handle 1910 may be moved or slid in the opposite direction, such as in a lifting or upwards direction, until a release point. At the release point, the at least one handle 1910, or other component thereto, may cause the ball bearings 132 of the gooseball 100 to retract to a position inside the base 130 and thereby allow the gooseball 100 to be released from the receiver assembly 210 and hitch mount 200. The movement into an unlocked position, and the lifting thereof, may bring the at least one handle 1910 further up the body 110 of the gooseneck 100. In an embodiment, the at least one handle 1910 may engage an internal mechanism that extends the ball bearings 132 out of the gooseball 100 or that causes the ball bearings 132 to retract into the gooseball 100 to facilitate the locking and unlocking of the gooseball 100. The at least one handle 1910 may be an elongated rod.

In an embodiment, the second ball locking mechanism 1900 may include a first handle 1910 and a second handle 1915. The first handle 1910 and the second handle 1915 may be positioned on opposite sides of the body 110 of the gooseball 100. To transition the gooseball 100 into an unlocked position, both handles 1910, 1915 may need to be moved or slid at the same time. In an embodiment, moving or sliding only one 1910 of the two handles 1915 may not cause the ball bearings 132 to retract into the gooseball 100. The second ball locking mechanism 1900 may include more than two handles, including three, four, five, etc. handles, where the handles must be moved or slid in a certain sequence or simultaneously in order to allow the gooseball 100 to be released from the receiver assembly 210. In an embodiment, the second ball locking mechanism 1900 may be biased toward a locked position, such as spring biased (such as by springs (not shown)). In an embodiment, the second ball locking mechanism 1900 may be biased toward an unlocked position, such as spring biased (by a spring (not shown)).

Turning to FIGS. 20A-E, shown is an embodiment of a gooseball 100 comprising a third ball locking mechanism 2000. The third ball locking mechanism 2000 may comprise at least two handles (also referred to as switches or arms) 2010, 2012 that extend into the body 110 of the gooseball 100 and that selectively engages with an internal member 2020 to transition the third ball locking mechanism 2000 between a locked position shown in FIGS. 20A-C and an unlocked position shown in FIGS. 20D-E. In an embodiment, the at least two handles 2010, 2012 may be positioned about 180° from the other or at opposite sides of the body 110 of the gooseball 100 in an unlocked position and may rotate in opposing clockwise or counterclockwise direction to lock the gooseball 100. In order to engage the third ball locking mechanism 2000, the first handle 2010 may be rotated in a counterclockwise direction along a first respective track 2014 and the second handle 2012 may be rotated in an opposite clockwise direction along a second respective track 2016 and until a stop point. In an embodiment, the respective tracks 2014, 2016 may allow for rotation of each of the at least two handles 2010, 2012 by about 90° (i.e., one to five degrees greater or less than 90°). The transition into a locked position, and the rotation thereof, may move the at least two handles 2010, 2012 closer to one another.

At the stop point, the at least two handles 2010, 2012 may lock and the at least two handles 2010, 2012 and internal member 2020, or other component thereto, may cause the locking face 132 of the gooseball 100 to extend to a position outside the base 130 and where it can engage the receiver assembly 210 and lock into the hitch mount 200. In order to release the third ball locking mechanism 2000, each handle 2010, 2012 may be rotated in the opposite direction until a release point. The first handle 2010 may be rotated in a clockwise direction along the first respective track 2014 and the second handle 2012 may be rotated in an opposite counterclockwise direction along the second respective track 2016 and until the release point. In an embodiment, the respective tracks 2012, 2014 may allow for rotation of each of the at least two handles 2010, 2012 by about 90° between locked and unlocked positions. The transition into an unlocked position, and the rotation thereof, may move the at least two handles 2010, 2012 further from one another and back to about 180° apart. It is noted that an embodiment with the opposite rotation is also possible. At the release point, the at least two handles 2010, 2012 and internal member 1720, or other component thereto, may cause the locking face 132 of the gooseball 100 to rotate or slide to a position inside the base 130 and thereby allow the gooseball 100 to be released from the receiver assembly 210 and hitch mount 200. In an embodiment, the third ball locking mechanism 2000 may rotate generally perpendicularly in respect to the axis defined by the gooseball 100. The at least two handles 2010, 2012 may rotate in the same plane.

Turning to FIGS. 21A-E, shown is an embodiment of a gooseball 100 comprising a fourth ball locking mechanism 2100. As described in respect to the third ball locking mechanism 2000, the at least two handles (also referred to as switches or arms) 2110, 2112 may be positioned about 180° (i.e., one to five degrees greater or less than 180°) from the other or at opposite sides of the body 110 of the gooseball 100 in an unlocked position and may rotate in opposing clockwise or counterclockwise direction to lock the gooseball 100. In order to engage the fourth ball locking mechanism 2100, the first handle 2110 may be rotated in a counterclockwise direction along a first respective track 2114 and the second handle 2112 may be rotated in an opposite clockwise direction along a second respective track 2116 and until a stop point. In an embodiment, the respective tracks 2114, 2116 may allow for rotation of each of the at least two handles 2110, 2112 by about 90° (i.e., one to five degrees greater or less than) 90°. The transition into a locked position, and the rotation thereof, may move the at least two handles 2110, 2112 closer to one another. In order to release the fourth ball locking mechanism 2100, each handle 2110, 2112 may be rotated in the opposite direction until a release point. The first handle 2010 may be rotated in a clockwise direction along the first respective track 2014 and the second handle 2012 may be rotated in an opposite counterclockwise direction along the second respective track 2016 and until the release point. The transition into an unlocked position, and the rotation thereof, may move the at least two handles 2110, 2112 further from one another and back to about 180° apart (i.e., one to five degrees greater or less than 180°). It is noted that an embodiment with the opposite rotation is also possible. The at least two handles 2110, 2112 may rotate in the same plane.

In addition to this sliding mechanism, the fourth ball locking mechanism 2100 may further include a lifting mechanism. In an embodiment, in order to engage the combined locking mechanism, the at least two handles 2110, 2112 may be moved or slid, such as in a pushing or downwards direction, until a stop point. The transition into a locked position, and the pushing thereof, may move the at least two handles 2110, 2112 further down the body 110 of the gooseneck 100. At the stop point, the at least two handles 2110, 2112 may enter their rotational tracks 2114, 2116 as described above. In order to release the fourth ball locking mechanism 2100, the two handles 2110, 2112 may move through their rotational tracks 2114, 2116 to a stop point as described above. The at least two handles 2110, 2112 may then be moved or slid in the opposite direction as before, such as in a lifting or upwards direction, until a release point. The movement into an unlocked position, and the lifting thereof, may bring the at least two handles 2110, 2112 further up the body 110 of the gooseneck 100. As a result, locking the fourth ball locking mechanism 2100 may comprise the steps of (1) pushing down the at least two handles 2110, 2112 and (2) rotating the at least two handles 2110, 2112 along a track 2114, 2116, such as by about 90° (i.e., one to five degrees greater or less than 90°) in opposite directions. Unlocking the fourth ball locking mechanism 2100 may comprise the steps of (1) rotating the at least two handles 2110, 2112 along a track 2114, 2116, such as by about 90° (i.e., one to five degrees greater or less than 90°) in opposite directions and (2) lifting the at least two handles 2110, 2112 upwards. It is noted that the steps may be reversed.

It is noted that while embodiments may describe the locking mechanism as including one or more handles, triggers, switches, arms, buttons, latches, levers, and the like, these terms may be used interchangeably and may be used to generally refer to an actuator of the locking mechanisms as described in each of FIGS. 3-21. It is noted that the various actuators may generally move from a first position to a second position to selectively engage and disengage the retention projection(s) between the locked position and the unlocked position. The various actuators may rotate on a plane defined by an axis of the length of the gooseball (e.g. upwards or downwards), may rotate on a plane perpendicular to the axis of the length of the gooseball (e.g. side to side or to and from a center of the gooseball), may slide along either of these planes and may have any combination being partially internal and external the body of the gooseball or fully internal or external the body of the gooseball.

Although many specific embodiments are described herein, it is noted that aspects of one design may be omitted or combined with another For examples, any of the described locking mechanisms in FIGS. 3-21 may be combined with any of the described goosenecks 100 having ball bearings or a locking ring, wherein the ball bearings and the locking ring can extend and retract in multiple different ways, including sliding, rotating, pulling, pushing, springing, and the like. Moreover, although some described locking mechanisms pull up, down, in, out, etc. to lock, it is noted that the opposite may also be possible in any particular embodiment of FIGS. 3-21. Further, while the locking member 132 is shown as comprising different embodiments in the various embodiments, these different embodiments may be utilized interchangeably between the various embodiments disclosed.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A gooseball comprising:
   a rounded head configured to selectively engage with a coupler;
   a base configured to selectively insert into a hitch mount, the base including a retention projection that selectively extends outside of the base in a locked position and retracts into the base in an unlocked position;
   a locking mechanism to selectively transition the retention projection between the locked position and the unlocked position, wherein the locking mechanism comprises a handle disposed perpendicularly to an axis defined by a length of the base, an internal shuttle that attaches to the handle and is transverse to the base; and
   an actuator directly attached to the handle.

2. The gooseball of claim 1, wherein the actuator selectively rotates the handle and internal shuttle perpendicularly about the axis defined by the length of the gooseball to selectively engage and disengage the retention projection between the locked position and the unlocked position.

3. A gooseball comprising:
   a rounded head configured to selectively engage with a coupler;
   a base configured to selectively insert into a hitch mount, the base including at least one extendable and retractable bearing that is configured to lock the base into the hitch mount when in an extended position;
   a locking mechanism to selectively lock the bearing in the extended position, wherein the locking mechanism includes at least one rotational handle, and
   an actuator directly attached to the handle.

4. The gooseball of claim 3, wherein the rotational handle is disposed perpendicularly to an axis defined by a length of the base, an internal shuttle that attaches to the rotational handle and traverses the base;
   wherein the actuator selectively rotates the rotational handle and internal shuttle perpendicularly about the axis defined by the length of the base to selectively engage and disengage a retention projection between the locked position and the unlocked position.

* * * * *